US005546336A

United States Patent [19]

Pechanek et al.

[11] Patent Number: 5,546,336

[45] Date of Patent: Aug. 13, 1996

[54] PROCESSOR USING FOLDED ARRAY STRUCTURES FOR TRANSPOSITION MEMORY AND FAST COSINE TRANSFORM COMPUTATION

[75] Inventors: Gerald G. Pechanek, Cary, N.C.; Stamatis Vassiliadis, Zoetermeer, Netherlands

[73] Assignee: International Business Machine Corporation, Armonk, N.Y.

[21] Appl. No.: 373,735

[22] Filed: Jan. 19, 1995

[51] Int. Cl.[6] .......... G06F 7/38

[52] U.S. Cl. .......... 364/725

[58] Field of Search .......... 364/725–726, 364/754; 382/280–281

[56] References Cited

U.S. PATENT DOCUMENTS

| | | | |
|---|---|---|---|
| 4,947,480 | 8/1990 | Lewis | 364/572 |
| 4,958,348 | 9/1990 | Berlekamp et al. | 371/37.1 |
| 4,972,361 | 11/1990 | Rader | 367/736 |
| 5,001,559 | 3/1991 | Gonzales et al. | 358/133 |
| 5,231,484 | 7/1993 | Gonzales et al. | 358/133 |
| 5,268,853 | 12/1993 | Tanaka et al. | 365/725 |
| 5,299,025 | 3/1994 | Shirasawa | 365/725 |
| 5,408,425 | 4/1995 | Hou | 365/725 |

OTHER PUBLICATIONS

IBM Technical Disclosure Bulletin, vol. 36, No. 3, Mar. 1993, E. Feig (Y) 892–0572) "Architecture for Descaling and Inverse Discrete Cosine Transforming".

*Primary Examiner*—Tan V. Mai
*Attorney, Agent, or Firm*—Steven B. Phillips

[57] ABSTRACT

A folded memory array structure that can be used with a folded processor array structure to make cosine transform calculations faster and more efficient. The memory elements of the folded memory array are interconnected is if an M by M element square array of single memory elements were logically folded or cut and overlain to form an N by N node subarray where each node has multiple interconnected memory elements. The subarray is than logically folded and the nodes connected by buses and switches as if the resultant array were folded along the diagonal, producing a triangular memory array structure. This transposed folded memory array is enhanced with computational elements disposed at the nodes of the array. A computational array processor is thereby formed which can perform cosine transform operations efficiently for multimedia, video, and other applications.

18 Claims, 43 Drawing Sheets

100

| | | | | |
|---|---|---|---|---|
| 0TH ROW | p00 | p10 | p20 | p30 |
| 1ST ROW | p01 | p11 | p21 | p31 |
| 2ND ROW | p02 | p12 | p22 | p32 |
| 3RD ROW | p03 | p13 | p23 | p33 |

COLUMNS

| | 0 | 1 | 2 | 3 | 4 | 5 | 6 | 7 |
|---|---|---|---|---|---|---|---|---|
| 0TH ROW | p00 | p10 | p20 | p30 | p40 | p50 | p60 | p70 |
| 1ST ROW | p01 | p11 | p21 | p31 | p41 | p51 | p61 | p71 |
| 2ND ROW | p02 | p12 | p22 | p32 | p42 | p52 | p62 | p72 |
| 3RD ROW | p03 | p13 | p23 | p33 | p43 | p53 | p63 | p73 |
| 4TH ROW | p04 | p14 | p24 | p34 | p44 | p54 | p64 | p74 |
| 5TH ROW | p05 | p15 | p25 | p35 | p45 | p55 | p65 | p75 |
| 6TH ROW | p06 | p16 | p26 | p36 | p46 | p56 | p66 | p76 |
| 7TH ROW | p07 | p17 | p27 | p37 | p47 | p57 | p67 | p77 |

| FIG. 2B-1 | FIG. 2B-2 |
| --- | --- |

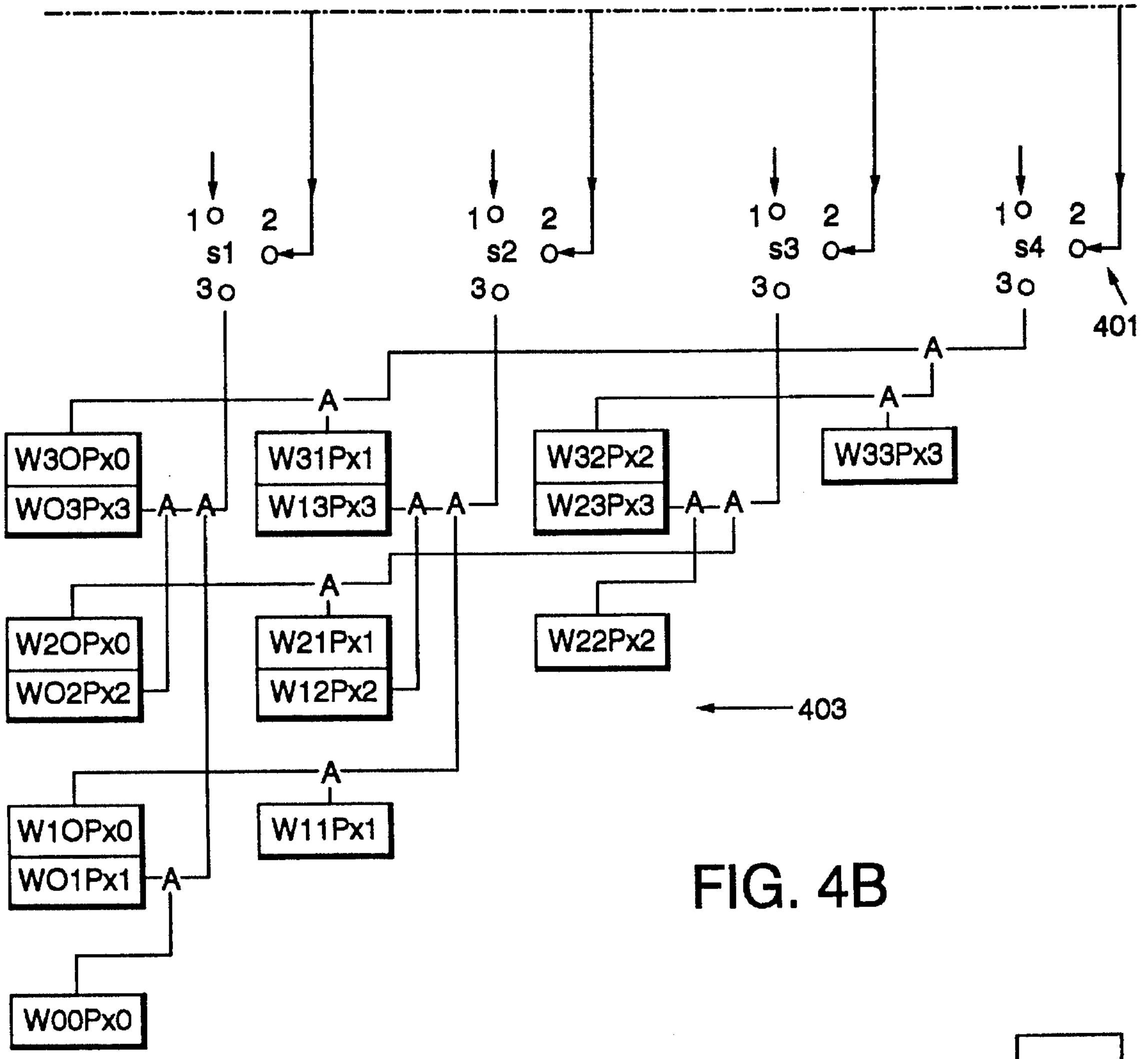
FIG. 4B
FIG. 4
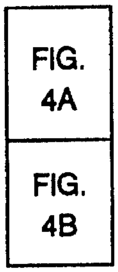

| COLUMNS → | 0 | 1 | 2 | 3 | 4 | 5 | 6 | 7 |
|---|---|---|---|---|---|---|---|---|
| 0TH ROW | p00 | p10 | p20 | p30 | p40 | p50 | p60 | p70 |
| 1ST ROW | p01 | p11 | p21 | p31 | p41 | p51 | p61 | p71 |
| 2ND ROW | p02 | p12 | p22 | p32 | p42 | p52 | p62 | p72 |
| 3RD ROW | p03 | p13 | p23 | p33 | p43 | p53 | p63 | p73 |
| 4TH ROW | p04 | p14 | p24 | p34 | p44 | p54 | p64 | p74 |
| 5TH ROW | p05 | p15 | p25 | p35 | p45 | p55 | p65 | p75 |
| 6TH ROW | p06 | p16 | p26 | p36 | p46 | p56 | p66 | p76 |
| 7TH ROW | p07 | p17 | p27 | p37 | p47 | p57 | p67 | p77 |

CUT (between columns 3 and 4)

CUT (between 3RD ROW and 4TH ROW)

FIG. 7A

| FIG. 7A-1 |
| --- |
| FIG. 7A-2 |

| COLUMN→ | 0 | 1 | 2 | 3 | 4 | 5 | 6 | 7 | 8 | 9 | A | B | C | D | E | F |
| --- | --- | --- | --- | --- | --- | --- | --- | --- | --- | --- | --- | --- | --- | --- | --- | --- |
| 0TH ROW | p0 p0,0 | p16 p1,0 | p32 p2,0 | p48 p3,0 | p64 p4,0 | p80 p5,0 | p96 p6,0 | p112 p7,0 | p128 p8,0 | p144 p9,0 | p160 pA,0 | p176 pB,0 | p192 pC,0 | p208 pD,0 | p224 pE,0 | p240 pF,0 |
| 1ST ROW | p1 p0,1 | p17 p1,1 | p33 p2,1 | p49 p3,1 | p65 p4,1 | p81 p5,1 | p97 p6,1 | p113 p7,1 | p129 p8,1 | p145 p9,1 | p161 pA,1 | p177 pB,1 | p193 pC,1 | p209 pD,1 | p225 pE,1 | p241 pF,1 |
| 2ND ROW | p2 p0,2 | p18 p1,2 | p34 p2,2 | p50 p3,2 | p66 p4,2 | p82 p5,2 | p98 p6,2 | p114 p7,2 | p130 p8,2 | p146 p9,2 | p162 pA,2 | p178 pB,2 | p194 pC,2 | p210 pD,2 | p226 pE,2 | p242 pF,2 |
| 3RD ROW | p3 p0,3 | p19 p1,3 | p35 p2,3 | p51 p3,3 | p67 p4,3 | p83 p5,3 | p99 p6,3 | p115 p7,3 | p131 p8,3 | p147 p9,3 | p163 pA,3 | p179 pB,3 | p195 pC,3 | p211 pD,3 | p227 pE,3 | p243 pF,3 |
| 4TH ROW | p4 p0,4 | p20 p1,4 | p36 p2,4 | p52 p3,4 | p68 p4,4 | p84 p5,4 | p100 p6,4 | p116 p7,4 | p132 p8,4 | p148 p9,4 | p164 pA,4 | p180 pB,4 | p196 pC,4 | p212 pD,4 | p228 pE,4 | p244 pF,4 |
| 5TH ROW | p5 p0,5 | p21 p1,5 | p37 p2,5 | p53 p3,5 | p69 p4,5 | p85 p5,5 | p101 p6,5 | p117 p7,5 | p133 p8,5 | p149 p9,5 | p165 pA,5 | p181 pB,5 | p197 pC,5 | p213 pD,5 | p229 pE,5 | p245 pF,5 |
| 6TH ROW | p6 p0,6 | p22 p1,6 | p38 p2,6 | p54 p3,6 | p70 p4,6 | p86 p5,6 | p102 p6,6 | p118 p7,6 | p134 p8,6 | p150 p9,6 | p166 pA,6 | p182 pB,6 | p198 pC,6 | p214 pD,6 | p230 pE,6 | p246 pF,6 |
| 7TH ROW | p7 p0,7 | p23 p1,7 | p39 p2,7 | p55 p3,7 | p71 p4,7 | p87 p5,7 | p103 p6,7 | p119 p7,7 | p135 p8,7 | p151 p9,7 | p167 pA,7 | p183 pB,7 | p199 pC,7 | p215 pD,7 | p231 pE,7 | p247 pF,7 |

FOLD

FOLD

FOLD

| FOLD | | | | | | | | FOLD | | | | | | | | FOLD |
|---|---|---|---|---|---|---|---|---|---|---|---|---|---|---|---|---|
| 8TH ROW | p8<br>p0,8 | p24<br>p1,8 | p40<br>p2,8 | p56<br>p3,8 | p72<br>p4,8 | p88<br>p5,8 | p104<br>p6,8 | p120<br>p7,8 | p136<br>p8,8 | p152<br>p9,8 | p168<br>pA,8 | p184<br>pB,8 | p200<br>pC,8 | p216<br>pD,8 | p232<br>pE,8 | p248<br>pF,8 |
| 9TH ROW | p9<br>p0,9 | p25<br>p1,9 | p41<br>p2,9 | p57<br>p3,9 | p73<br>p4,9 | p89<br>p5,9 | p105<br>p6,9 | p121<br>p7,9 | p137<br>p8,9 | p153<br>p9,9 | p169<br>pA,9 | p185<br>pB,9 | p201<br>pC,9 | p217<br>pD,9 | p233<br>pE,9 | p249<br>pF,9 |
| ATH ROW | p10<br>p0,A | p26<br>p1,A | p42<br>p2,A | p58<br>p3,A | p74<br>p4,A | p90<br>p5,A | p106<br>p6,A | p122<br>p7,A | p138<br>p8,A | p154<br>p9,A | p170<br>pA,A | p186<br>pB,A | p202<br>pC,A | p218<br>pD,A | p234<br>pE,A | p250<br>pF,A |
| BTH ROW | p11<br>p0,B | p27<br>p1,B | p43<br>p2,B | p59<br>p3,B | p75<br>p4,B | p91<br>p5,B | p107<br>p6,B | p123<br>p7,B | p139<br>p8,B | p155<br>p9,B | p171<br>pA,B | p187<br>pB,B | p203<br>pC,B | p219<br>pD,B | p235<br>pE,B | p251<br>pF,B |
| CTH ROW | p12<br>p0,C | p28<br>p1,C | p44<br>p2,C | p60<br>p3,C | p76<br>p4,C | p92<br>p5,C | p108<br>p6,C | p124<br>p7,C | p140<br>p8,C | p156<br>p9,C | p172<br>pA,C | p188<br>pB,C | p204<br>pC,C | p220<br>pD,C | p236<br>pE,C | p252<br>pF,C |
| DTH ROW | p13<br>p0,D | p29<br>p1,D | p45<br>p2,D | p61<br>p3,D | p77<br>p4,D | p93<br>p5,D | p109<br>p6,D | p125<br>p7,D | p141<br>p8,D | p157<br>p9,D | p173<br>pA,D | p189<br>pB,D | p205<br>pC,D | p221<br>pD,D | p237<br>pE,D | p253<br>pF,D |
| ETH ROW | p14<br>p0,E | p30<br>p1,E | p46<br>p2,E | p62<br>p3,E | p78<br>p4,E | p94<br>p5,E | p110<br>p6,E | p126<br>p7,E | p142<br>p8,E | p158<br>p9,E | p174<br>pA,E | p190<br>pB,E | p206<br>pC,E | p222<br>pD,E | p238<br>pE,E | p254<br>pF,E |
| FTH ROW | p15<br>p0,F | p31<br>p1,F | p47<br>p2,F | p63<br>p3,F | p79<br>p4,F | p95<br>p5,F | p111<br>p6,F | p127<br>p7,F | p143<br>p8,F | p159<br>p9,F | p175<br>pA,F | p191<br>pB,F | p207<br>pC,F | p223<br>pD,F | p239<br>pE,F | p255<br>pF,F |

FOLD

| COLUMN → | 0 | 1 | 2 | FOLD | 5 | 6 | 7 |
|---|---|---|---|---|---|---|---|
| 0TH ROW | p00 | p10 | p20 | p30 | p40 | p50 | p60 | p70 |
| 1ST ROW | p01 | p11 | p21 | p31 | p41 | p51 | p61 | p71 |
| 2ND ROW | p02 | p12 | p22 | p32 | p42 | p52 | p62 | p72 |
| 3RD ROW | p03 | p13 | p23 | p33 | p43 | p53 | p63 | p73 |
| FOLD 4TH ROW | p04 | p14 | p24 | p34 | p44 | p54 | p64 | p74 | FOLD |
| 5TH ROW | p05 | p15 | p25 | p35 | p45 | p55 | p65 | p75 |
| 6TH ROW | p06 | p16 | p26 | p36 | p46 | p56 | p66 | p76 |
| 7TH ROW | p07 | p17 | p27 | p37 | p47 | p57 | p67 | p77 |

FOLD

Figure 9C:
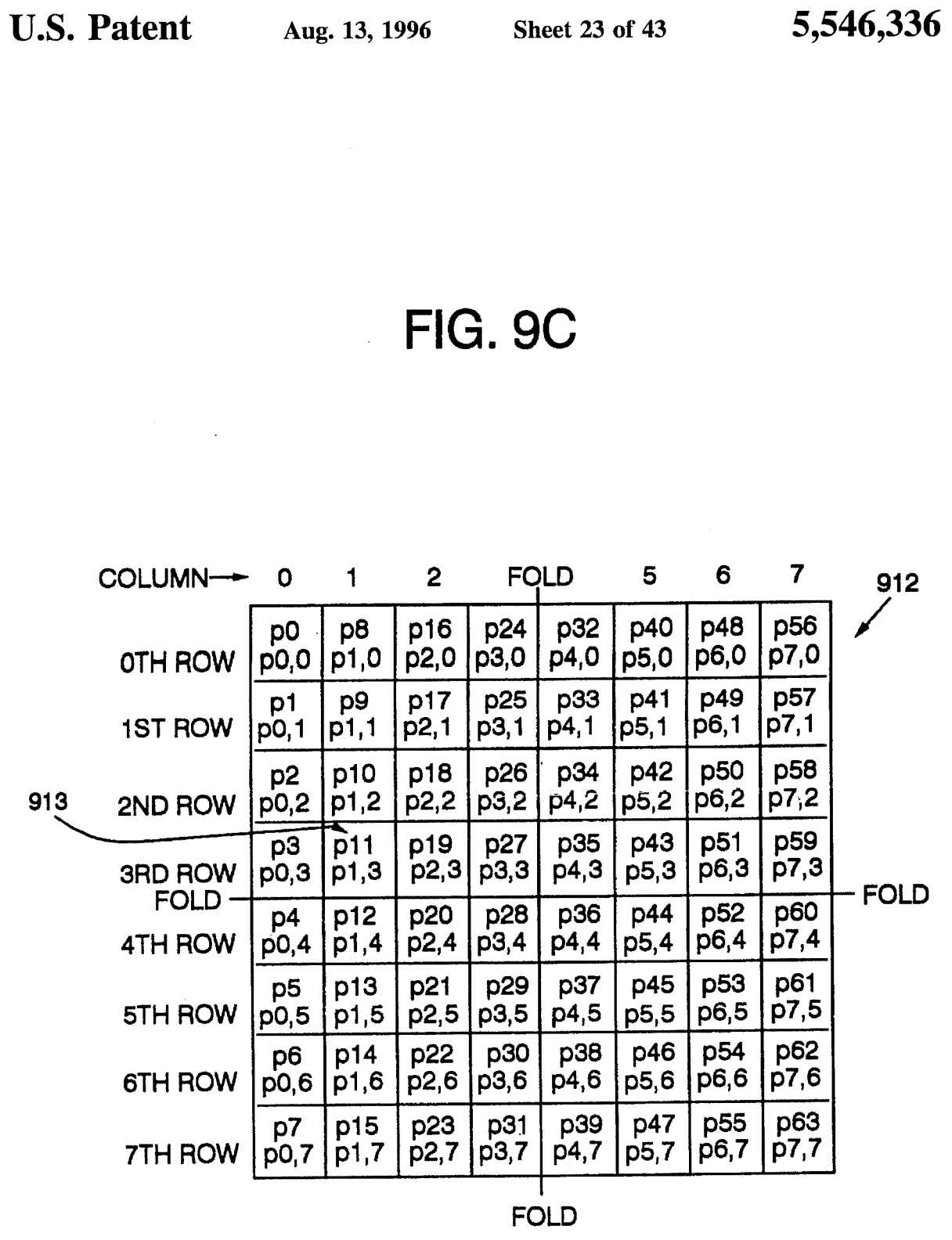

| COLUMN→ | 0 | 1 | 2 | FOLD | | 5 | 6 | 7 |
|---|---|---|---|---|---|---|---|---|
| 0TH ROW | p0 p0,0 | p8 p1,0 | p16 p2,0 | p24 p3,0 | p32 p4,0 | p40 p5,0 | p48 p6,0 | p56 p7,0 |
| 1ST ROW | p1 p0,1 | p9 p1,1 | p17 p2,1 | p25 p3,1 | p33 p4,1 | p41 p5,1 | p49 p6,1 | p57 p7,1 |
| 2ND ROW | p2 p0,2 | p10 p1,2 | p18 p2,2 | p26 p3,2 | p34 p4,2 | p42 p5,2 | p50 p6,2 | p58 p7,2 |
| 3RD ROW | p3 p0,3 | p11 p1,3 | p19 p2,3 | p27 p3,3 | p35 p4,3 | p43 p5,3 | p51 p6,3 | p59 p7,3 |
| FOLD | | | | | | | | FOLD |
| 4TH ROW | p4 p0,4 | p12 p1,4 | p20 p2,4 | p28 p3,4 | p36 p4,4 | p44 p5,4 | p52 p6,4 | p60 p7,4 |
| 5TH ROW | p5 p0,5 | p13 p1,5 | p21 p2,5 | p29 p3,5 | p37 p4,5 | p45 p5,5 | p53 p6,5 | p61 p7,5 |
| 6TH ROW | p6 p0,6 | p14 p1,6 | p22 p2,6 | p30 p3,6 | p38 p4,6 | p46 p5,6 | p54 p6,6 | p62 p7,6 |
| 7TH ROW | p7 p0,7 | p15 p1,7 | p23 p2,7 | p31 p3,7 | p39 p4,7 | p47 p5,7 | p55 p6,7 | p63 p7,7 |

913

FOLD

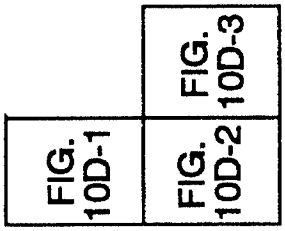
FIG. 10D
FIG. 10D-1
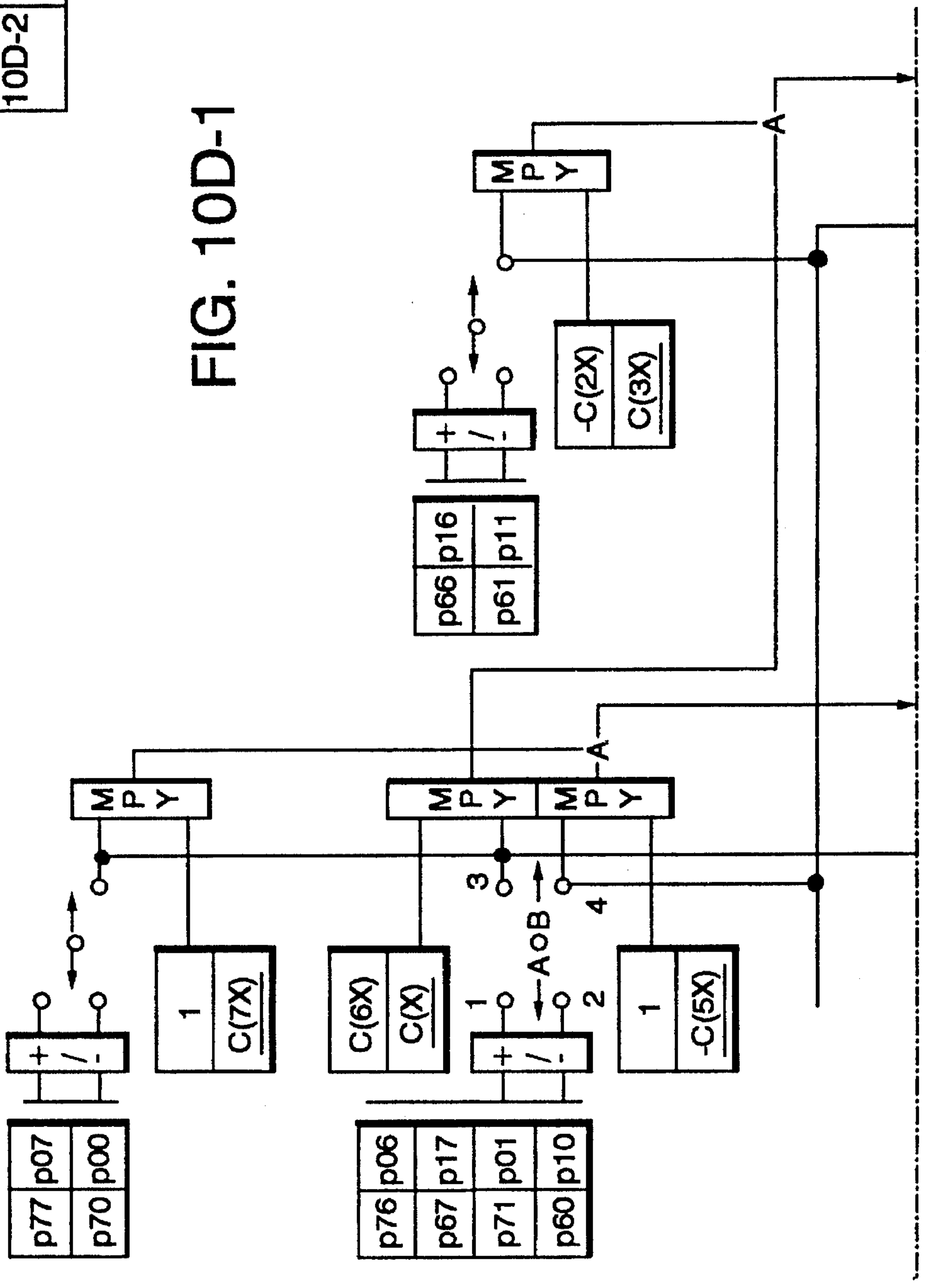

PROCESSOR USING FOLDED ARRAY STRUCTURES FOR TRANSPOSITION MEMORY AND FAST COSINE TRANSFORM COMPUTATION

BACKGROUND

1. Field of the Invention

This invention relates to parallel processing. Specifically, it relates to folded memory array structures that are used in conjunction with execution units to perform fast and efficient cosine transform computations. Such computations are needed for real-time signal processing operations such as processing video.

2. Definition of the Problem

Parallel processors based on folded processor arrays are used in application specific systems for high performance computation. A folded processor array is essentially a parallel processor with multiple processing elements arranged so that the elements are interconnected as if a processor array was physically folded and new connections made between the newly adjacent processing elements. A folded array processor is faster and more efficient than an unfolded parallel processor because a higher degree of interconnectivity is achieved. A folded linear systolic array used as a CORDIC processor is described in U.S. Pat. No. 4,972,361 to Rader which is incorporated herein by reference. A systolic folded array used as a Reed-Solomon decoder is described in U.S. Pat. No. 4,958,348 to Berlekamp et al. which is incorporated herein by reference.

More general purpose folded processor arrays are described in the pending U.S. patent applications Ser. No. 864,112, filed Apr. 6, 1992, and Ser. No. 904,916, filed Jun. 26, 1992, which are both assigned to the assignee of the present application and which are incorporated herein by reference. The '112 application describes an array of processing elements folded once. The '916 application describes an array of processing elements folded three times.

Parallel processor arrays are often used to perform complex operations such as cosine transforms and inverse cosine transforms. Cosine transform operations are required for algorithms used in encoding and decoding video data for digital video standards such as the commonly known MPEG and JPEG standards. Many of these algorithms require both the data and its transpose in different sections of the algorithm, for example, two-dimensional discrete cosine transform. In addition, these signal processing algorithms require butterfly operations. The transposition operations in particular can cause a significant bottleneck to a processing apparatus because matrix data is needed in its original and in its transposed form requiring significant data movement operations to prepare the data prior to processing.

What is needed is a transposed, folded memory architecture that is scalable and based on folded parallel processor array concepts. A memory based on such an architecture can be used to store pel data required to perform fast cosine transform operations for video processing. In this case the memory is interconnected with a parallel processor as previously described. By adding appropriate execution units to the memory structure, butterfly operations and one and two dimensional fast cosine transform computations can be performed in the memory structure to preprocess video data for further processing by later stages in a processing system.

SUMMARY

The present invention solves the above problem by providing folded memory array structures that can be used with a folded processor array to make cosine transform calculations faster and more efficient. A cosine transform operation is used to transform data from one form into another. For example, such a transform can be used to transform JPEG or MPEG video data between compressed and uncompressed formats.

Folded arrays can be designed a number of different ways. Throughout this disclosure, folded array structures will be described as formed by "logically folding" an array. By "logically folding" we mean building an array structure which looks as if an array was folded as described and the newly adjacent memory elements were interconnected to form multi-element memory nodes. In addition, the folded array remains logically equivalent to the array prior to folding. The folds may take many forms. For example, the array could take the form of a 4 by 8 rectangular array of 32 memory elements folded along the vertical axis to a 4 by 4 (M by M) array of two elements per node and then folded along the diagonal of the 4 by 4 square array. The resulting folded array with new connectivity established between the 32 memory elements still maintains an equivalent number of memory elements and the original interconnectivity it had prior to folding. In another example, a 4 by 4 by 4 three-dimensional array can be modeled on a two-dimensional 4 by 4 structure with four memory elements per node.

In the preferred embodiments of the invention, the "folds" are made in such away as to enable the structure to transpose data in the entire array for use in performing cosine transform calculations. All of the preferred embodiments are formed by fabricating the structure on a semiconductor integrated circuit and no actual physical folding takes place in the fabrication process. In addition to "logical folding", there are places in this disclosure where we describe "logically cutting" a square array. By "logically cutting" we mean fabricating an array structure which looks as if an array was cut into pieces and the pieces laid on top of each other with newly adjacent elements being interconnected to form multi-element nodes. Again, no actual cutting of this sort takes place during fabrication.

In one embodiment, an N by N element square array of single memory element nodes is logically folded along the diagonal to form a triangular array having (N2–N)/2 general nodes, each having two memory elements, with N diagonal nodes along the diagonal, each having a single memory element. The array nodes are interconnected by memory buses having control and data lines and each node has a switching means to switch between multiple memory elements. The memory buses can be interconnected with a single processor bus or with multiple processor buses of a processor array to supply data to the processor or processor array to enable it to perform computations such as cosine transform computations.

In the preferred embodiment the memory is configured as a transposed folded array. In this embodiment, the memory is logically folded along the diagonal as previously described; however, only after logically folding or logically cutting an M by M square array of X memory elements per node into N by N sub-arrays, where N<M and M is divisible by N. After these first logical cuttings or logical foldings, the sub-arrays of the original M by M square array are overlain so that a N by N square array of nodes is obtained with $((M/N)^2)X$ memory elements per node. This square array of nodes is then logically folded along the diagonal. Thus a transposed folded memory array is formed by partitioning up the M by M array into N by N sub-arrays, logically folding or logically cutting and overlaying the sub-arrays to a single N by N array and then folding the N by N array along the diagonal. The resultant array is made up of (N2–N)/2 general nodes each having $2((M/N)^2)X$ interconnected memory elements and N diagonal nodes each having $((M/N)^2)X$ interconnected memory elements disposed along the diagonal of a triangular array organization. The nodes of this array are interconnected by memory buses having control and data lines and switching means are disposed at each node for switching between elements.

The preferred embodiment memory array described above can be interconnected with a computational array to provide a structure for fast and efficient computation of cosine transforms. In this case the memory buses of the memory array are interconnected with the processor buses or the computational array so that the processing elements in the computational array can access data stored in the memory elements.

The transposed folded array described can be enhanced with computational elements disposed at the nodes of the memory array so that the data in the memory elements can be further processed before being sent to a computational array. These computational elements can include means for performing butterfly operations or multiplier means, or both. Computational elements disposed at the nodes of the array can also be arranged so that all of the nodes connected to a bus form a summation tree. In the preferred embodiment, the summation tree is a communicating adder tree. In this case the data output from the array is already in a form so that cosine transform operations can be performed by a computational array immediately.

If all of the appropriate processing elements are added to the nodes of the memory array described above, a computational processor array for performing cosine transform operations can be built using the preferred embodiment memory structure. In this case, no additional processing is needed. The processor array comprises the a memory array formed by logically folding or cutting and overlaying an M by M element square memory array to form N by N subarrays having X memory elements per node and then logically folding the resulting array once along the diagonal. This resultant array is made up of (N2–N)/2 general nodes each having $2((M/N)^2)X$ interconnected memory elements and N diagonal nodes each having $((M/N)^2)X$ interconnected memory elements disposed along the diagonal of a triangular array organization. The nodes of the array are interconnected by N buses having control and data lines. Each node has means for performing computations on the data stored in the memory elements of the node and outputting the results to a bus so that a group of N nodes is connected to a single bus that forms a communicating adder type summation tree. The means for performing the computations at each can include switching means, multiplying means or multipliers, means for performing butterfly operations and/or means for generating trigonometric constants.

This invention provides a transposed, folded memory architecture that is scalable; that can be used to efficiently store data required to perform fast cosine transform operations; and that can, with the addition of appropriate execution units, be used to perform fast cosine transform computations to pre-process data. These and other advantages of the present invention are described in detail below.

BRIEF DESCRIPTION OF THE DRAWINGS

FIG. 2A is a representation of a square memory array like that of FIG. 1A except larger.

FIG. 2B is divided into sections 2B-1 and 2B-2 for convenience.

FIG. 4 is divided into FIGS. 4A and 4B for convenience.

FIG. 6A shows a square memory array with logical "cuts" according to this invention indicated.

FIG. 7A shows schematic representation of a square memory array like that of FIG. 5A except larger. The initial logical "folds" according to the present invention are marked. FIG. 7A is divided into sections 7A-1 and 7A-2 for convenience.

FIG. 7B is divided into sections 7B-1, 7B-2 and 7B-3 for convenience.

FIG. 8A is divided into sections 8A-1 and 8A-2 for convenience.

FIG. 8B is divided into sections 8B-1 and 8B-2 for convenience.

FIG. 9A shows a square memory array with logical "folds" indicated.

FIG. 9C shows a square memory array of nodes with multiple elements per node and logical "folds" indicated.

FIG. 10A is divided into sections 10A-1 and 10A-2, and 10A-3 for convenience.

FIG. 10C is divided into sections 10C-1, 10C-2, and 10C-3 for convenience.

FIG. 10D is divided into sections 10D-1, 10D-2, and 10D-3 for convenience.

FIG. 10E is divided into sections 10E-1 and 10E-2 for convenience.

FIG. 11A is divided into sections 11A-1, 11A-2, 11A-3, and 11A-4 for convenience.

FIG. 11C is divided into sections 11C-1 and 11C-2 for convenience.

DETAILED DESCRIPTION OF THE PREFERRED EMBODIMENTS

Figures 1A, 1B:
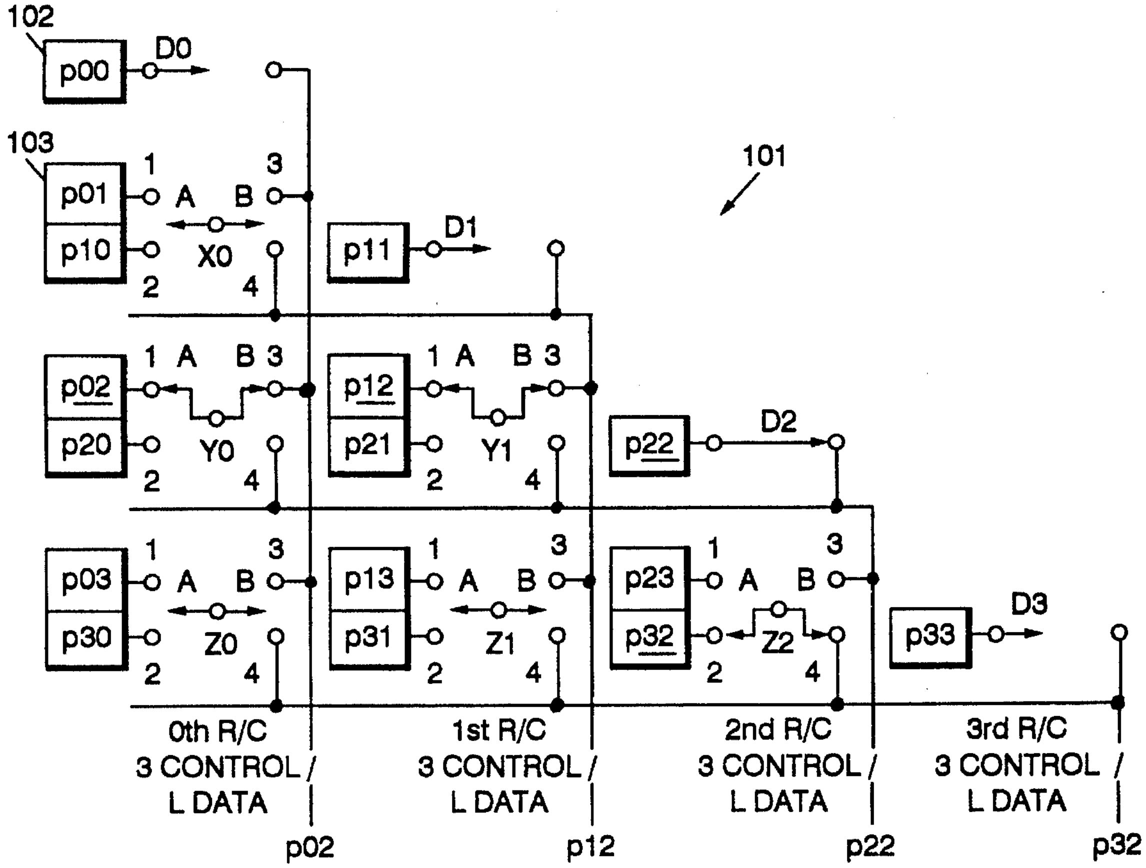
FIG. 1A is a schematic representation of a square memory array for pixel data.
FIG. 1B is a schematic representation of a folded array according to one embodiment of the present invention having the same number of elements as the array of FIG. 1A, and having switching means and buses.

Throughout this disclosure, the preferred embodiment of the invention is described as storing pixel data or pel data as the invention lends itself to processing video. However, those skilled in the art will recognize that the invention has many other uses as well. FIG. 1A shows a schematic representation of a simple 4 by 4 square memory array 100. The elements of the array are labeled with "p" because such memory arrays are used to store pixel data in video systems, although they have many other uses as well. The two numbers after the p in each memory element indicate the column and row, respectively. In a uni-processor system the pixels are stored in a linear addressed memory space. A two-dimensional matrix is mapped onto the linear address space. In this case the pixels are not connected to each other but are independently addressable via address ports to be read out of the memory or written into the memory. In a parallel two-dimensional array of processing elements a pixel or multiple pixels can be mapped to a node. In this case the pixels can be interconnected since processing means are usually provided with each node. The interconnection can be a four-neighborhood mesh, a six-neighborhood mesh, an eight-neighborhood mesh, or alternative interconnection network. FIG. 1A represents the basis for the mapping onto our folded array organization.

FIG. 1B shows according to the present invention a folded memory array 101. The elements of the array are labeled to show their correspondence with a square array with the same number of elements. The array, being logically folded along the diagonal has nodes with two memory elements 103 and nodes along the diagonal each with a single memory element 102.

Note that all data buses are "L" bits long, allowing for bit-serial or word parallel configurations. "L" is the length of the bus and it's value is a design choice not dictated by architectural constraints. Connection mechanisms, logically depicted as switches, are used with each pixel data storage cell to allow connection to the buses. The folded structure has the ability to read/write rows or columns under simple control mechanisms. This is demonstrated in FIG 1B for the read out of the 2nd row of FIG. 1A, p02, p12, p22, and p32. In FIG. 1B, the affected row/column switches are set as indicated by the 2nd row/column (R/C) control lines, while the other switches in the structure are placed in a not connected state. The connections are switch Y0–(A1,B3), switch Y1–(A1,B3), switch Z2–(A2,B4) and the diagonal switch D2 connected as shown, where switch point A is connected to the memory node and switch point B is connected to the data bus. In general for matrices with data items "p" identified as "p<column,row>" as depicted in FIG. 1A and FIG. 1B an "Ath" row/column read/write operation causes the activation of the "Ath" R/C control lines, for example, to write to the first column requires activation of the first R/C control lines. The switches D0, D1, D2, D3, X0, Y0, Y1, Z0, Z1, and Z2 are controlled such that for row read or write operations whenever B is connected to 3 then A is connected to 1, and whenever B is connected to 4 then A is connected to 2. For column read or write operations whenever B is connected to 3 then A is connected to 2 and whenever B is connected to 4 then A is connected to 1. The switch settings for accessing (reading or writing) each row and column of the folded 4 by 4 transpose memory are shown in TABLE 1.

TABLE 1

| SWITCHES▸ | D0 | X0 | Y0 | Z0 | D1 | Y1 | Z1 | D2 | Z2 | D3 |
|---|---|---|---|---|---|---|---|---|---|---|
| 0TH ROW READ/WRITE | C | B=4 A=2 | B=4 A=2 | B=4 A=2 | NC | NC | NC | NC | NC | NC |
| 1ST ROW READ/WRITE | NC | B=3 A=1 | NC | NC | C | B=4 A=2 | B=4 A=2 | NC | NC | NC |
| 2ND ROW READ/WRITE | NC | NC | B=3 A=1 | NC | NC | B=3 A=1 | NC | C | B=4 A=2 | NC |
| 3RD ROW READ/WRITE | NC | NC | NC | B=3 A=1 | NC | NC | B=3 A=1 | NC | B=3 A=1 | C |
| 0TH COLUMN READ/WRITE | C | B=4 A=1 | B=4 A=1 | B=4 A=1 | NC | NC | NC | NC | NC | NC |
| 1ST COLUMN READ/WRITE | NC | B=3 A=2 | NC | NC | C | B=4 A=1 | B=4 A=1 | NC | NC | NC |
| 2ND COLUMN READ/WRITE | NC | NC | B=3 A=2 | NC | NC | B=3 A=2 | NC | C | B=4 A=1 | NC |
| 3RD COLUMN READ/WRITE | NC | NC | NC | B=3 A=2 | NC | NC | B=3 A=2 | NC | B=3 A=2 | C |

C = CONNECT, NC = NO CONNECTION

Figures 1, 2B:
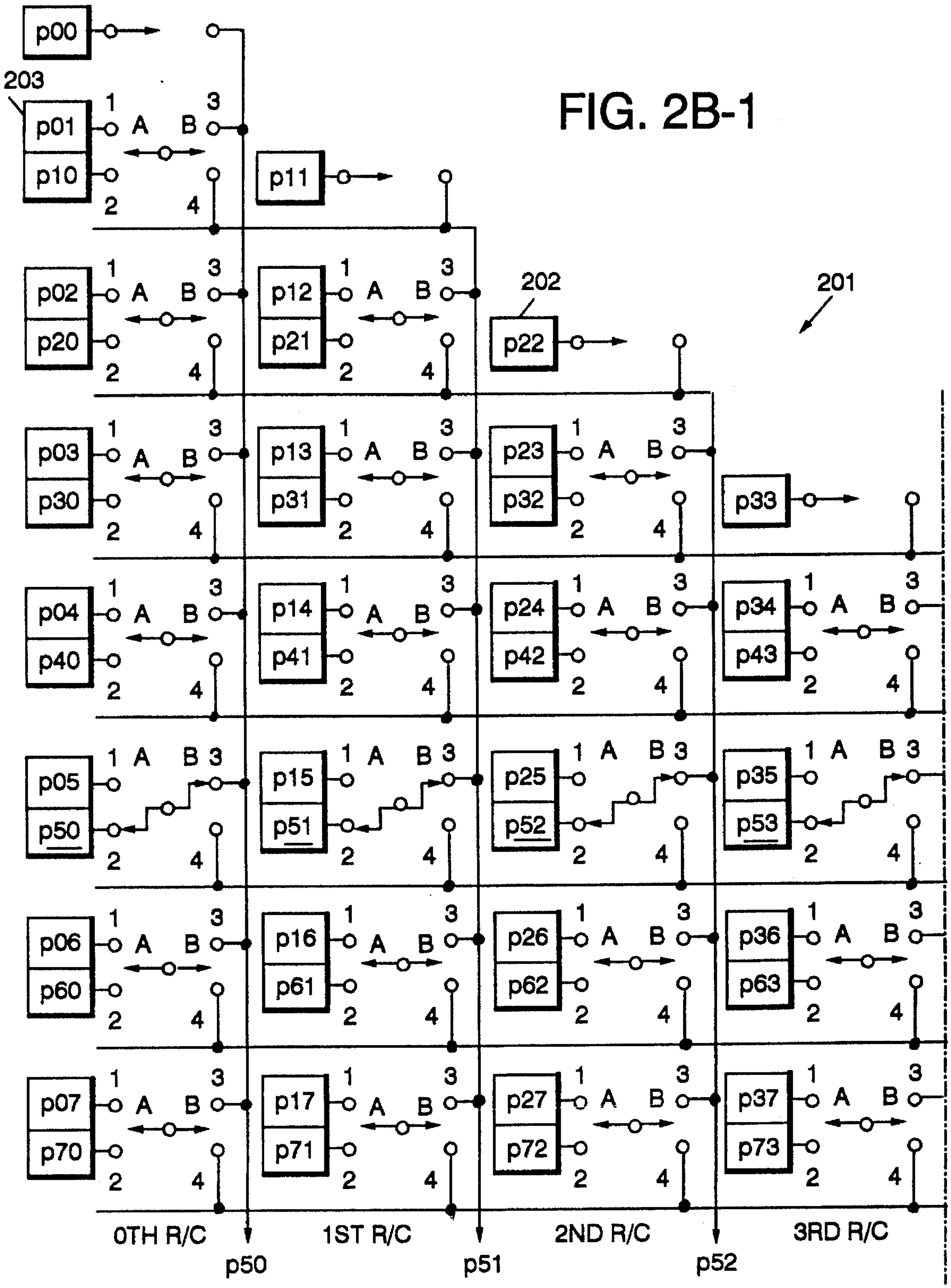
FIG. 2B is a representation of a folded array with the same number of elements as the square array of FIG. 2A showing switching means and buses.
Figures 2, 2B:
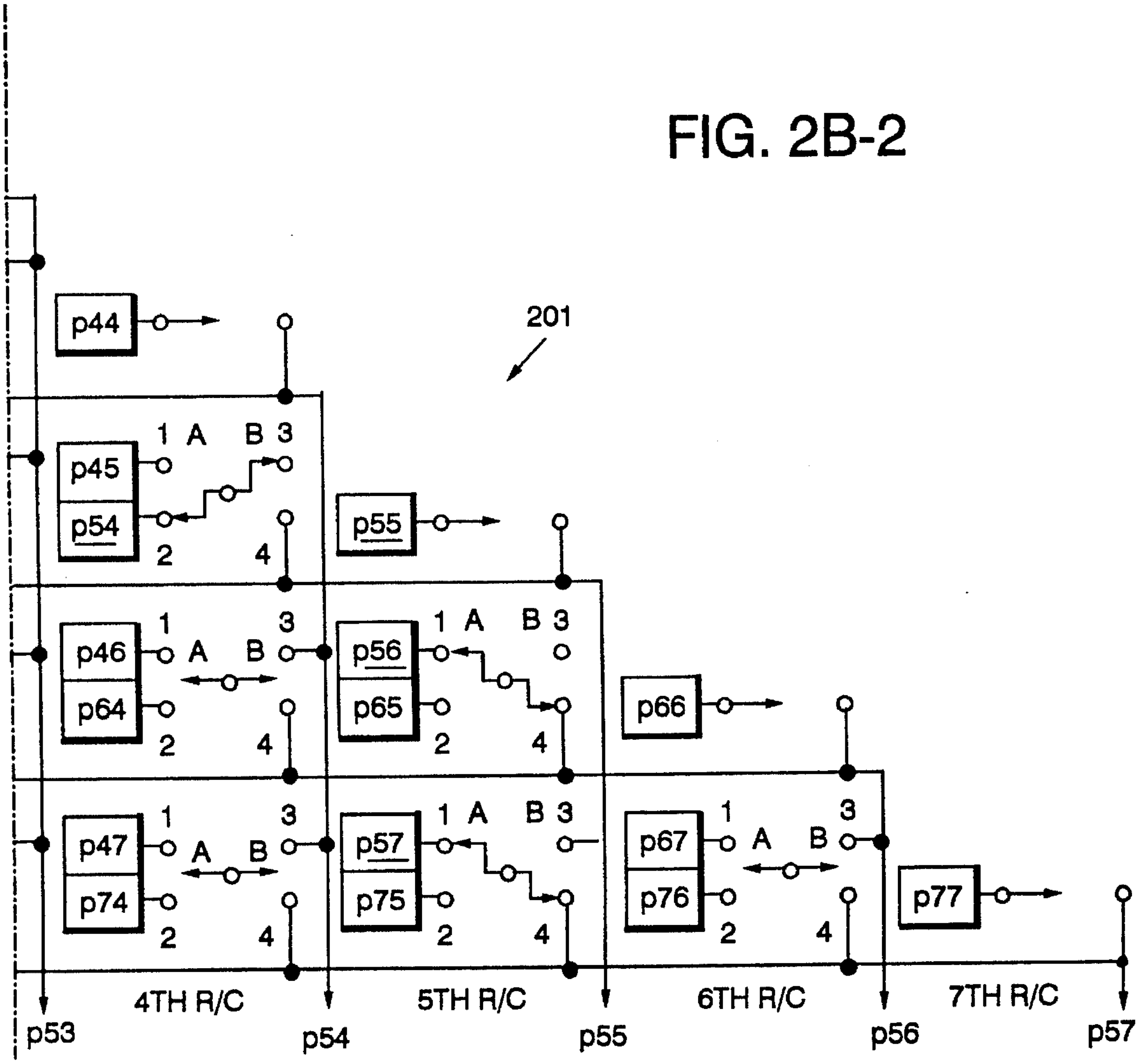

FIG. 2A shows a square memory array 200 similar to the one of FIG. 1A except larger, an 8 by 8 array. FIG. 2B shows a folded array 201 logically arranged and interconnected as if the array of FIG. 2A were folded along the diagonal. This array has two element nodes 203 and single element nodes 202 disposed along the diagonal. Note that regardless of the size of the array an N by N array of single memory nodes folded along the diagonal in this fashion has (N2–N)/2 nodes with two memory elements per node and N nodes with a single element per node. The switches in array 201 are configured to read column 5 of the pixel data.

Figure 3A:
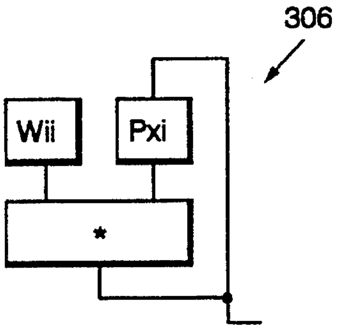
FIG. 3A is a schematic representation of a cell of a folded tree computational array processor which is used with one embodiment of the present invention.
Figure 3B:
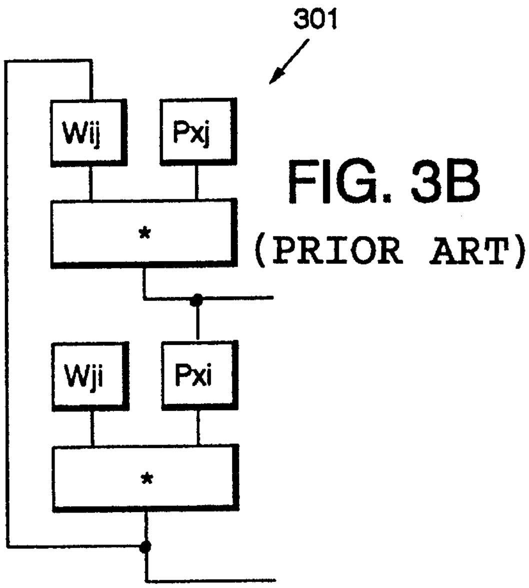
FIG. 3B shows two cells of FIG. 3A connected together.
Figure 3C:
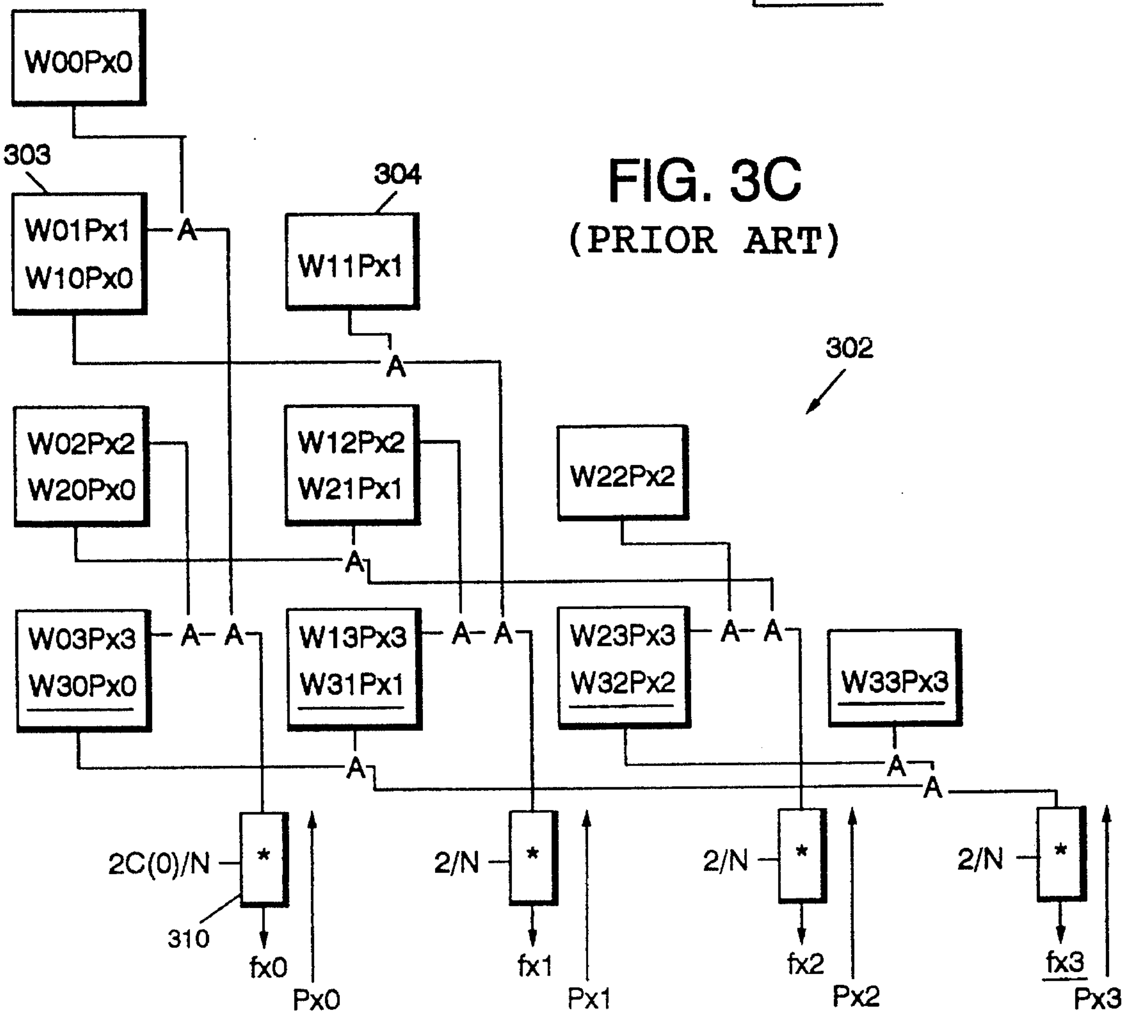
FIG. 3C shows a folded tree computational array processor made up of cells like that shown in FIG. 3A and FIG. 3B.
Figure 4A:
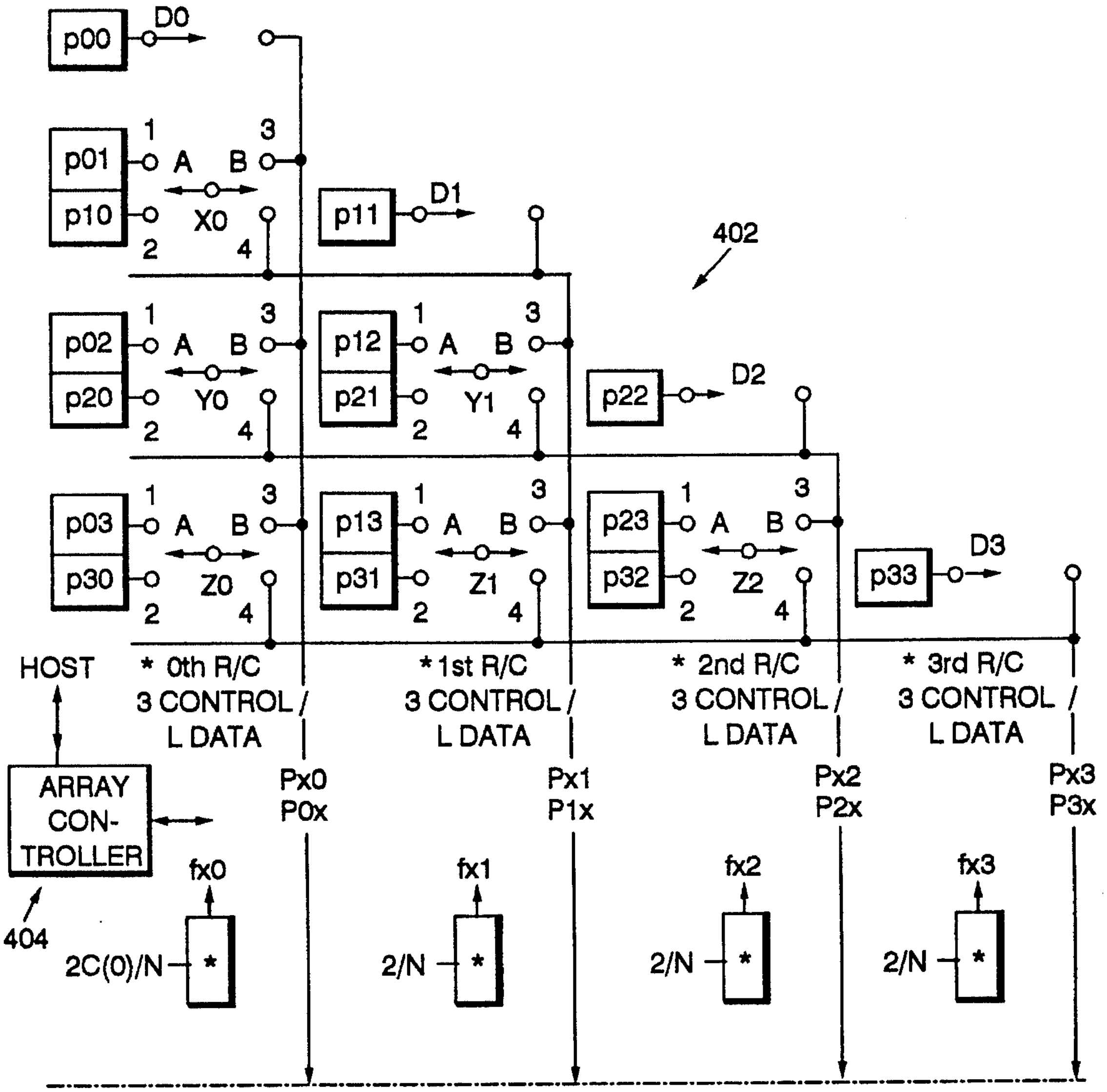
FIG. 4 shows a folded memory array according to the present invention connected to the folded tree computational array processor of FIG. 3C.

FIG. 3A, FIG. 3B and FIG. 3C show a folded tree computational array of the prior art. FIG. 3A shows an individual cell 306 of such a computational array. FIG. 3B shows two cells connected together to form an element 301. FIG. 3C shows an entire array 302 with elements 303 and 304. Using the folded array computational structure of the prior art FIG. 3A, 3B, and 3C, an equation of the following form is calculated for each column "i" of pel data:

$$f_{x,i}=2/N\ ((Wi0*px0)+(Wi,1*px1)+(Wi2*px2)+(Wi3*px3))$$

In FIG. 3C the weight (W) "p" value multiplications for column 3 are underscored. Also in FIG. 3C, the summations are implemented with binary trees with each tree summation node indicated by the letter "A". The binary trees, termed communicating adder trees, allow summation of the leaf nodes to root nodes 310 in one mode and communication of values from root nodes 310 to the leaf nodes in another mode. The diagonal-cell, FIG. 3A, is associated with the elements, Wii*pxi, and the general-cell, FIG. 3B, is associated with the rest of the elements Wij, pxj where i is not equal to j and contains two elements, symbolically shown in FIG. 3B and FIG. 3C in a top and bottom arrangement of elements. Assuming the nodes are initialized as shown in FIG. 3C, the diagonal cell multiplies its stored weight with its stored pixel value and supplies the multiplied result to the attached tree. The general-cells of the structure generate two weight times pixel value products and supply the two products to their attached trees. The folded trees operate on the "cell" products generating a set of N converged sums at the roots of the binary trees. The converged sums are then operated upon depending upon the functional requirements. For example, the converged sums can be multiplied by a constant as indicated in FIG. 3C. The requirement to communicate values and pixel values to the computational nodes of the array is briefly reviewed here using the cells FIG. 3A and FIG. 3B. The pixel values are supplied to the roots of the binary trees, for example, px0, px1, px2, and px3 FIG. 3C. These pixel values traverse the communicating adder trees from root to leaf nodes bypassing the summation units "A" in the process. In the communications mode for the "diagonal-cells", a pixel value is received from the attached tree and stored into an internal pixel value register. In the communications mode for the general-cells, a pixel value received from the bottom tree is stored into the top Pxj value register and likewise a pixel value received from the top tree will be stored into the bottom Pxi value register.

Figures 1, 11A:
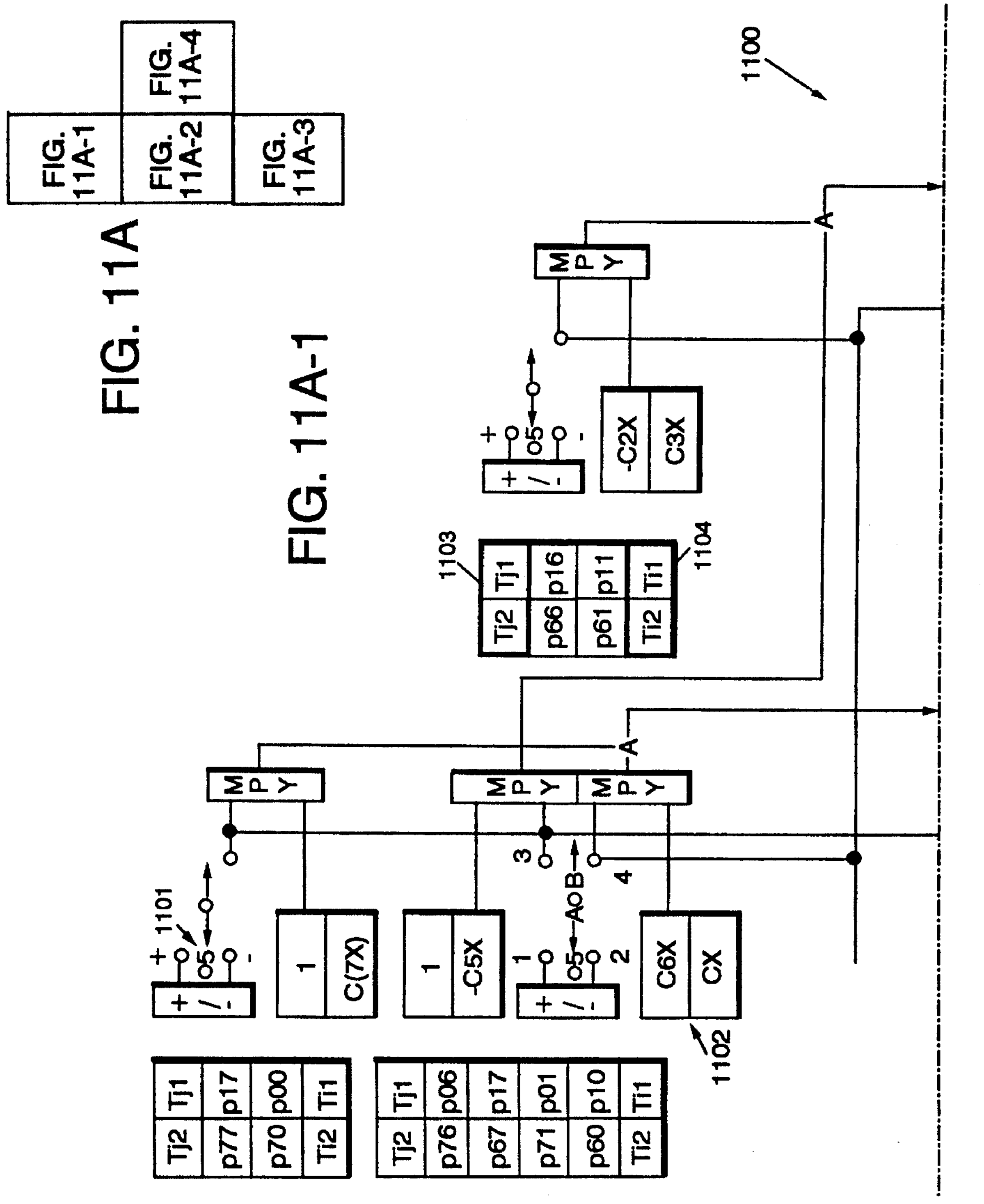
FIG. 11A is a schematic representation of a processor array for performing inverse direct cosine transforms.
Figures 2, 11A:
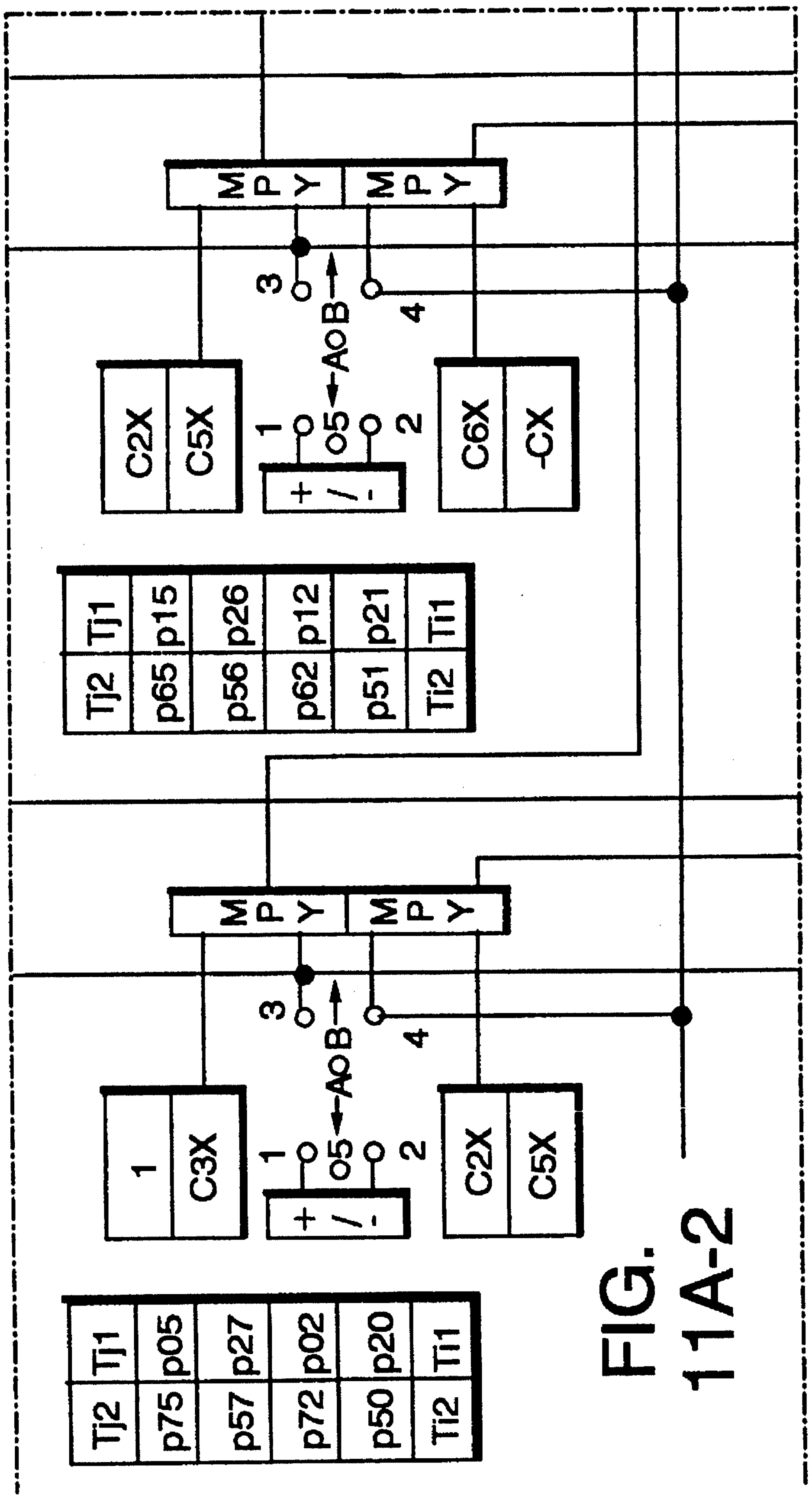
Figures 3, 11A:
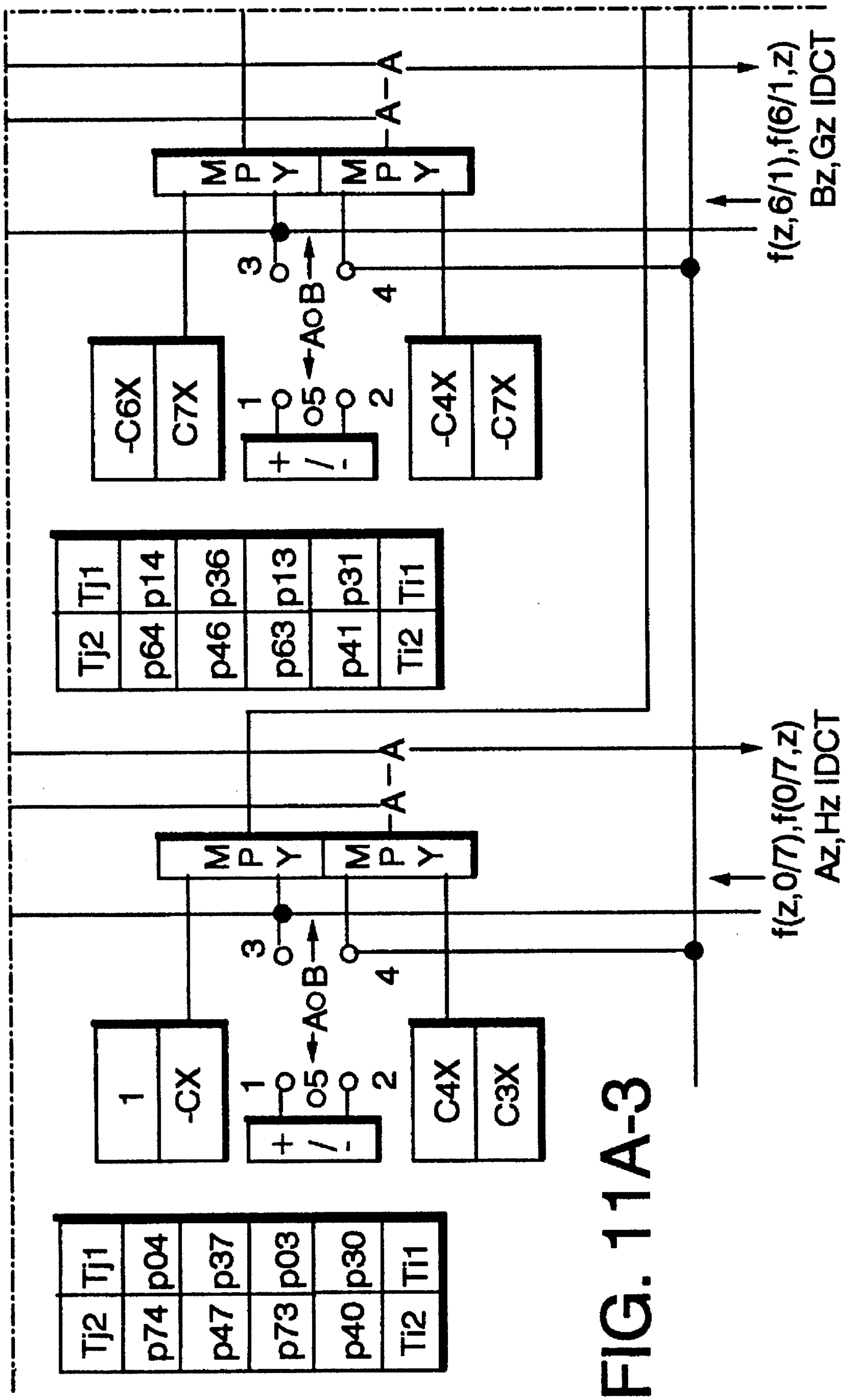
Figures 4, 11A:
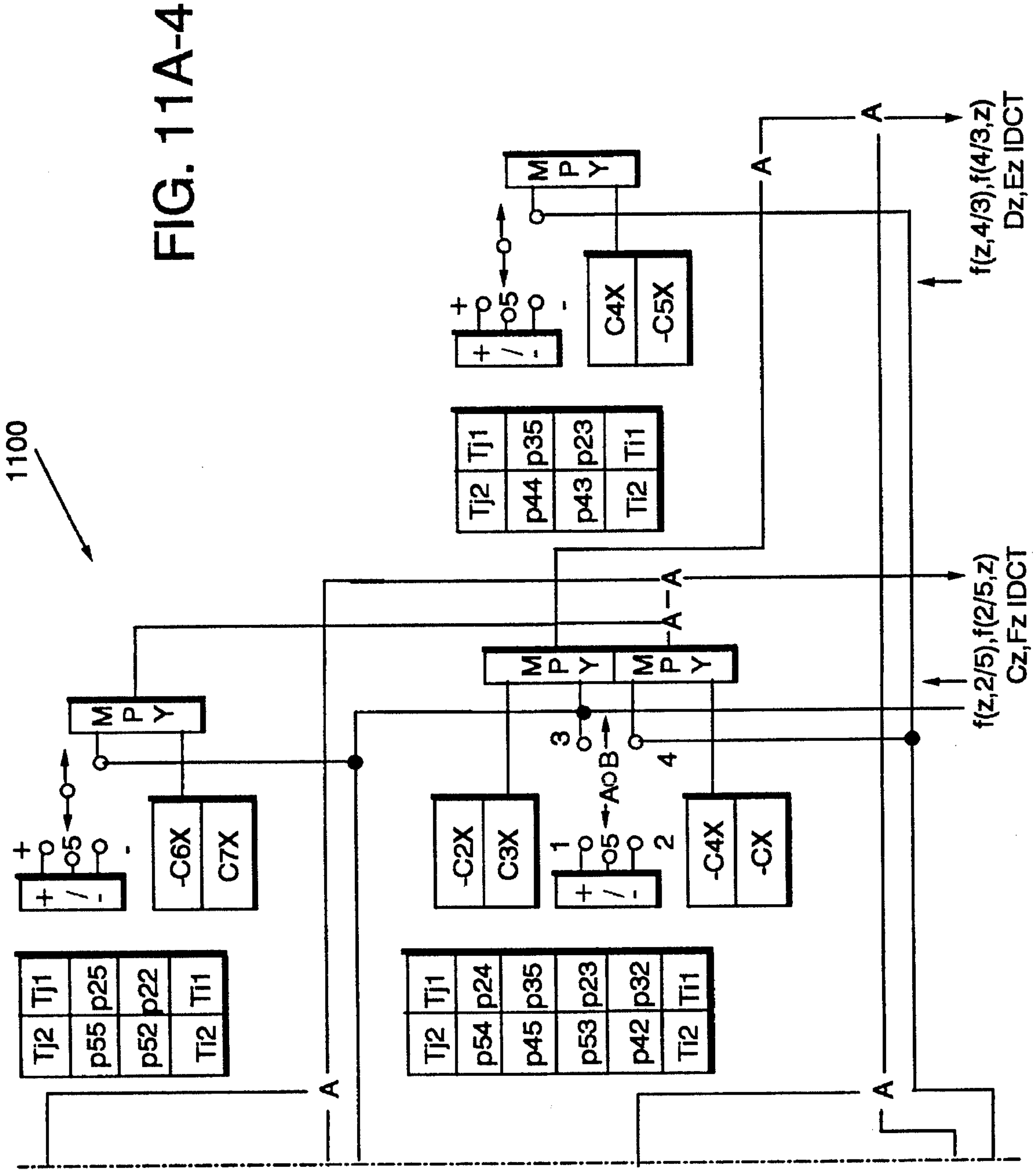

FIG. 4 shows a folded memory 402 as previously described interconnected with the folded tree computational array 403. The buses of the two are interconnected at points 401. The folded memory 402 can be considered a source for data, e.g. pixel values, required by the folded computational array 403 as depicted in FIG. 4. An array controller 404 provides the control signals that selects a column "x" of the folded memory 402, reads the column data providing the memory node values to the output buses px0, px1, px2, and px3, sets switches 401 s1, s2, s3, and s4 to connect between points 2 and 3, and sets the communicating adder trees in the folded computation array 403 to communication mode. A path is thereby created allowing the four data bus values to reach the leaf nodes of each of the four communicating adder trees. The px0 . . . px3 values are then loaded into the proper data value register in each dual computation nodes by receiving the values from each tree's leaf nodes into the other computation node of the dual computation node pairs and to be loaded into the data value register of the diagonal computation nodes.

The folded computation array 403 is shown in FIG. 4 loaded with the xth column data values, e.g. Px0 . . . Px3. The weighting values Wij, stored in local node memory e.g. Read Only Memory, or initialized in Random Access Memory via Host control are then used as an operand along with the received data values Px0 . . . Px3 operands as input to the computational array multipliers located in each node. The array controller then places the switches 401 s1, s2, s3, and s4 to connect between points 1 and 3, the communicating adder trees into summation mode, and the array multiplication sequence is initiated. The results of the multiplications are provided to the communicating adder trees at their leaf nodes as inputs and the trees generate a sum of product result at their root nodes. These sum of product results may then require further operations.

The further operations can include a multiplication by a constant as indicated in FIG. 4 before generating the output results on buses fx0, fx1, fx2, and fx3. Depending upon the application the output bus results can be selectively read by the host or possibly stored in the folded memory array if appropriate. Alternative implementations of the array controller 404 can be found in U.S. Pat. No. 5,325,464 Pechanek et al. which is incorporated herein by reference.

Figure 5A:
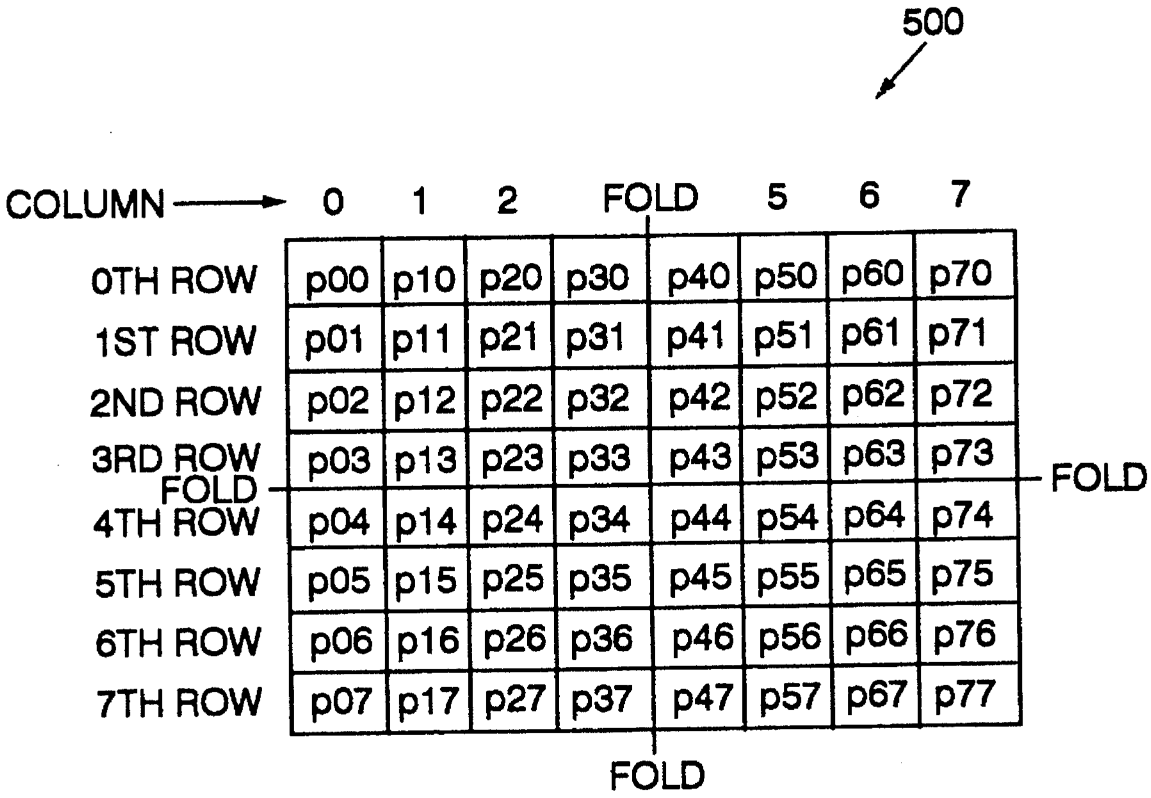
FIG. 5A shows a square memory array with logical "folds" according to this invention indicated.
Figure 5B:
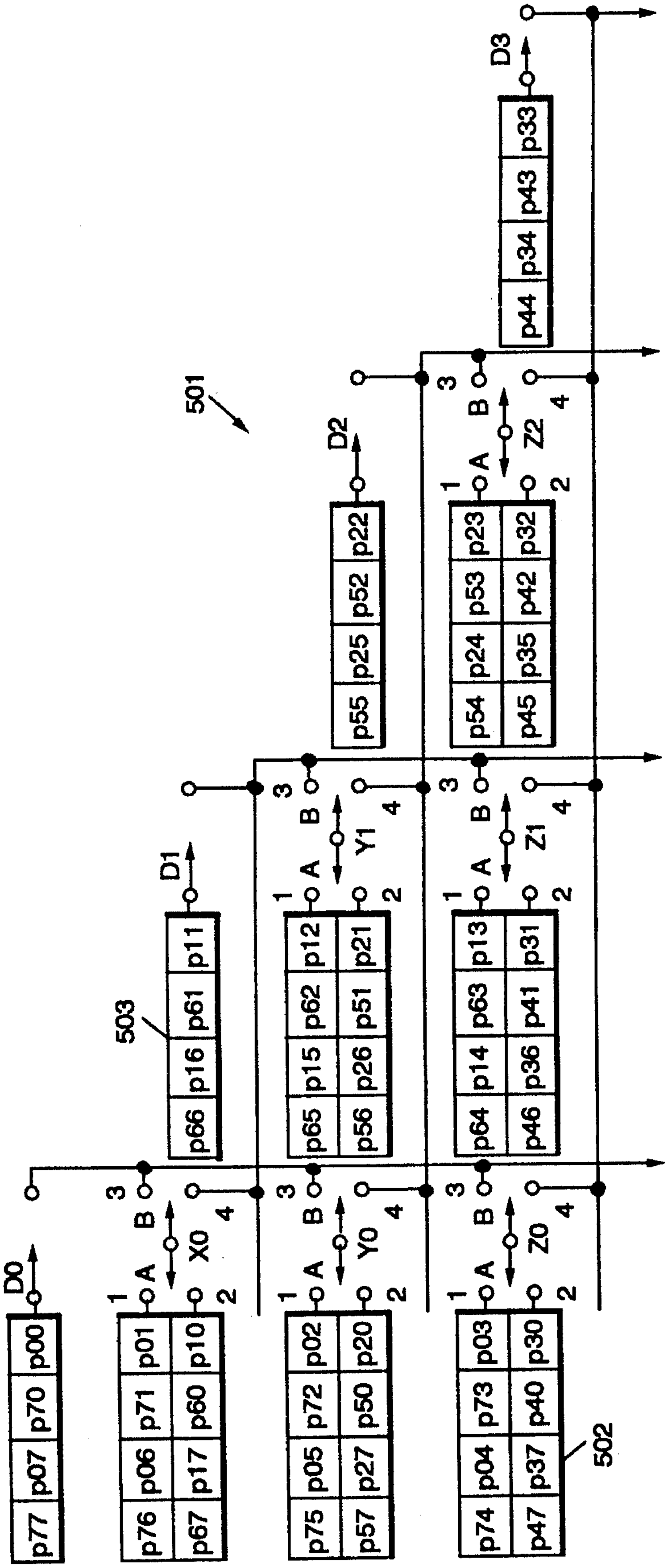
FIG. 5B shows a transposed, folded array with the same number of memory elements as the square memory array of FIG. 5A.

FIG. 5A shows an 8 by 8 square array 500 similar to those previously discussed. FIG. 5B shows a folded array 501 according to this invention that is constructed as if the square array 500 were logically folded along the diagonal only after the square array 500 were folded along the lines marked "FOLD" in quarters so that a four 4 by 4 square array of nodes with four elements per node in each quarter array were formed first and then folded over each other. In this case nodes 502 having 8 elements per node and nodes 503 having four elements per node would be interconnected by buses and switches. Note that all data buses are "L" bits long, allowing for bit-serial or word parallel configurations. Connection mechanisms, logically depicted as switches, are used with the multiple pixel data storage cells to allow connection to the buses. The folded structure has the ability to read/write rows or columns under simple control mechanisms. The switch settings required to read out each row or column are indicated in TABLE 2 and the data pattern that can be read out for each row and column switch setting is indicated in TABLE 3.

TABLE 2

| SWITCHES▸ | D0 | X0 | Y0 | Z0 | D1 | Y1 | Z1 | D2 | Z2 | D3 |
|---|---|---|---|---|---|---|---|---|---|---|
| 0TH/7TH ROW READ/WRITE | C | B=4 A=2 | B=4 A=2 | B=4 A=2 | NC | NC | NC | NC | NC | NC |
| 1ST/6TH ROW READ/WRITE | NC | B=3 A=1 | NC | NC | C | B=4 A=2 | B=4 A=2 | NC | NC | NC |

TABLE 2-continued

| SWITCHES▸ | D0 | X0 | Y0 | Z0 | D1 | Y1 | Z1 | D2 | Z2 | D3 |
|---|---|---|---|---|---|---|---|---|---|---|
| 2ND/5TH ROW READ/WRITE | NC | NC | B=3 A=1 | NC | NC | B=3 A=1 | NC | C | B=4 A=2 | NC |
| 3RD/4TH ROW READ/WRITE | NC | NC | NC | B=3 A=1 | NC | NC | B=3 A=1 | NC | B=3 A=1 | C |
| 0TH/7TH COLUMN READ/WRITE | C | B=4 A=1 | B=4 A=1 | B=4 A=1 | NC | NC | NC | NC | NC | NC |
| 1ST/6TH COLUMN READ/WRITE | NC | B=3 A=2 | NC | NC | C | B=4 A=1 | B=4 A=1 | NC | NC | NC |
| 2ND/5TH COLUMN READ/WRITE | NC | NC | B=3 A=2 | NC | NC | B=3 A=2 | NC | C | B=4 A=1 | NC |
| 3RD/4TH COLUMN READ/WRITE | NC | NC | NC | B=3 A=2 | NC | NC | B=3 A=2 | NC | B=3 A=2 | C |

TABLE 3

| | | | | | |
|---|---|---|---|---|---|
| 7th ROW READ | 2nd HALF | p77 | p67 | p57 | p47 |
| 7th ROW READ | 1st HALF | p07 | p17 | p27 | p37 |
| . | | . | . | . | . |
| . | | . | . | . | . |
| . | | . | . | . | . |
| 1st ROW READ | 2nd HALF | p71 | p61 | p51 | p41 |
| 1st ROW READ | 1st HALF | p01 | p11 | p21 | p31 |
| 0th ROW READ | 2nd HALF | p70 | p60 | p50 | p40 |
| 0th ROW READ | 1st HALF | p00 | p10 | p20 | p30 |
| 7th COLUMN READ | 2nd HALF | p77 | p76 | p75 | p74 |
| 7th COLUMN READ | 1st HALF | p70 | p71 | p72 | p73 |
| . | | . | . | . | . |
| . | | . | . | . | . |
| . | | . | . | . | . |
| 1st COLUMN READ | 2nd HALF | p17 | p16 | p15 | p14 |
| 1st COLUMN READ | 1st HALF | p10 | p11 | p12 | p13 |
| 0th COLUMN READ | 2nd HALF | p07 | p06 | p05 | p04 |
| 0th COLUMN READ | 1st HALF | p00 | p01 | p02 | p03 |

In FIG. 5B, the affected row/column switches are set as indicated in TABLE 2 by the appropriate row/column (R/C) control lines that are associated with each bus, while the other switches in the structure are placed in a not connected state, also indicated in Table 2. The switches on the multiple memory element dual nodes connect the B side of the switch to one of the two points, 3 or 4, and the A side of the switch to one of the two points, 1 or 2, according to Table 2. The diagonal switches are either connected or not connected as indicated in Table 2, where C indicates a connection and NC indicates no connection. The switches D0, D1, D2, D3, X0, Y0, Y1, Z0, Z1, and Z2 are controlled such that for Row read or write operations whenever B is connected to 3 then A is connected to 1, and whenever B is connected to 4 then A is connected to 2. For Column read or write operations whenever B is connected to 3 then A is connected to 2 and whenever B is connected to 4 then A is connected to 1.

Figure 6B:
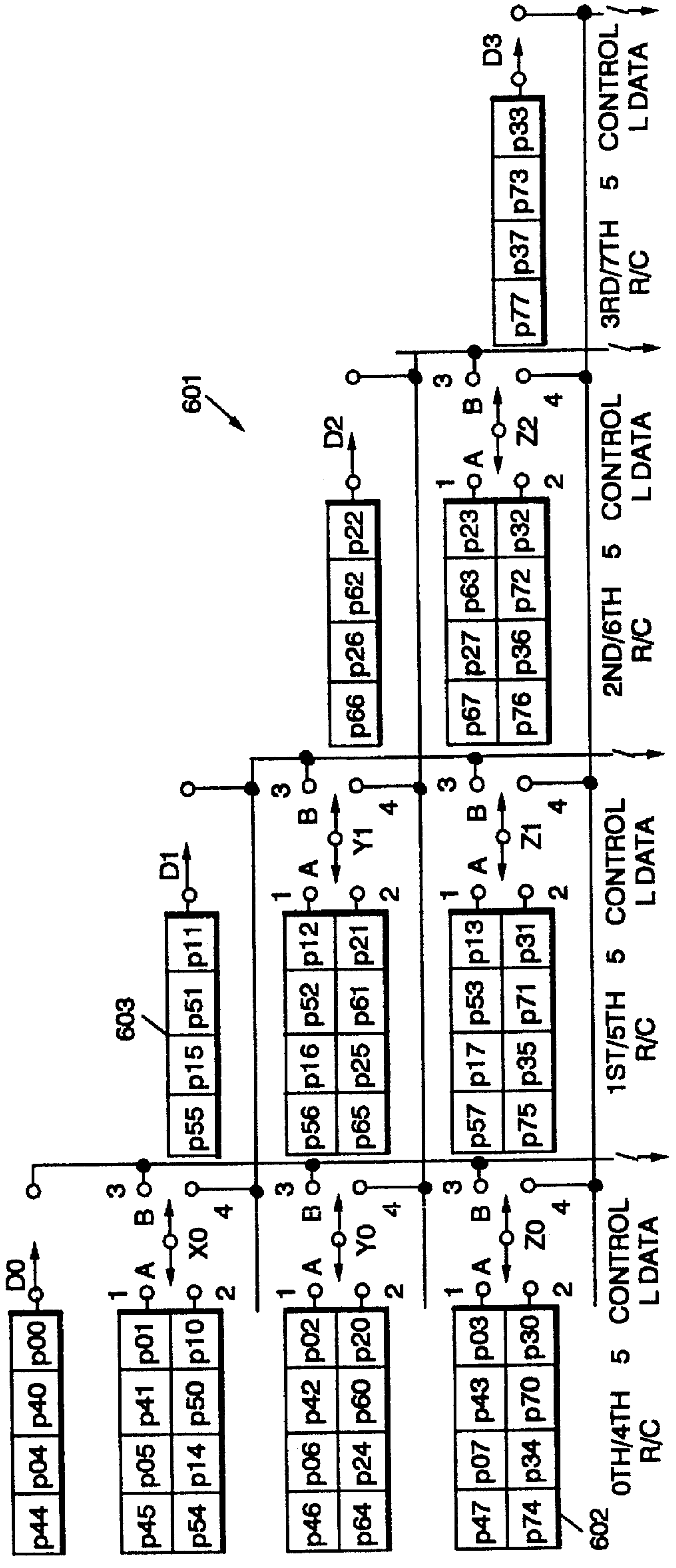
FIG. 6B shows a transposed, folded array with the same number of memory elements as the square memory array of FIG. 6A.

FIG. 6A shows a square array 600 like that of array 500 of FIG. 5A, except this array is marked indicating it will be cut and the quarters overlain on top of each other rather than folded. FIG. 6B shows the folded array 601 constructed to correspond to an array 600 cut and overlain and then folded on the diagonal. Note the different row and column markings for the various elements in the array 601 of FIG. 6B and the array 501 of FIG. 5B. Array 601 of FIG. 6B is logically cut and overlain from an 8 by 8 square array and has four element nodes 603 and eight element nodes 602. Note that all data buses are "L" bits long, allowing for bit-serial or word parallel configurations. Connection mechanisms, logically depicted as switches, are used with the multiple pixel data storage cells to allow connection to the buses. The folded structure has the ability to read/write rows or columns under simple control mechanisms. The switch settings required to read out each row or column are indicated in TABLE 4 and the data pattern that can be read out for each row and column switch setting is indicated in TABLE 5.

TABLE 4

| SWITCHES▸ | D0 | X0 | Y0 | Z0 | D1 | Y1 | Z1 | D2 | Z2 | D3 |
|---|---|---|---|---|---|---|---|---|---|---|
| 0TH/4TH ROW READ/WRITE | C | B=4 A=2 | B=4 A=2 | B=4 A=2 | NC | NC | NC | NC | NC | NC |
| 1ST/5TH ROW READ/WRITE | NC | B=3 A=1 | NC | NC | C | B=4 A=2 | B=4 A=2 | NC | NC | NC |
| 2ND/6TH ROW READ/WRITE | NC | NC | B=3 A=1 | NC | NC | B=3 A=1 | NC | C | B=4 A=2 | NC |
| 3RD/7TH ROW READ/WRITE | NC | NC | NC | B=3 A=1 | NC | NC | B=3 A=1 | NC | B=3 A=1 | C |
| 0TH/4TH COLUMN READ/WRITE | C | B=4 A=1 | B=4 A=1 | B=4 A=1 | NC | NC | NC | NC | NC | NC |
| 1ST/5TH COLUMN READ/WRITE | NC | B=3 A=2 | NC | NC | C | B=4 A=1 | B=4 A=1 | NC | NC | NC |
| 2ND/6TH COLUMN READ/WRITE | NC | NC | B=3 A=2 | NC | NC | B=3 A=2 | NC | C | B=4 A=1 | NC |
| 3RD/7TH | NC | NC | NC | B=3 A=2 | NC | NC | B=3 A=2 | NC | B=3 A=2 | C |

TABLE 4-continued

| SWITCHES▸ | D0 | X0 | Y0 | Z0 | D1 | Y1 | Z1 | D2 | Z2 | D3 |
|---|---|---|---|---|---|---|---|---|---|---|
| COLUMN READ/WRITE | | | | | | | | | | |

TABLE 5

| | | | | | |
|---|---|---|---|---|---|
| 7th ROW READ | 2nd HALF | p47 | p57 | p67 | p77 |
| 7th ROW READ | 1st HALF | p07 | p17 | p27 | p37 |
| . | | . | . | . | . |
| . | | . | . | . | . |
| . | | . | . | . | . |
| 1st ROW READ | 2nd HALF | p41 | p51 | p61 | p71 |
| 1st ROW READ | 1st HALF | p01 | p11 | p21 | p31 |
| 0th ROW READ | 2nd HALF | p40 | p50 | p60 | p70 |
| 0th ROW READ | 1st HALF | p00 | p10 | p20 | p30 |
| 7th COLUMN READ | 2nd HALF | p74 | p75 | p76 | p77 |
| 7th COLUMN READ | 1st HALF | p70 | p71 | p72 | p73 |
| . | | . | . | . | . |
| . | | . | . | . | . |
| . | | . | . | . | . |
| 1st COLUMN READ | 2nd HALF | p14 | p15 | p16 | p17 |
| 1st COLUMN READ | 1st HALF | p10 | p11 | p12 | p13 |
| 0th COLUMN READ | 2nd HALF | p04 | p05 | p06 | p07 |
| 0th COLUMN READ | 1st HALF | p00 | p01 | p02 | p03 |

In FIG. 6B, the affected row/column switches are set as indicated in Table 4 by the appropriate row/column (R/C) control lines that are associated with each bus, while the other switches in the structure are placed in a not connected state, also indicated in TABLE 4. The switches on the multiple memory element dual nodes connect the B side of the switch to one of the two points, 3 or 4, and the A side of the switch to one of the two points, 1 or 2, according to TABLE 4. The diagonal switches are either connected or not connected as indicated in TABLE 4, where C indicates a connection and NC indicates no connection. The switches D0, D1, D2, D3, X0, Y0, Y1, Z0, Z1, and Z2 are controlled such that for row read or write operations whenever B is connected to 3 then A is connected to 1, and whenever B is connected to 4 then A is connected to 2. For column read or write operations whenever B is connected to 3 then A is connected to 2 and whenever B is connected to 4 then A is connected to 1.

Figure 7B:
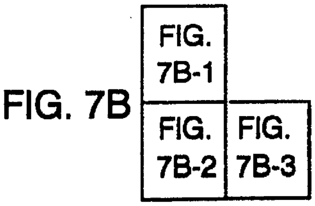
FIG. 7B shows a transposed, folded array with the same number of memory elements as the square array of FIG. 7A, configured as if the square array of FIG. 7A were folded in quarters twice.
Figures 1, 7B:
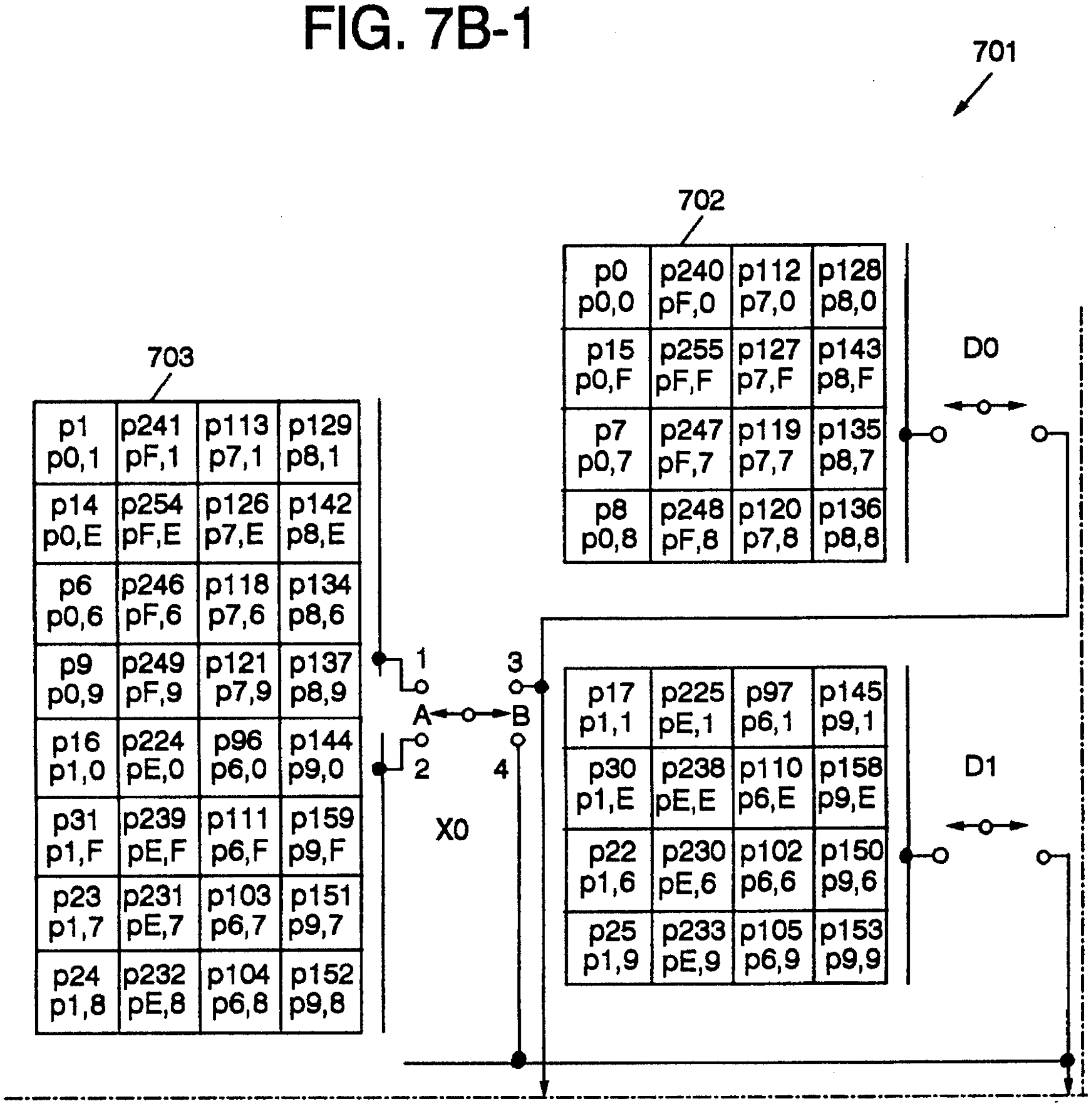
Figures 2, 7B:
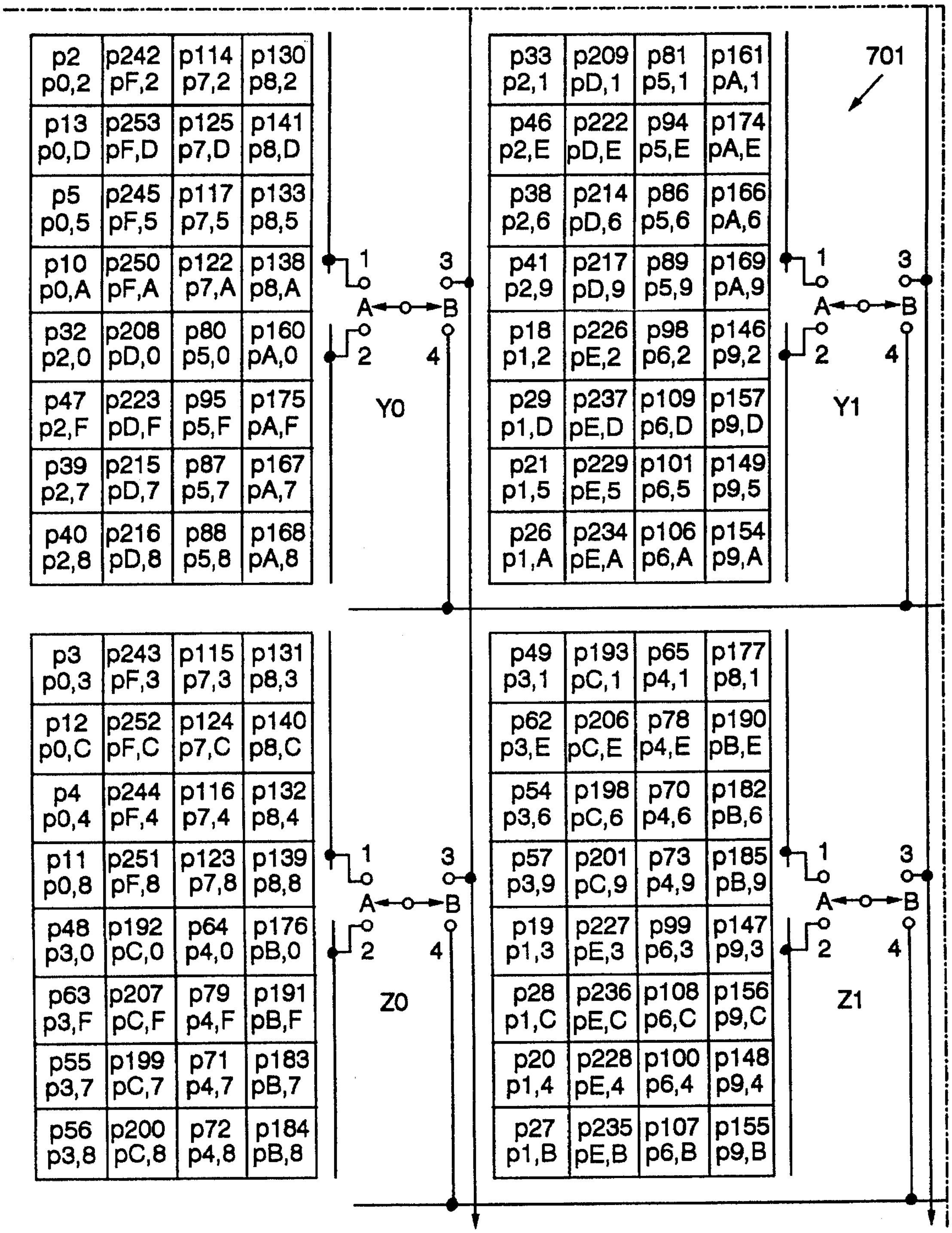
Figures 3, 7B:
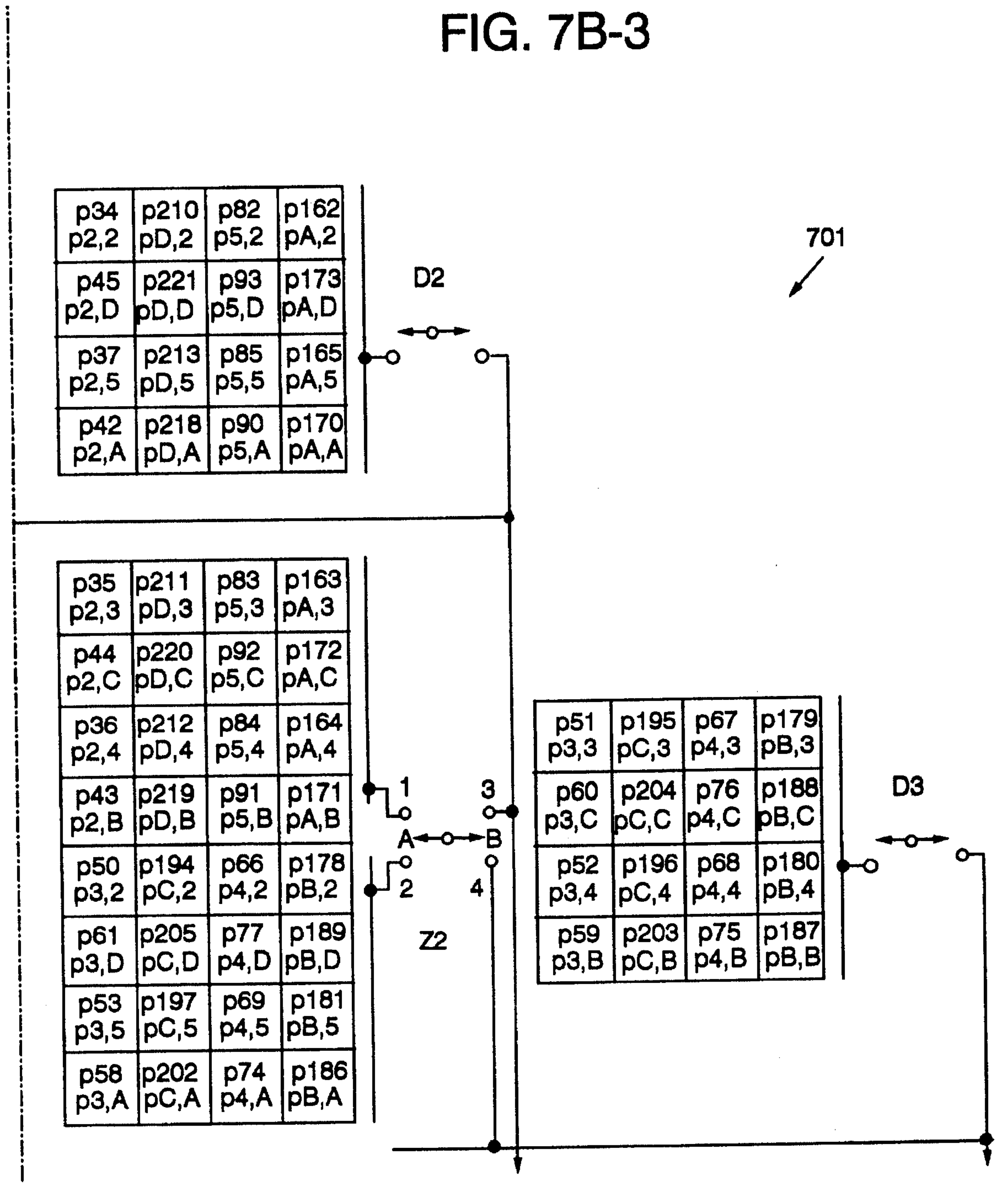

FIG. 7A shows a 16 by 16 square array of single memory elements 700 with folds indicated. FIG. 7B shows a folded array 701 constructed so as to logically correspond with folding the square array 700 along the indicated folds, and then folding the resulting 8 by 8 node array where each node contains 4 memory elements along the similar horizontal and vertical folds so that a 4 by 4 square array of nodes each having sixteen memory elements is formed. This resulting square array is then folded along the diagonal as before creating the array as shown in FIG. 7B. The resulting folded array 701 now has 32 element nodes 703 arranged in a triangular fashion and 16 element nodes 702 disposed along the diagonal. This same diagonal folded organization of multiple memory nodes can be realized by logically cutting and overlaying the square array 700 twice in both vertical and horizontal planes, for example, two cuts, then overlay four subarrays, followed by two more cuts, and then overlay four subarrays, and then folding the resultant 4 by 4 array on the diagonal, the row and column correspondence of memory elements between the folded versus cut-overlay-diagonal-fold organization would be different.

Note that all data buses are "L" bits long, allowing for bit-serial or word parallel configurations. Connection mechanisms, logically depicted as switches, are used with the multiple pixel data storage cells to allow connection to the buses. The folded structure has the ability to read/write rows or columns under simple control mechanisms. The switch settings required to read out each row or column are indicated in TABLE 6.

TABLE 6

| SWITCHES▸ | D0 | X0 | Y0 | Z0 | D1 | Y1 | Z1 | D2 | Z2 | D3 |
|---|---|---|---|---|---|---|---|---|---|---|
| 0th,7th,8th,Fth ROW READ/WRITE | C | B=4 A=2 | B=4 A=2 | B=4 A=2 | NC | NC | NC | NC | NC | NC |
| 1st,6th,9th,Eth ROW READ/WRITE | NC | B=3 A=1 | NC | NC | C | B=4 A=2 | B=4 A=2 | NC | NC | NC |
| 2nd,5th,Ath,Dth ROW READ/WRITE | NC | NC | B=3 A=1 | NC | NC | B=3 A=1 | NC | C | B=4 A=2 | NC |
| 3rd,4th,Bth,Cth ROW READ/WRITE | NC | NC | NC | B=3 A=1 | NC | NC | B=3 A=1 | NC | B=3 A=1 | C |
| 0th,7th,8th,Fth COLUMN READ/WRITE | C | B=4 A=1 | B=4 A=1 | B=4 A=1 | NC | NC | NC | NC | NC | NC |
| 1st,6th,9th,Eth COLUMN READ/WRITE | NC | B=3 A=2 | NC | NC | C | B=4 A=1 | B=4 A=1 | NC | NC | NC |
| 2nd,5th,Ath,Dth COLUMN READ/WRITE | NC | NC | B=3 A=2 | NC | NC | B=3 A=2 | NC | C | B=4 A=1 | NC |
| 3rd,4th,Bth,Cth COLUMN READ/WRITE | NC | NC | NC | B=3 A=2 | NC | NC | B=3 A=2 | NC | B=3 A=2 | C |

In FIG. 7B, the affected row/column switches are set as indicated in Table 6 by the appropriate row/column (R/C) control lines that are associated with each bus, while the other switches in the structure are placed in a not connected state, also indicated in Table 6. The switches on the multiple memory element dual nodes connect the B side of the switch to one of the two points, 3 or 4, and the A side of the switch to one of the two points, 1 or 2, according to TABLE 6. The diagonal switches are either connected or not connected as indicated in Table 6, where C indicates a connection and NC indicates no connection. The switches D0, D1, D2, D3, X0, Y0, Y1, Z0, Z1, and Z2 are controlled such that for Row read or write operations whenever B is connected to 3 then A is connected to 1, and whenever B is connected to 4 then A is connected to 2. For column read or write operations whenever B is connected to 3 then A is connected to 2 and whenever B is connected to 4 then A is connected to 1. It can be easily seen that the number of elements in the nodes and the numbers of nodes in an array logically folded in this matter can be generalized as follows.

In a folded array, the memory is logically folded along the diagonal as previously described; however, only after logically folding or logically cutting an M by M square array of X memory elements per node into N by N subarrays, where N<M and M is divisible by N. After these first logical cuttings or logical foldings, the subarrays of the original M by M square array are overlain so that a N by N square array of nodes is obtained with $((M/N)^2)X$ memory elements per node. In FIG. 7B, this logical folding is done in 2 steps for the 16 by 16 array of FIG. 7A. This square array of nodes is then logically folded along the diagonal. Thus a transposed folded memory array is formed by partitioning up the M by M array into N by N subarrays, logically folding or logically cutting and overlaying the subarrays to a single N by N array and then folding the N by N array along the diagonal. If M is divisible by kN where kN<M then a transposed folded memory can also be formed by partitioning up the M by M array into kN by kN subarrays, logically folding or logically cutting and overlaying the subarrays into a single kN by kN array, then partitioning up the k*N by k*N array into N by N subarrays, logically folding or logically cutting and overlaying the subarrays to a single N by N array and then folding the N by N array along the diagonal. This procedure is extendable to multiple partitioning, folding, and cutting-overlaying steps. The resultant array is made up of (N2–N)/2 nodes each having $2((M/N)^2)X$ interconnected memory elements and N nodes each having $((M/N)^2)X$ interconnected memory elements disposed along the diagonal of a triangular array organization. The resulting array consists of nodes interconnected by buses and switches.

Figures 1, 8A:
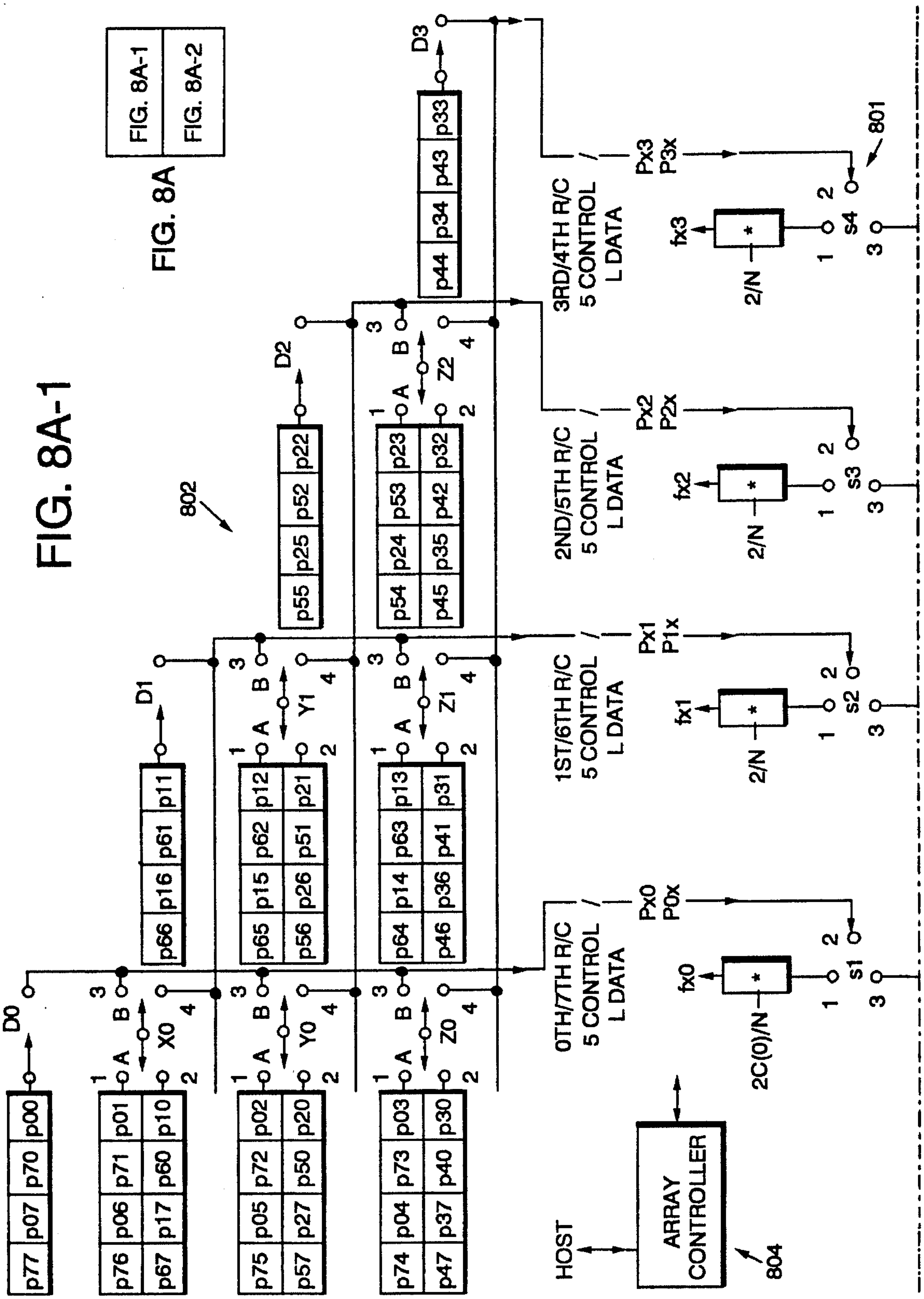
FIG. 8A shows a transposed, folded memory array connected to a folded tree computational array processor using four by four subarrays which each have the same weight.
Figures 2, 8A:
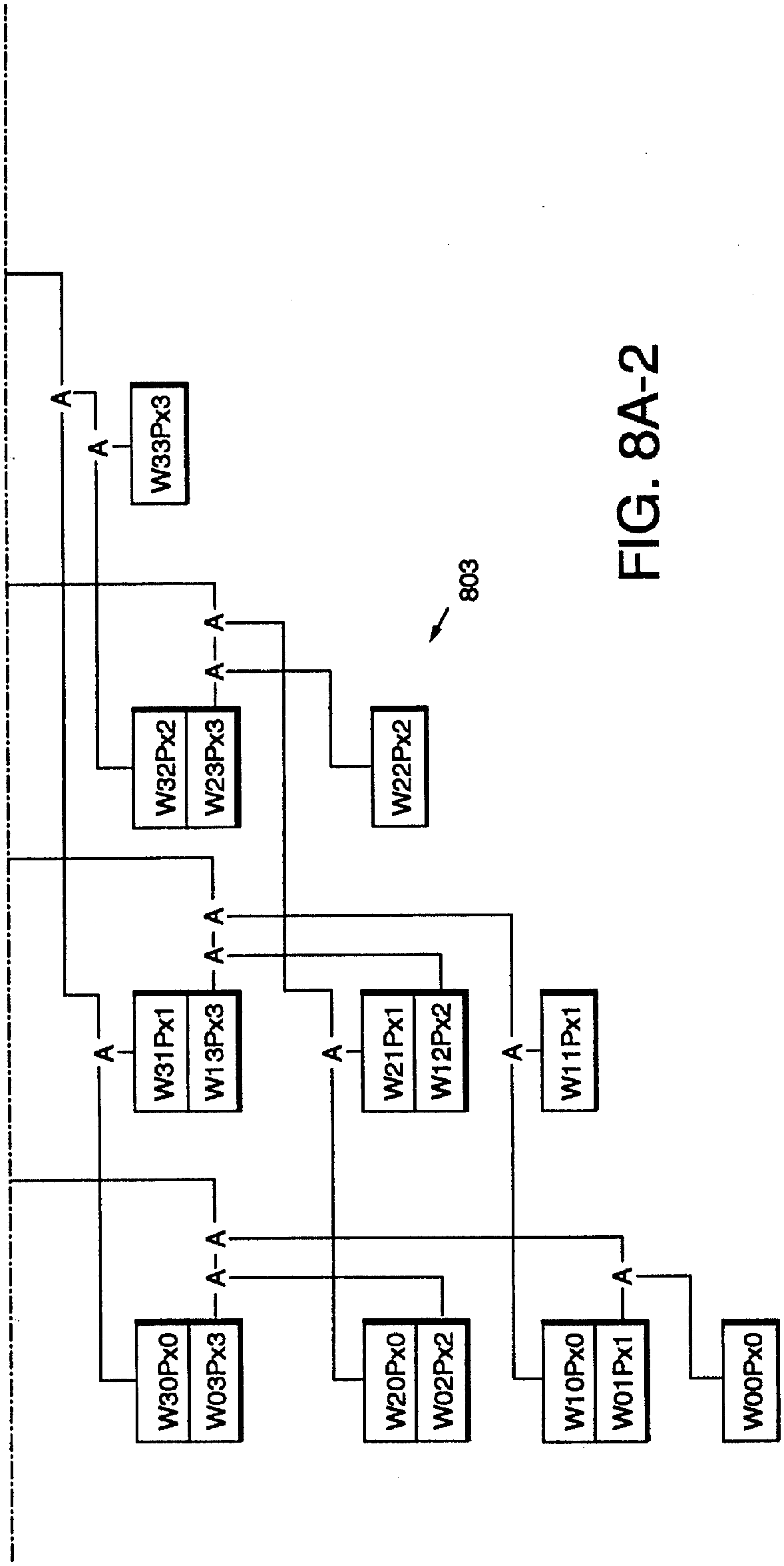

FIG. 8A shows how a folded array as described above can be interconnected with a computational processor array. This organization provides processing for four 4 by 4 subarrays that use the same Weights Wij for each 4 by 4 sub array. The buses of the two arrays are interconnected at 801. The folded memory 802 can be considered a source for data, e.g. pixel values, required by the folded computational array 803 as depicted in FIG. 8A. An array controller 804 provides the control signals that selects half of a column "x" of the folded memory 802, reads the half of the column data providing the memory node values to the output buses px0, px1, px2, and px3 (px4, px5, px6, and px7 for the other half of the column x), sets switches 801 s1, s2, s3, and s4 to connect between points 2 and 3, and sets the communicating adder trees in the folded computation array 803 to communication mode. A path is thereby created allowing the four data bus values to reach the leaf nodes of each of the four communicating adder trees. The px0 . . . px3 values are then loaded into the proper data value register in each dual computation nodes by receiving the values from each trees' leaf nodes into the other computation node of the dual computation node pairs and to be loaded into the data value register of the diagonal computation nodes. The folded computation array 803 is shown in FIG. 8A loaded with the half of the xth column data values, e.g. px0 . . . px3. The weighting values Wij, stored in local node memory e.g. Read Only Memory, or initialized in Random Access Memory via host control are then used as an operand along with the received data values px0 . . . px3 operands as input to the computational array multipliers located in each node. The array controller then places the switches 801 s1, s2, s3, and s4 to connect between points 1 and 3, the communicating adder trees into summation mode, and the array multiplication sequence is initiated.

The results of the multiplications are provided to the communicating adder trees at their leaf nodes as inputs and the trees generate a sum of product result at their root nodes. These sum of product results may then require further operations. Such operations can include a multiplication by a constant as indicated in FIG. 8A before generating the output results on buses fx0, fx1, fx2, and fx3. Depending upon the application, the output bus results can be selectively read by the host or possibly stored in the folded memory array if appropriate. Each subarray is processed in a similar manner with different folded memory array control lines reading out the required half of the rows or columns as appropriate. Alternative implementations of the array controller 804 can be found in U.S. Pat. No. 5,325,464 to Pechanek et al. which is incorporated herein by reference.

Figures 1, 8B:
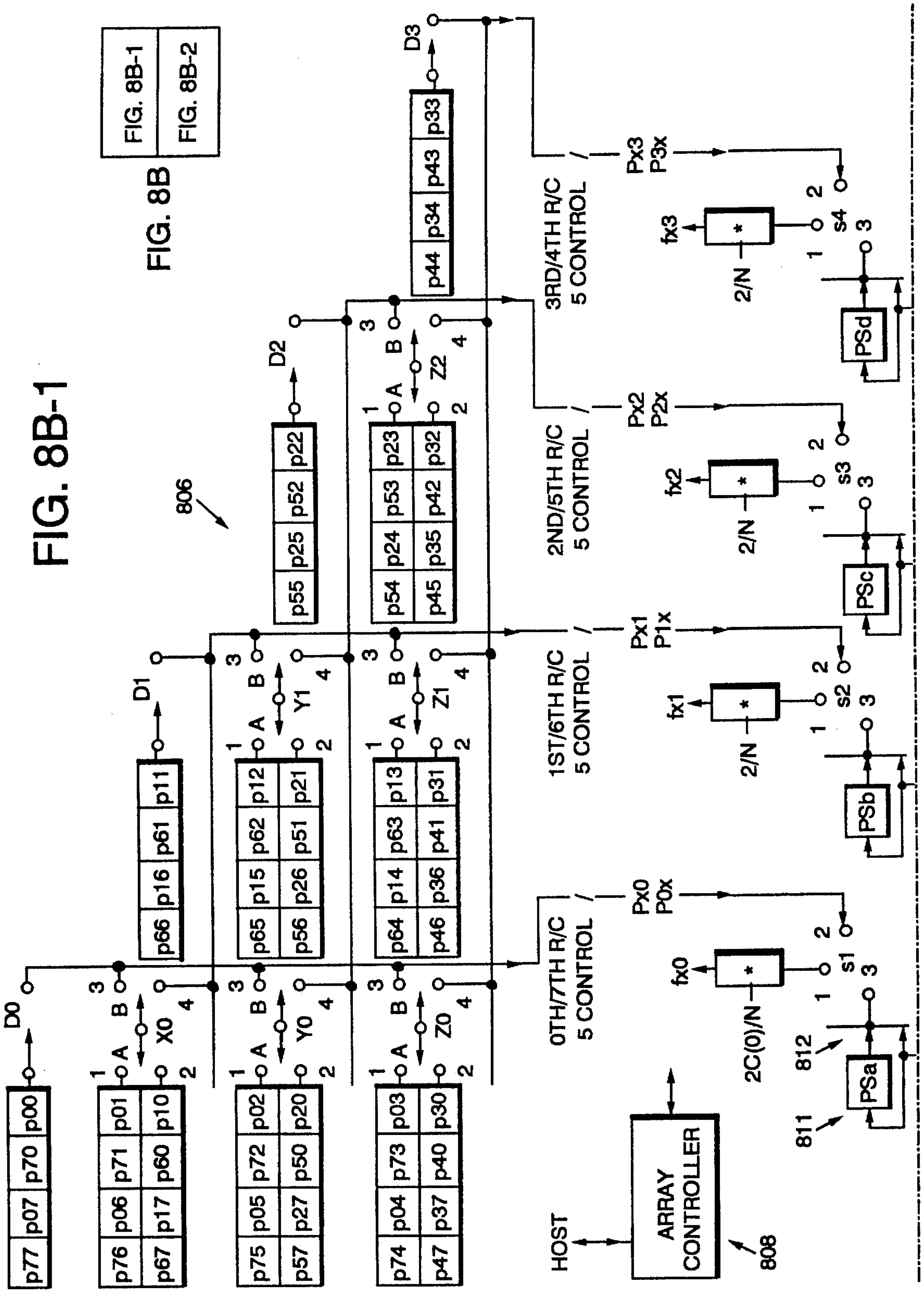
FIG. 8B shows a transposed, folded memory array connected .to a folded tree computational array processor using four by four subarrays which each have different weights.
Figures 2, 8B:
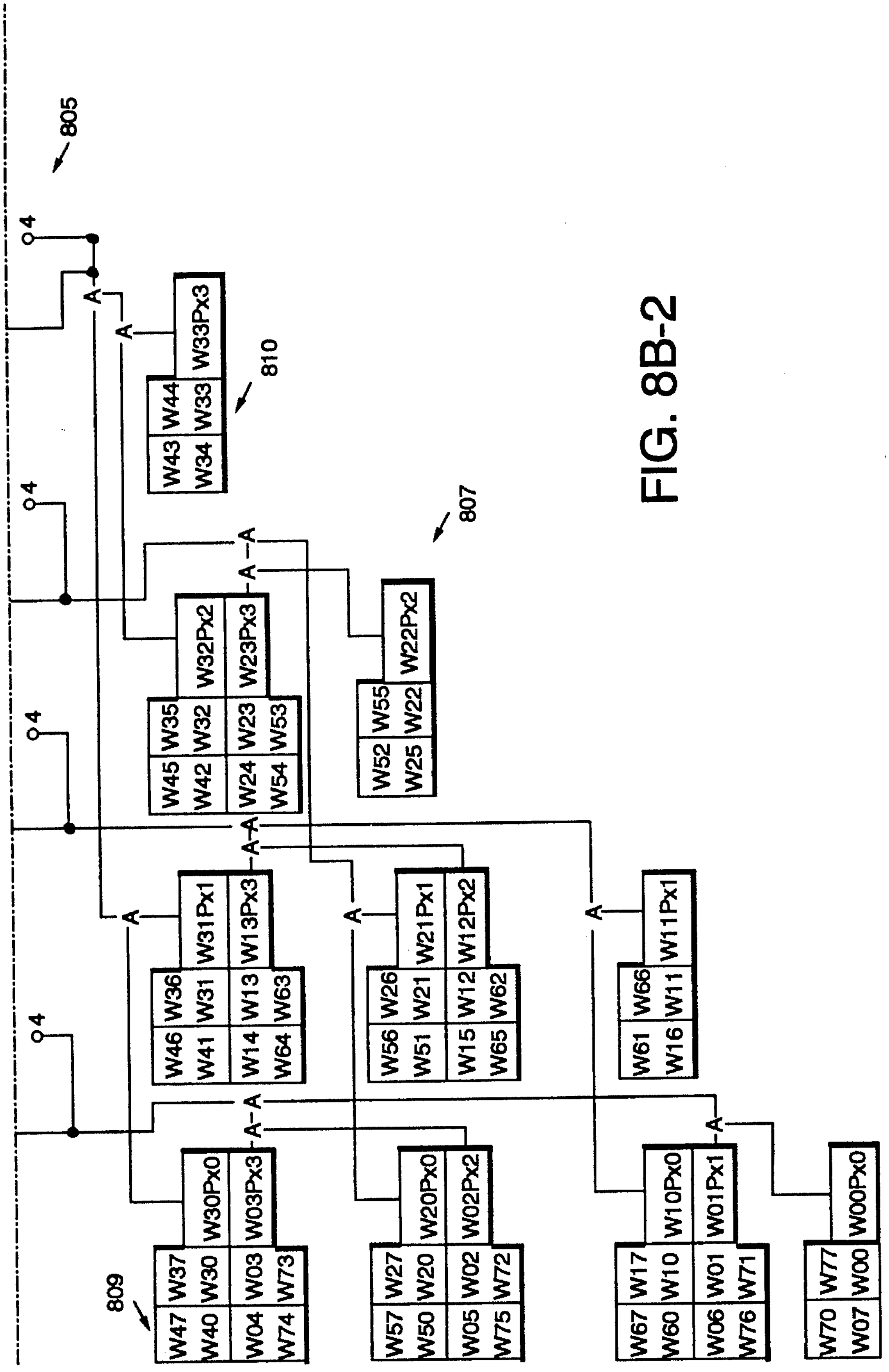

FIG. 8B shows how a folded array as described above can be interconnected with a computational processor array. This organization provides processing for four 4 by 4 subarrays using different Weights Wij for each 4 by 4 sub array or for a 8 by 8 array. The buses of the two arrays are interconnected at 805. The folded memory 806 can be considered a source for data, e.g. pixel values, required by the folded computational array 807 as depicted in FIG. 8B. An array controller 808 provides the control signals that selects half of a column "x" of the folded memory 806, reads the half of the column data providing the memory node values to the output buses px0, px1, px2, and px3 (px4, px5, px6, and px7 for the other half of the column x), sets switches 805 s1, s2, s3, and s4 to connect between points 2 and 4, and sets the communicating adder trees in the folded computation array 807 to communication mode. A path is thereby created allowing the four data bus values to reach the leaf nodes of each of the four communicating adder trees. The px0 . . . px3 values are then loaded into the proper data value register in each dual computation nodes by receiving the values from each trees' leaf nodes into the other computation node of the dual computation node pairs and to be loaded into the data value register of the diagonal computation nodes. The weighting values Wij, stored in local node memory 809 and 810, which is usually Read Only Memory, or initialized in Random Access Memory via Host control, are then used as an operand along with the received data values px0 . . . px3 operands as input to the computational array multipliers located in each node, where in general for an 8 by 8 array Wij is multiplied by pxj.

The folded computation array 807 is shown in FIG. 8B loaded with the half of the xth column data values, for example px0 . . . px3 and multiplied by their appropriate Wij retrieved from the weight storage 809 and 810. The array controller then places the switches 805 s1, s2, s3, and s4 to connect between points 1 and 3 for 8 by 8 processing or between points 1 and 4 for 4 by 4 subarray processing, and places the communicating adder trees into summation mode. The array multiplication sequence is initiated and the results of the multiplications are provided to the communicating adder trees at their leaf nodes as inputs and the trees generate a sum of product result at their root nodes. For 8 by 8 processing the result at the N tree root nodes represent a partial summation and is stored in a Partial Sum register PSa, PSb, PSc, and PSd, one for each root node. After a second multiplication tree summation operation the second partial summation value is added to the stored Partial Sum value in adders 812 providing output to switch 805 points 3. These sum of product results may then require further operations, for example, a multiplication by a constant as indicated in FIG. 8B before generating the output results on buses fx0, fx1, fx2, and fx3. Depending upon the application, the output bus results can be selectively read by the host or possibly stored in the folded memory array if appropriate. Each subarray is processed in a similar manner with different folded memory array control lines reading out the required half of the rows or columns as appropriate.

Alternative implementations of the array controller 808 can be found in U.S. Pat. No. 5,325,464 to Pechanek et al. which is incorporated herein by reference. Alternative implementations for virtual storage computational arrays 807 can be found in U.S. Pat. No. 5,329,611, U.S. Pat. No. 5,243,688, and U.S. Pat. No. 5,337,395 which are incorporated herein by reference.

Figure 9B:
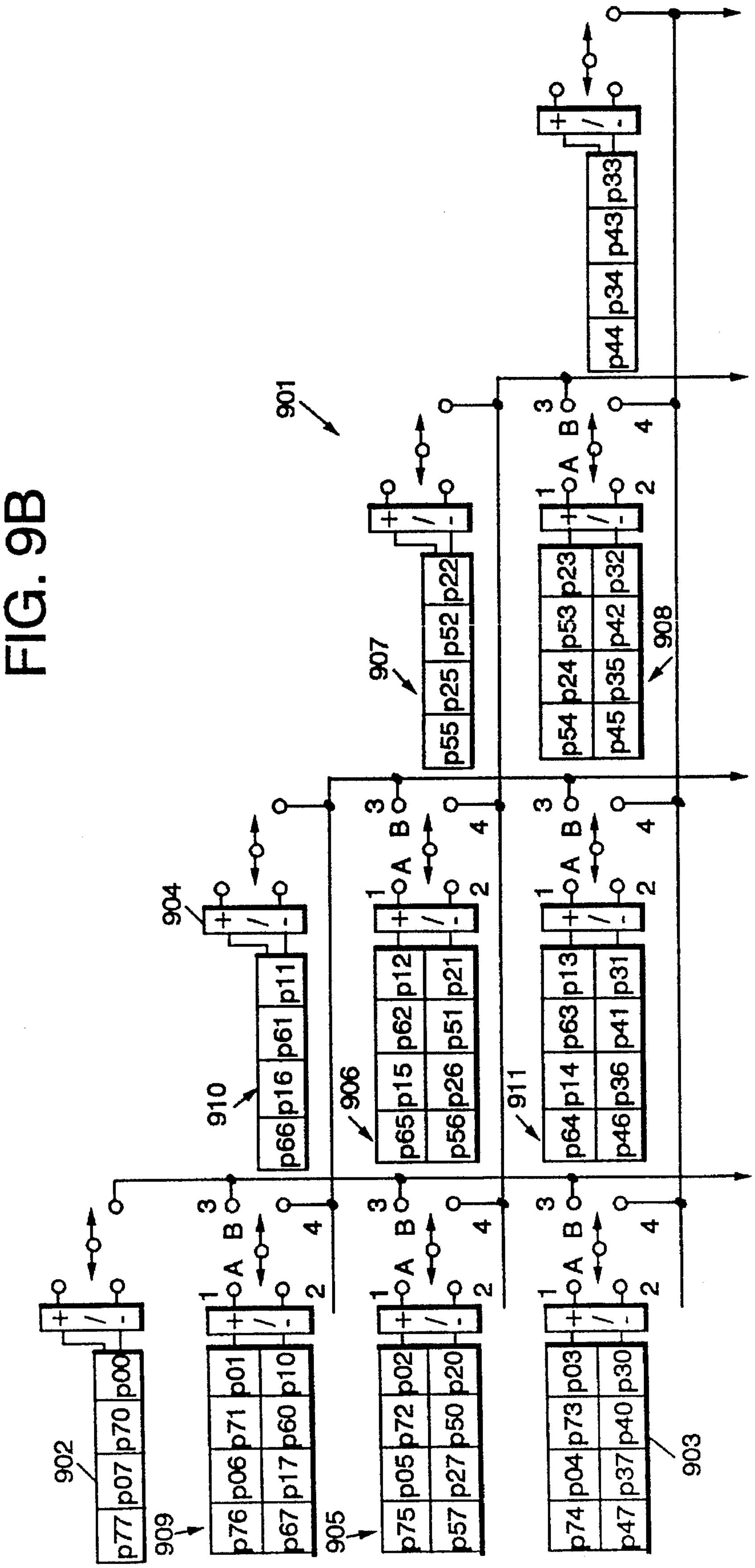
FIG. 9B shows a transposed, folded array with the same number of memory elements as the square array of FIG. 9A, and with means for performing butterfly operations.

FIG. 9B shows a computational array incorporating the folded memory array 901 according to this invention which is connected and arranged so as to correspond to the square array 900 of FIG. 9A. Disposed at each node between the switch associated with that node and the memory elements of the node is a means for performing butterfly operations 904. The memory elements are arranged in the same manner as previously described, the nodes along the diagonal 902 having half as many elements as the other nodes 903.

The one-dimensional discrete cosine transform (1-D DCT) equation is used as an example for describing butterfly operations:

$$f_{x,v} = \frac{2C(v)}{N}\sum_{y=0}^{N-1} p_{xy}\cos\left[\frac{(2y+1)v\pi}{2N}\right] = \frac{2C(v)}{N}\sum_{y=0}^{N-1} p_{xy}W_{vy}$$

$C(v)=1/\sqrt{2}$ for $v=0$ and $C(v)=1$ otherwise, for $u,v=0,1,2,\ldots,N-1$, and $W_{vy}=\cos\left[\frac{(2y+1)v\pi}{2N}\right]$.

It is possible to reduce the number of operations required to compute the result of this general equation by combining multiple common coefficients (weights) which occur in the sum of product operation. TABLE 7 shows the weight matrix for an 8-point 1-D DCT where the sum over the "y" value parameter of the above equation is listed in the first column row identifier and "v" which for an 8-point 1-D DCT varies from 0 to 7 is listed in the first row as column identifiers. By using the "y" and "v" values in the weight equation the other table entries are formed.

TABLE 7

| | v = 0 | 1 | 2 | 3 | 4 | 5 | 6 | 7 |
|---|---|---|---|---|---|---|---|---|
| y = 0 | 1 | C(X) | C2(X) | C3(X) | C4(X) | C5(X) | C6(X) | C7(X) |
| 1 | 1 | C(3X) | C2(3X) | C3(3X) | C4(3X) | C5(3X) | C6(3X) | C7(3X) |
| 2 | 1 | C(5X) | C2(5X) | C3(5X) | C4(5X) | C5(5X) | C6(5X) | C7(5X) |
| 3 | 1 | C(7X) | C2(7X) | C3(7X) | C4(7X) | C5(7X) | C6(7X) | C7(7X) |
| 4 | 1 | C(9X) | C2(9X) | C3(9X) | C4(9X) | C5(9X) | C6(9X) | C7(9X) |
| 5 | 1 | C(11X) | C2(11X) | C3(11X) | C4(11X) | C5(11X) | C6(11X) | C7(11X) |
| 6 | 1 | C(13X) | C2(13X) | C3(13X) | C4(13X) | C5(13X) | C6(13X) | C7(13X) |
| 7 | 1 | C(15X) | C2(15X) | C3(15X) | C4(15X) | C5(15X) | C6(15X) | C7(15X) |

In TABLE 7 each column represent the coefficients (weights) used in the 8 sum of products operations required to solve the 1-D DCT equation. By use of common trigonometric functions, combining common weight terms, separating the "v" columns into an odd and an even matrix, and including the input "pzy" multiplied with each weight, TABLE 8 is formed.

TABLE 8

| | v=0 | v=2 | V=4 | v=6 | v=1 | v=3 | v=5 | v=7 |
|---|---|---|---|---|---|---|---|---|
| y = 3 | pz3 | −C(2X)*pz3 | C(4X)*pz3 | −C(6X)*pz3 | C(7X)*pz3 | −C(5X)*pz3 | C(3X)*pz3 | −C(X) *pz3 |
| y = 4 | pz4 | −C(2X)*pz4 | C(4X)*pz4 | −C(6X)*pz4 | −C(7X)*pz4 | C(5X)*pz4 | −C(3X)*pz4 | C(X) *pz4 |
| y = 2 | pz2 | −C(6X)*pz2 | −C(4X)*pz2 | C(2X)*pz2 | C(5X)*pz2 | −C(X) *pz2 | C(7X)*pz2 | C(3X)*pz2 |
| y = 5 | pz5 | −C(6X)*pz5 | −C(4X)*pz5 | C(2X)*pz5 | −C(5X)*pz5 | C(X) *pz5 | −C(7X)*pz5 | −C(3X)*pz5 |
| y = 1 | pz1 | C(6X)*pz1 | −C(4X)*pz1 | −C(2X)*pz1 | C(3X)*pz1 | −C(7X)*pz1 | −C(X) *pz1 | −C(5X)*pz1 |
| y = 6 | pz6 | C(6X)*pz6 | −C(4X)*pz6 | −C(2X)*pz6 | −C(3X)*pz6 | C(7X)*pz6 | C(X) *pz6 | C(5X)*pz6 |
| y = 0 | pz0 | C(2X)*pz0 | C(4X)*pz0 | C(6X)*pz0 | C(X) *pz0 | C(3X)*pz0 | C(5X)*pz0 | C(7X)*pz0 |
| y = 7 | pz7 | C(2X)*pz7 | C(4X)*pz7 | C(6X)*pz7 | −C(X) *pz7 | −C(3X)*pz7 | −C(5X)*pz7 | −C(7X)*pz7 |

Since the operation on the matrix data is to sum the products of the weights times the input values in the columns, the input values in each column containing common coefficients (weights) can be summed separately and then multiplied by the common coefficients. The input "p" value sums that result from this combining are:

$$A=pz0+pz7$$

$$B=pz1+pz6$$

$$C=pz2+pz5$$

$$D=pz3+pz4$$

$E=pz3-pz4$ $F=pz2-pz5$ $G=pz1-pz6$ $H=pz0-pz7$

These equations represent the "butterfly" operations that are computed as the first stage of the 1-D DCT. It can be noted in FIG. 9B that the input cell values are paired appropriately for the butterfly operation, i.e. located in the same node, for any row and any column of FIG. 9A. For example, for the fifth row the input values p05/p75 (905), p15/p65 (906), p25/p55 (907), and p35/p45 (908) are paired together and in another example for the sixth column the input values p60/p67 (909), p61/p66 (910), p62/p65 (906), and p63/p64 (911) are paired together. Consequently, by placing the appropriate addition and subtraction means to the folded transposition memory between the internal memory array cells and the A/B switches, the butterfly calculation can be accomplished for any selected row or column of the 8 by 8 two-Dimensional matrix of inputs FIG. 9A 900. The addition/subtraction functions are standard adders/subtracters of data bus bit width "L", for example, if L=8 then an 8/9-bit adder/subtracter would be used where the 8 or 9 bit adder/subtracter width determination is dependent upon the input values "pzy". Bit serial or larger bus widths are not precluded. TABLE 9 represents the outputs of the butterfly array processor FIG. 9B for selected rows and columns of inputs as shown in FIG. 9A 900. In TABLE 9 the even outputs (A, B, C, D) are shown first followed by the odd outputs (E, F, G, H). It is noted that the butterfly processor FIG. 9B 901 can also provide butterfly operations on a 64 data value linear array arranged in an 8 by 8 format.

| | | | | | | |
|---|---|---|---|---|---|---|
| : | | : | | : | | : |
| E30 | = | p30 | + | p33 | | |
| E31 | = | p31 | + | p32 | | |
| O31 | = | p31 | − | p32 | | |
| O30 | = | p30 | − | p33 | | |
| : | | : | | : | | |
| O1 | = | p1 | − | p62 | | |
| O0 | = | p0 | − | p63 | | |

Figure 9D:
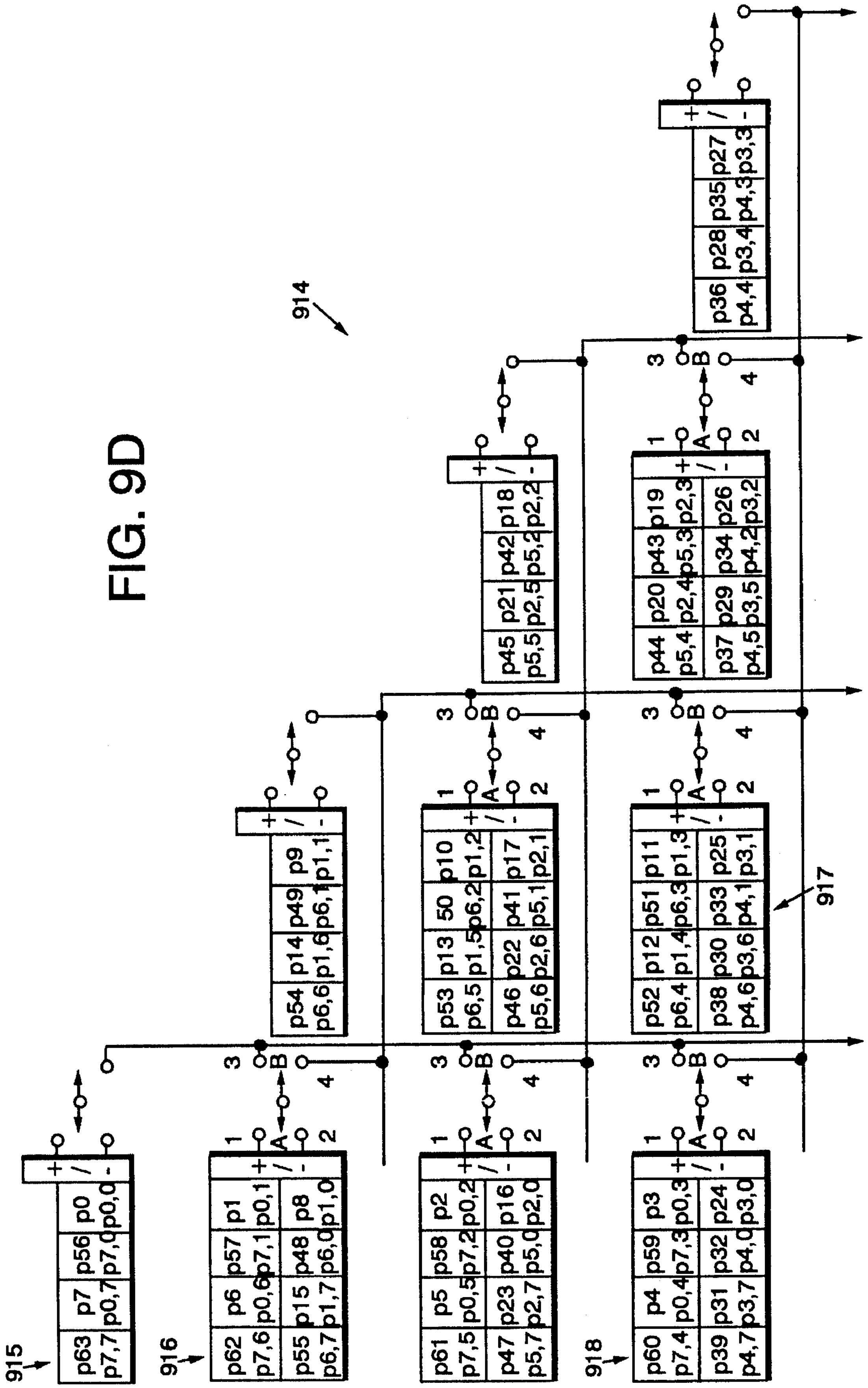
FIG. 9D shows a transposed, folded array with the same number of memory elements as the square array of FIG. 9C and with means for performing butterfly operations.

The corresponding butterfly processor 914 is shown in FIG. 9D where it can be noted that the input cell values are paired appropriately for the butterfly operation, i.e. located in the same node, for any row and any column of FIG. 9C. For example, for the E0 and O0 operations p0 and p63 are located in node 915, for the E1 and O1 operations p1 and p62 are located in node 916, for the E30 and O30 operations p30 and p33 are located in node 917, and for the E31 and O31 operations p31 and p32 are located in node 918. In general for an $N^2$ N by N array, the first stage butterfly requires $P_b$ be combined with $P_{N*N-1-b}$, for example for N=8, p0 is combined with p63, p1 with p62, etc. Consequently, by placing the appropriate addition and subtraction functions to the N by N folded transposition memory between the internal memory array cells and the A/B switches, the butterfly calculation can be accomplished for any linear array of N by N, any linear array of K by N by N, or K linear arrays of size N by N by appropriate loading of the data values in the butterfly array processor. The processor 914 of FIG. 9D shows an example for K=1. In addition, the butterfly functional elements can be incorporated into the multiple folded memory array FIG. 7B indicating the processing of butterfly variables scales to larger sized arrays. In FIG. 7B due to the five folds required for 16 by 16 array to a 4 by 4 folded transposition memory array

TABLE 9

| | | | | |
|---|---|---|---|---|
| 7th ROW BTRFLY − | H=p07−p77 | G=p17−p67 | H=p27−p57 | E=p37−p47 |
| 7th ROW BTRFLY + | A=p07+p77 | B=p17+p67 | C=p27+p57 | D=p37+p47 |
| . | . | . | . | . |
| . | . | . | . | . |
| . | . | . | . | . |
| 1st ROW BTRFLY − | H=p01−p71 | G=p11−p61 | F=p21−p51 | E=p31−p41 |
| 1st ROW BTRFLY + | A=p01+p71 | B=p11+p61 | C=p21+p51 | D=p31+p41 |
| 0th ROW BTRFLY − | H=p00−p70 | G=p10−p60 | F=p20−p50 | E=p30−p40 |
| 0th ROW BTRFLY + | A=p00+p70 | B=p10+p60 | C=p20+p50 | D=p30+p40 |
| 7th COLUMN BTRFLY − | H=p70−p77 | G=p71−p76 | F=p72−p75 | E=p73−p74 |
| 7th COLUMN BTRFLY + | A=p70+p77 | B=p71+p76 | C=p72+p75 | D=p73+p74 |
| . | . | . | . | . |
| . | . | . | . | . |
| . | . | . | . | . |
| 1st COLUMN BTRFLY − | H=p10−p17 | G=p11−p16 | F=p12−p15 | E=p13−p14 |
| 1st COLUMN BTRFLY + | A=p10+p17 | B=p11+p16 | C=p12+p15 | D=p13+p14 |
| 0th COLUMN BTRGLY − | H=p00−p07 | G=p01−p06 | F=p02−p05 | E=p03−p04 |
| 0th COLUMN BTRFLY + | A=p00+p07 | B=p01+p06 | C=p02+p05 | D=p03+p04 |

The 64 data values arranged in an 8 by 8 format is depicted in FIG. 9C 912 where the cell notation places the 64 element single subscript notation i.e. p0 to p63, in the Top of a cell and places the two-dimensional double subscript notation in the bottom of the cell (cell 913 where p11 is placed in the top and p1,3 is placed in the bottom of the cell). The required butterfly operations on a 64 element linear array are:

$E0=p0+p63$ $E1=p1+p62$ of this invention, the folded array provides the capability of a large number of butterfly operations on different portions of the array. Examples include: on each column; on each half of each column; on each row; on each half of each row; on each quarter of the array (16*16/4) linear arrays of data; on each vertical half; on each horizontal half; on a 16 by 16 linear array of data; etc.

TABLE 10 represents the outputs of the butterfly array processor FIG. 9D for selected groups of inputs. In TABLE 10 the even outputs (E0, E1, E2, E3) are shown first followed by the odd outputs (O0, O1, O2, O3). This is followed by the next group of four even outputs and four odd outputs and continuing until all butterfly operations are completed.

TABLE 10

| 7th BTRFLY − | AM7=p28−p35 | BM7=p29−p34 | CM7=p30−p33 | DM7=p31−p32 |
|---|---|---|---|---|
| 7th BTRFLY + | AP7=p28+p35 | BP7=p29+p34 | CP7=p30+p33 | DP7=p31+p32 |
| . | . | . | . | . |
| . | . | . | . | . |
| . | . | . | . | . |
| 1st BTRFLY − | AM1=p4−p59 | BM1=p5−p58 | CM1=p6−p57 | CM1=p7−p56 |
| 1st BTRFLY + | AP1=p4+p59 | BP1=p5+p58 | CP1=p6+p57 | DP1=p7+p56 |
| 0th BTRFLY − | AM0=p0−p63 | BM0=p1−p62 | CM0=p2−p61 | DM0=p3−p60 |
| 0th BTRFLY + | AP0=p0+p63 | DP0=p1+p62 | CP0=p2+p61 | DP0=p3+p60 |

Figures 1, 10A:
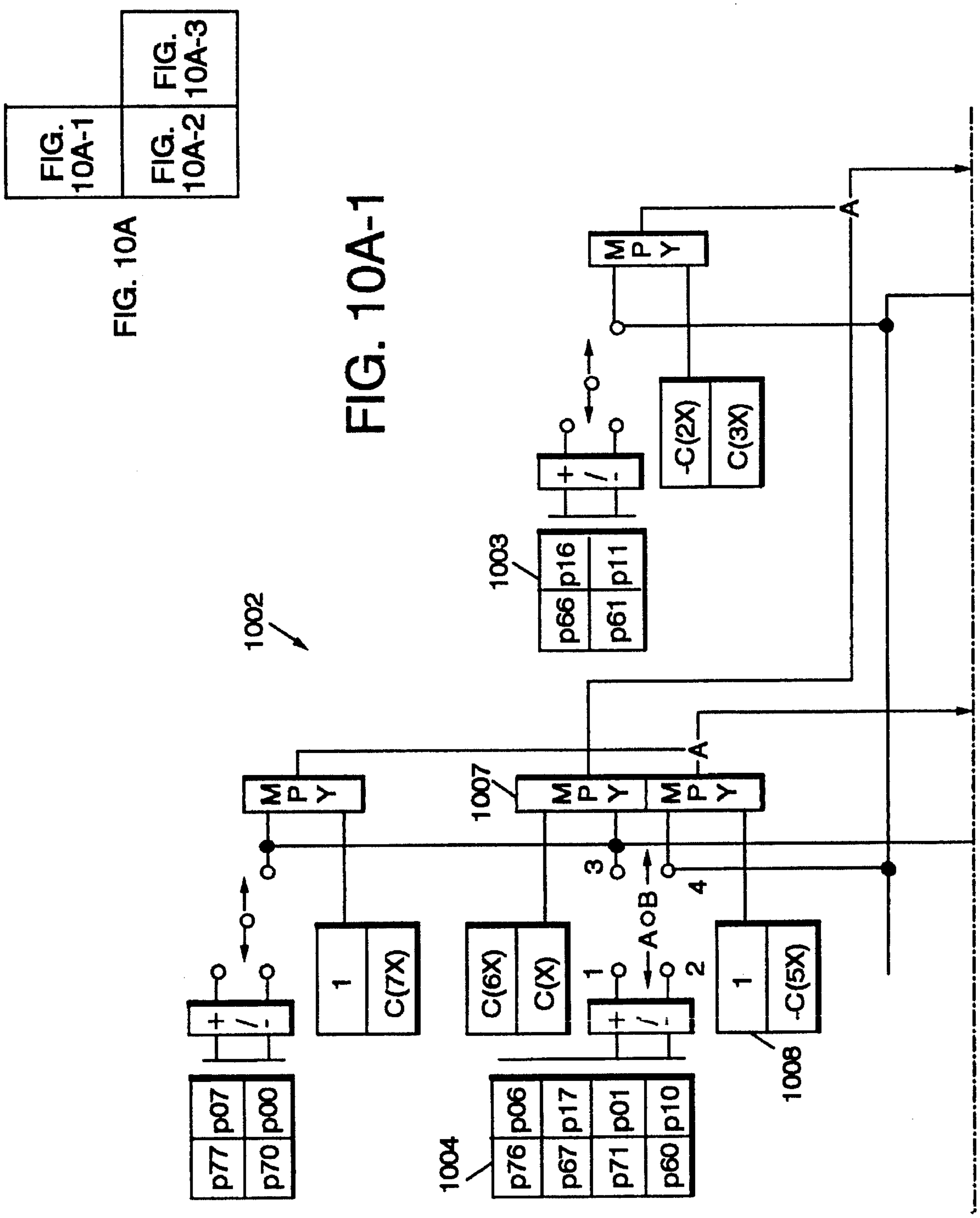
FIG. 10A shows a schematic representation of a processor array for performing fast cosine transform calculations which has the same number of memory elements as the square array of FIG. 9A.
Figures 2, 10A:
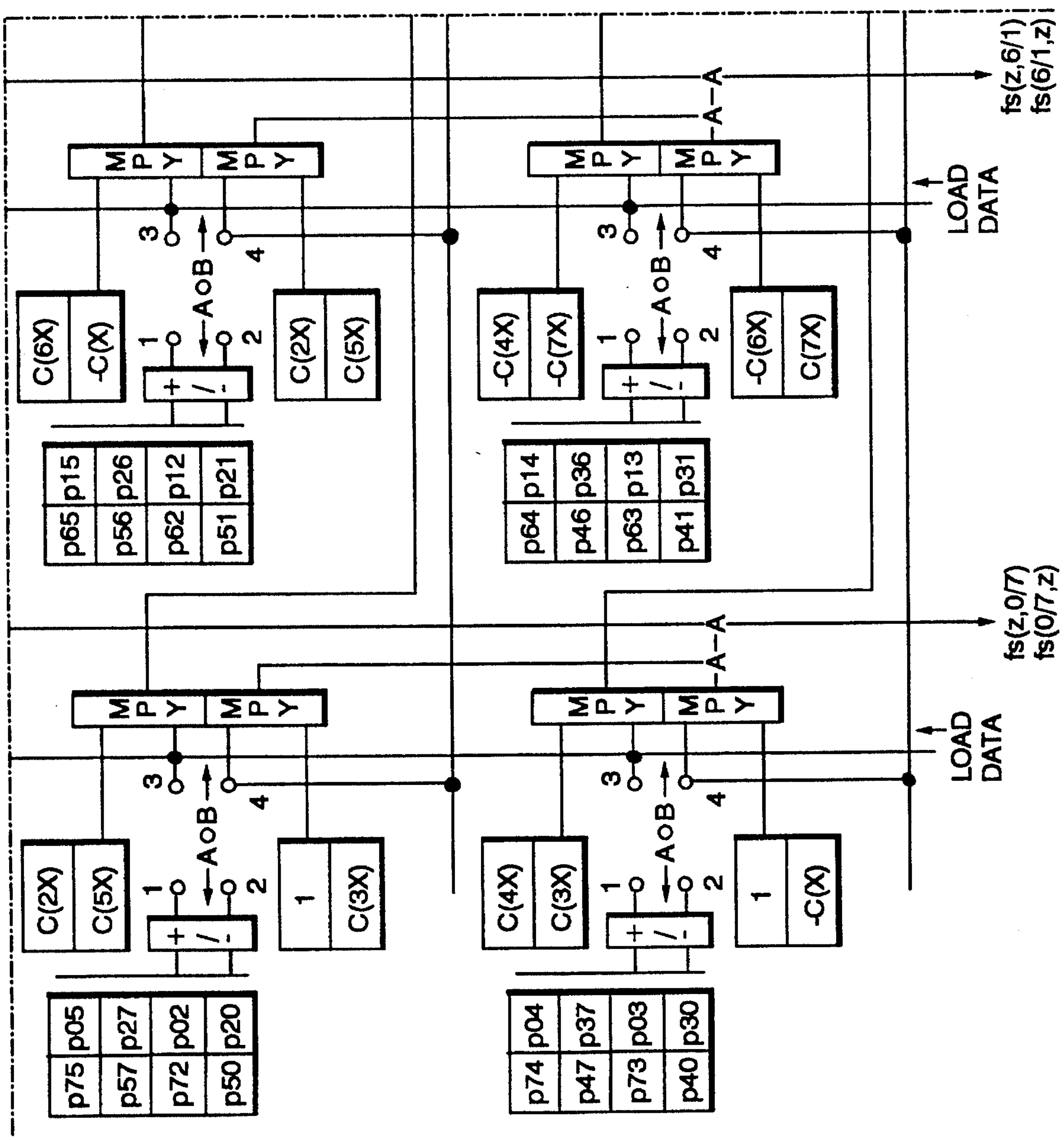
Figures 3, 10A:
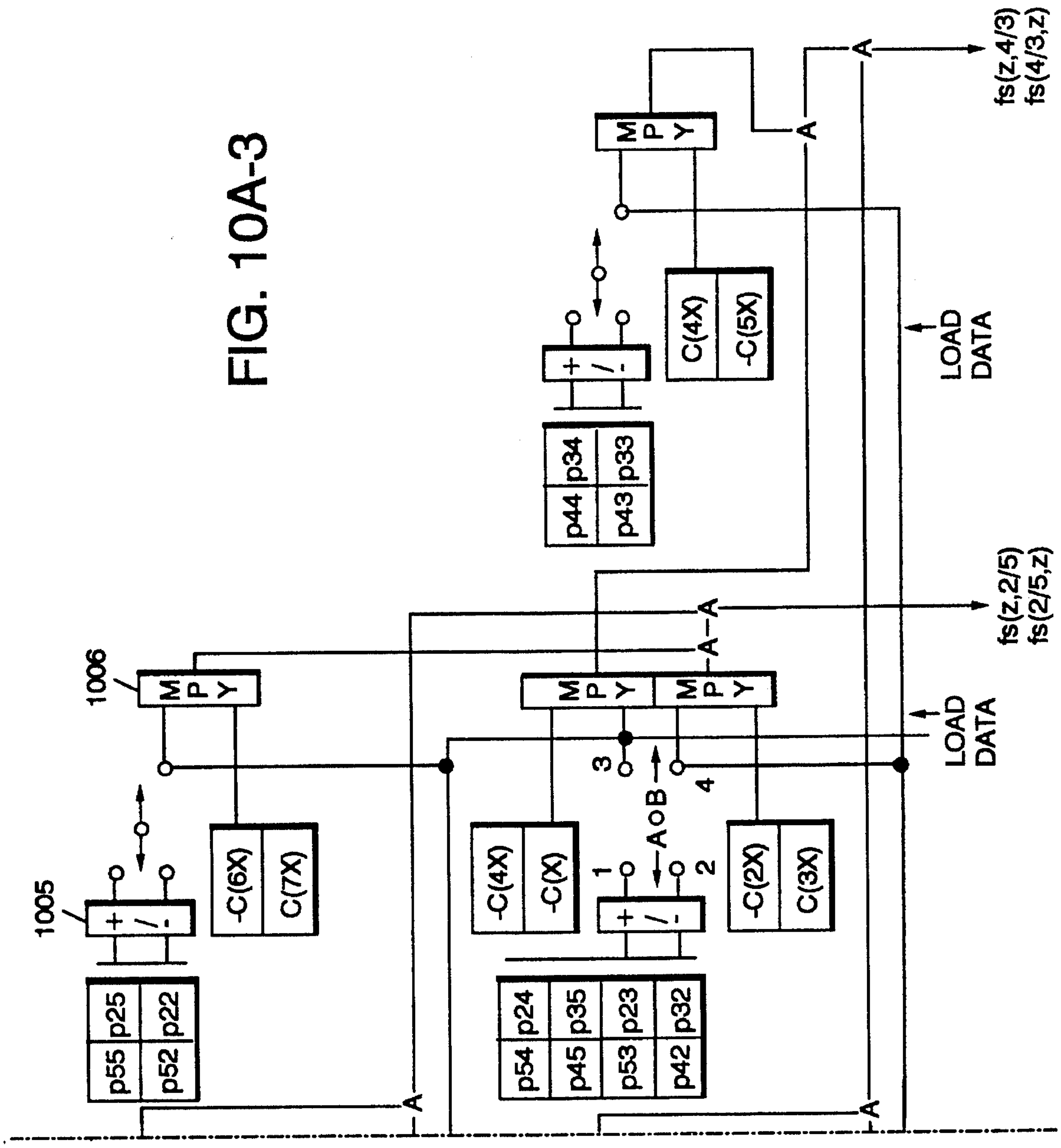

FIG. 10A shows a schematic representation of a fast cosine transform computational processor using the transposed folded memory array as previously discussed. The memory nodes are arranged as in a folded array which corresponds to an 8 by 8 square array folded in quarters rather than cut and overlain. However, the same processor structure could be formed with the nodes interconnected to correspond to a square memory array cut and overlain. The array has four nodes 1003 having four memory elements each and six nodes 1004 having eight memory elements each. The nodes are interconnected by buses as before. Disposed at each node are means for performing calculations on the data in each mode such that the nodes on a single bus form a communicating adder summation tree.

The means for performing calculations at each node includes the switching means, the means for performing butterfly operations 1005, the means for multiplying the output of the switching means by a trigonometric constant 1006 and means for providing the trigonometric constant 1008. At the larger nodes, there are two multipliers which work together as shown at 1007.

Beginning with TABLE 8 and generating the butterfly outputs the next stage of calculating the 1-D DCT is shown in TABLE 11 which indicates in each column the coefficient (weight) times butterfly output required as input to a sum of product calculation.

TABLE 11

| | v=0 | v=2 | v=4 | v=6 | v=1 | v=3 | v=5 | v=7 |
|---|---|---|---|---|---|---|---|---|
| y=3,4 | D | −C(2X)*D | C(4X)*D | −C(6X)*D | C(7X)*E | −C(5X)*E | C(3X)*E | −C(X)*E |
| y=2,5 | C | −C(6X)*C | −C(4X)*C | C(2X)*C | C(5X)*F | −C(X)*F | C(7X)*F | C(3X)*F |
| y=1,6 | B | C(6X)*B | −C(4X)*B | −C(2X)*B | C(3X)*G | −C(7X)*G | −C(X)*G | −C(5X)*G |
| y=0,7 | A | C(2X)*A | C(4X)*A | C(6X)*A | C(X)*H | C(3X)*H | C(5X)*H | C(7X)*H |

Figure 10B:
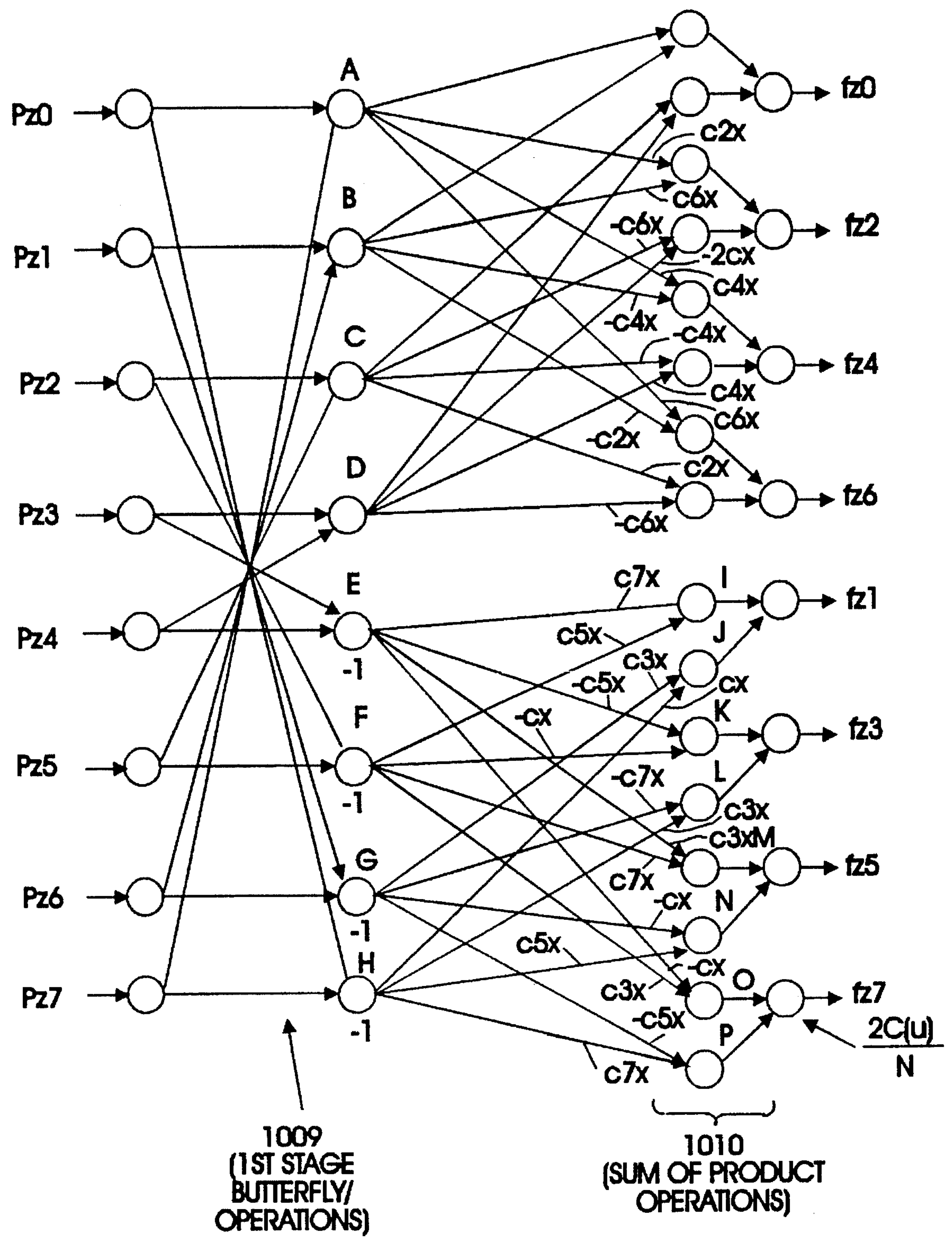
FIG. 10B is a signal flow graph showing the butterfly operations and summing performed by the processor array of FIG. 10A.

This operation is also depicted in FIG. 10B as a signal flow graph where 1009 represents the first stage butterfly operations and 1010 represents the sum of product operations. For v=1,3,5,7 two product terms are summed together to obtain the following intermediate sum of product terms I, J, . . . , P:

$$I = C(7X)*E + C(5X)*F$$

$$J = C(3X)*G + C(X)*H$$

$$K = -C(5X)*E + (-C(X)*F)$$

$$L = -C(7X)*G + C(3X)*H$$

$$M = C(3X)*E + C(7X)*F$$

$$N = -C(X)*G + C(5X)*H$$

$$O = -C(X)*E + C(3X)*F$$

$$P = -C(5X)*G + C(7X)*H$$

The final step sums I+J, K+L, M+N, O+P, and the final outputs scaled as required by the DCT equation. It can be observed from FIG. 8A and 8B that the folded transposition memory and folded computational array have the same form. Consequently, the two arrays can be folded together and combined with the butterfly functional elements. Specifically, by using a single array computational structure FIG. 3C 302 combined with the three fold virtual transposition memory with the 1st stage butterfly computation FIG. 9B 901, the cosine transformational processor shown in FIG. 10A is created. In the combined cosine transformational processor, duplicate pel register storage is not required, since the register pel data can be bused to the appropriate multipliers. This provides a more compact structure with a savings in chip real estate and circuit wiring.

In FIG. 10A the order of the array outputs (fxx) from the four summation trees is determined from the terms used in the butterfly calculations as depicted in TABLE 9. For example in TABLE 9 the "A" butterfly output is based on the calculation A=p00+p07, consequently for the DCT the output from the "A" tree is f(z,0/7) and f(0/7,z) depending upon the column or row 1-D DCT calculation. In the same manner, the output of the "B" tree is f(z,1/6) and f(1/6,z), for the "C" tree f(z,2/5) and f(2/5,z), and for the "D" tree f(z,3/4) and f(3/4,z). Note that the "pxx" values, FIG. 10A, are shown in a vertical arrangement to minimize the horizontal spacing in the more complex drawing and that the "pxx" values are the same per cell as in the previous drawing, FIG. 9B.

Figures 1, 10C:
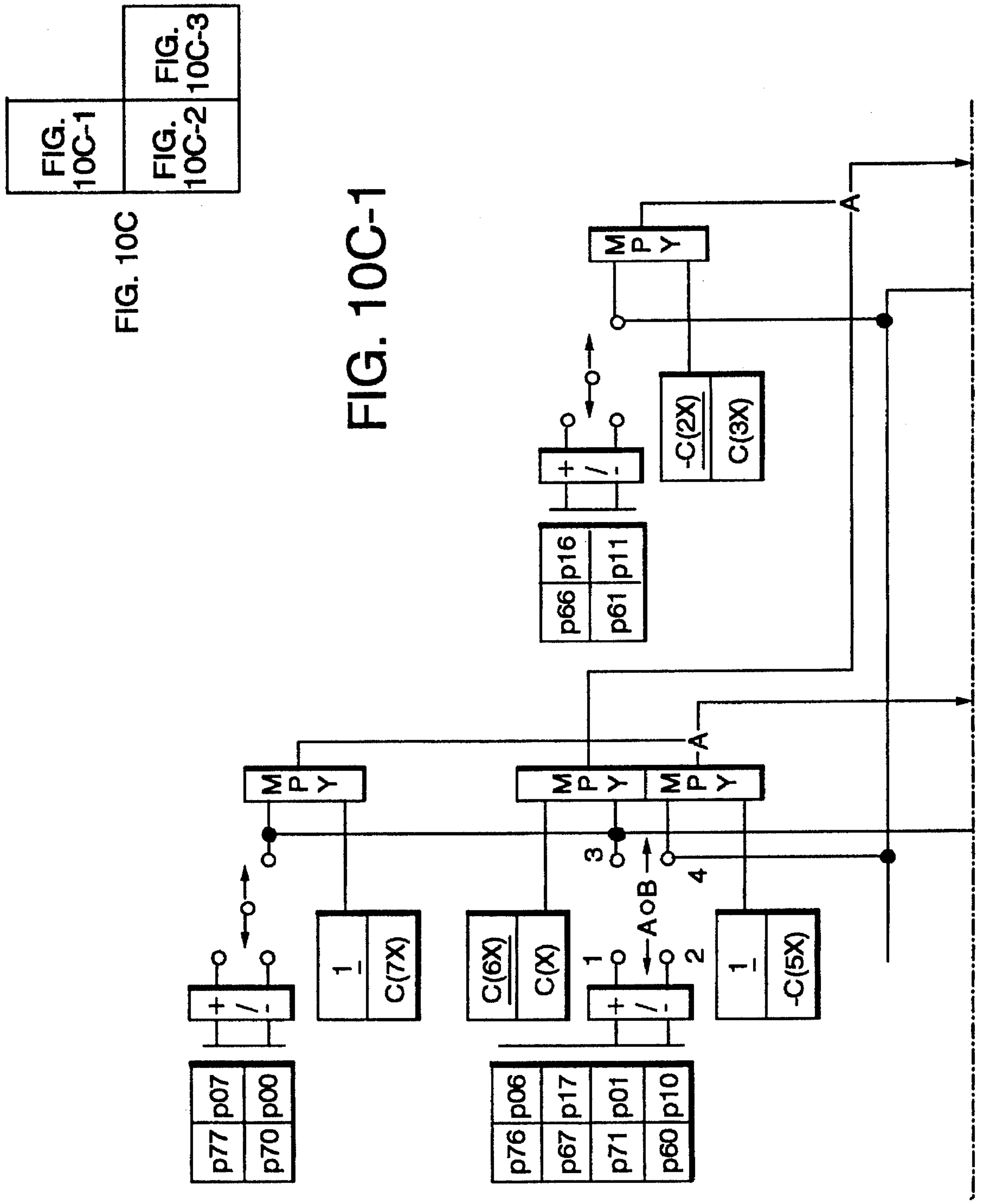
FIG. 10C shows the processor array of FIG. 10A set for computation of the 5th row even section of a one-dimensional direct cosine transform.
Figures 2, 10C:
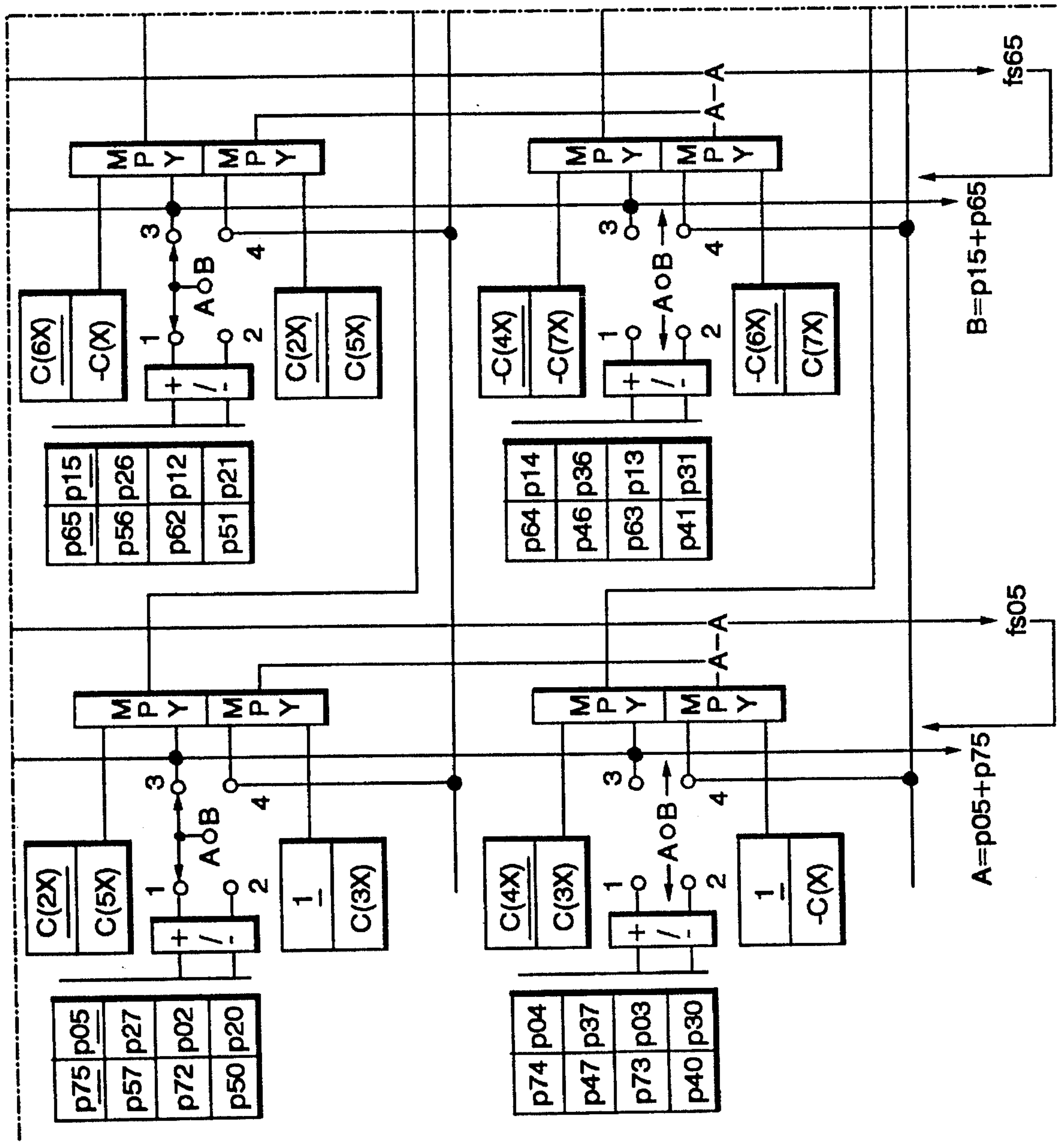
Figures 3, 10C:
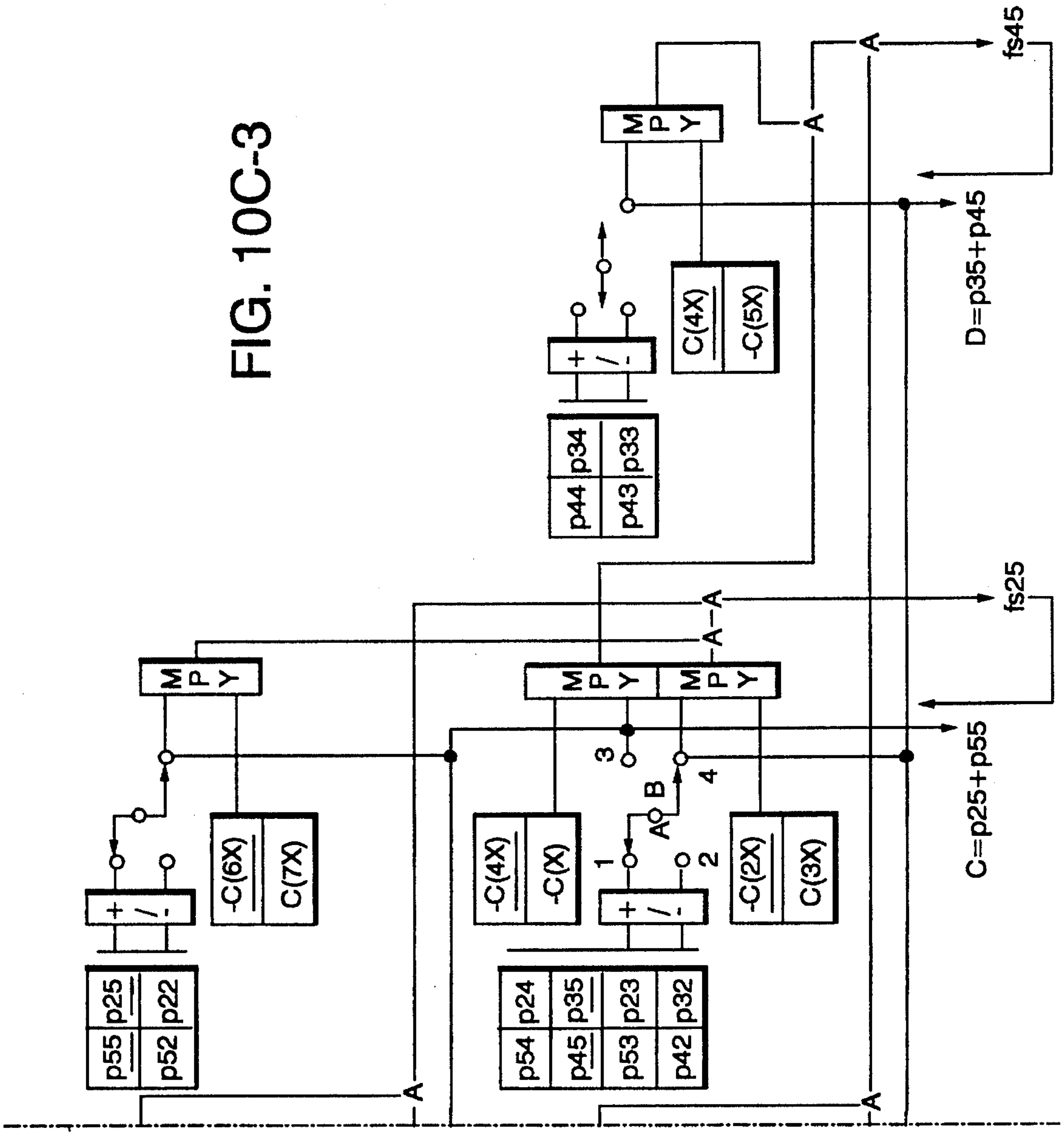

FIG. 10C highlights the selected "p-cells" and the settings of the A/B switches for the computation of the 5th row even section of the 1-D DCT, which requires that all even coefficients or weight data (top values of the two element weight cells) be selected, for which the equations are:

$$f_{05} = (1/(4\sqrt{2}))[(p05 + p75) + (p15 + p65) + (p25 + p55) + (p35 + p45)]$$

$$f_{25} = (1/4)\,[C(2X)(p05 + p75) + C(6X)(p15 + p65) - C(6X)(p25 + p55) - C(2X)(p35 + p45)]$$

$$f_{45} = (1/4)\,[C(4X)(p05 + p75) - C(4X)(p15 + p65) - C(4X)(p25 + p55) + C(4X)(p35 + p45)]$$

-continued $$f_{65}=(1/4)\,[C(6X)(p05+p75)-C(2X)(p15+p65)+C(2X)(p25+p55)-C(6X)(p35+p45)$$

Figures 2, 10D:
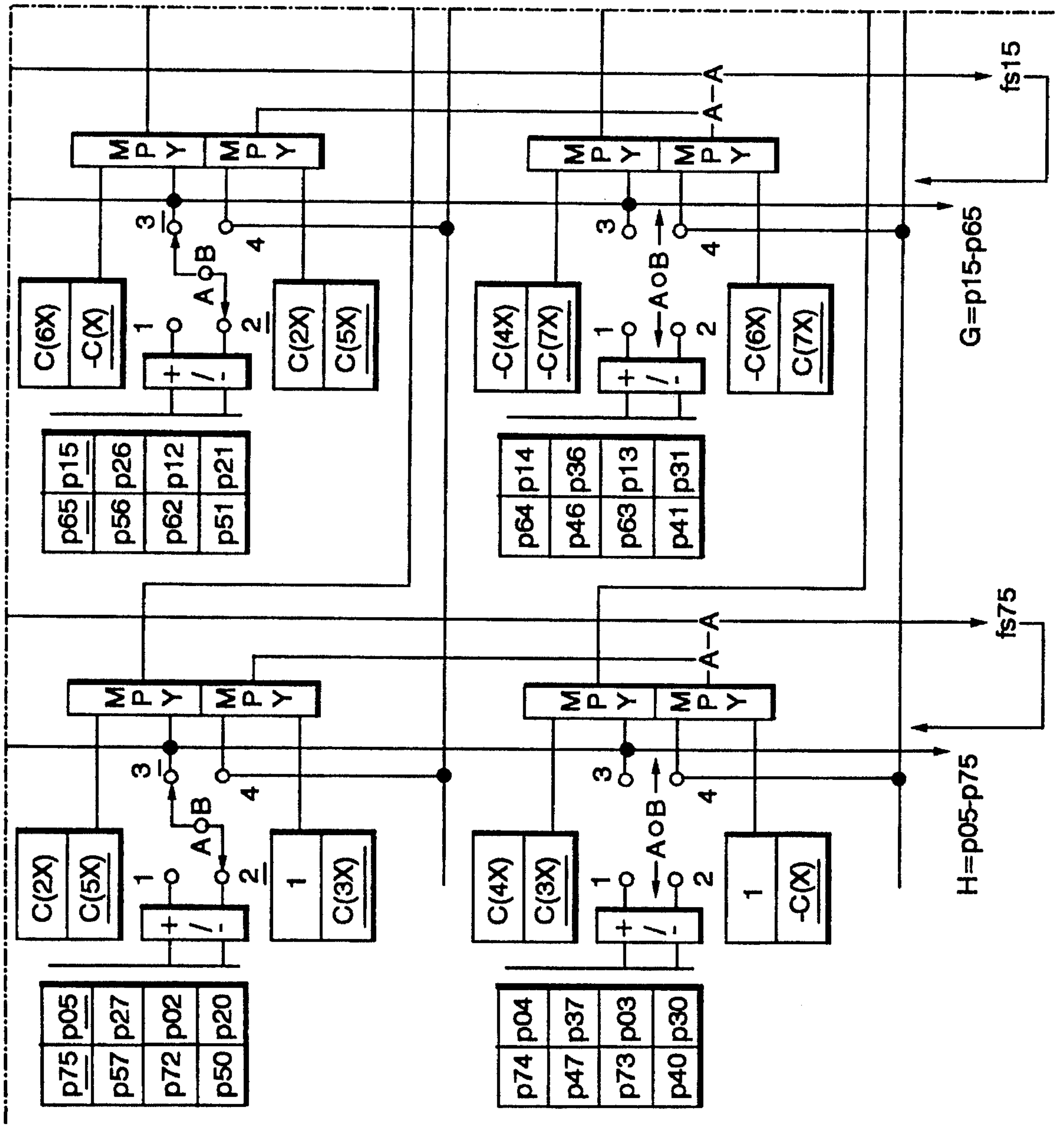
FIG. 10D shows the processor array of FIG. 10A set for computation of the 5th row odd section of a one-dimensional direct cosine transform.
Figures 3, 10D:
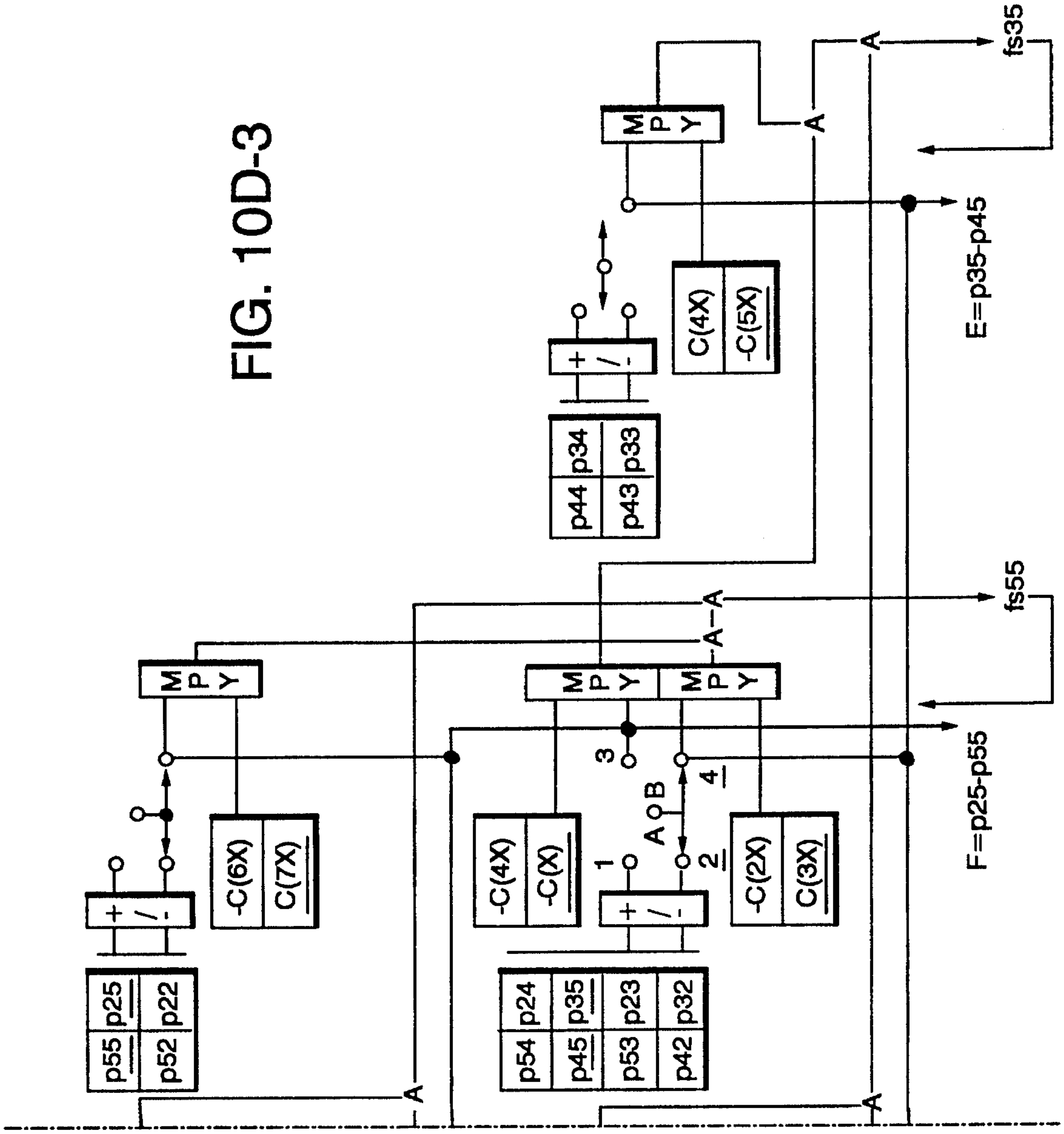

FIG. 10D highlights the selected "p-cells" and the setting of the A/B switches for the computation of the 5th row odd section of the 1-D DCT, which requires that all odd coefficients or weight data (bottom values of the two element weight cells) be selected, for which the equations are:

$$f_{15}=(1/4)\,[C(X)(p05-p75)+C(3X)(p15-p65)+C(5X)(p25-p55)+C(7X)(p35-p45)]$$

$$f_{35}=(1/4)\,[C(3X)(p05-p75)-C(7X)(p15-p65)-C(X)(p25-p55)-C(5X)(p35-p45)]$$

$$f_{55}=(1/4)\,[C(5X)(p05-p75)-C(X)(p15-p65)+C(7X)(p25-p55)+C(3X)(p35-p45)]$$

$$f_{75}=(1/4)\,[(C(7X)(p05-p75)-C(5X)(p15-p65)+C(3X)(p25-p55)-C(X)(p35-p45)]$$

Figures 1, 10E:
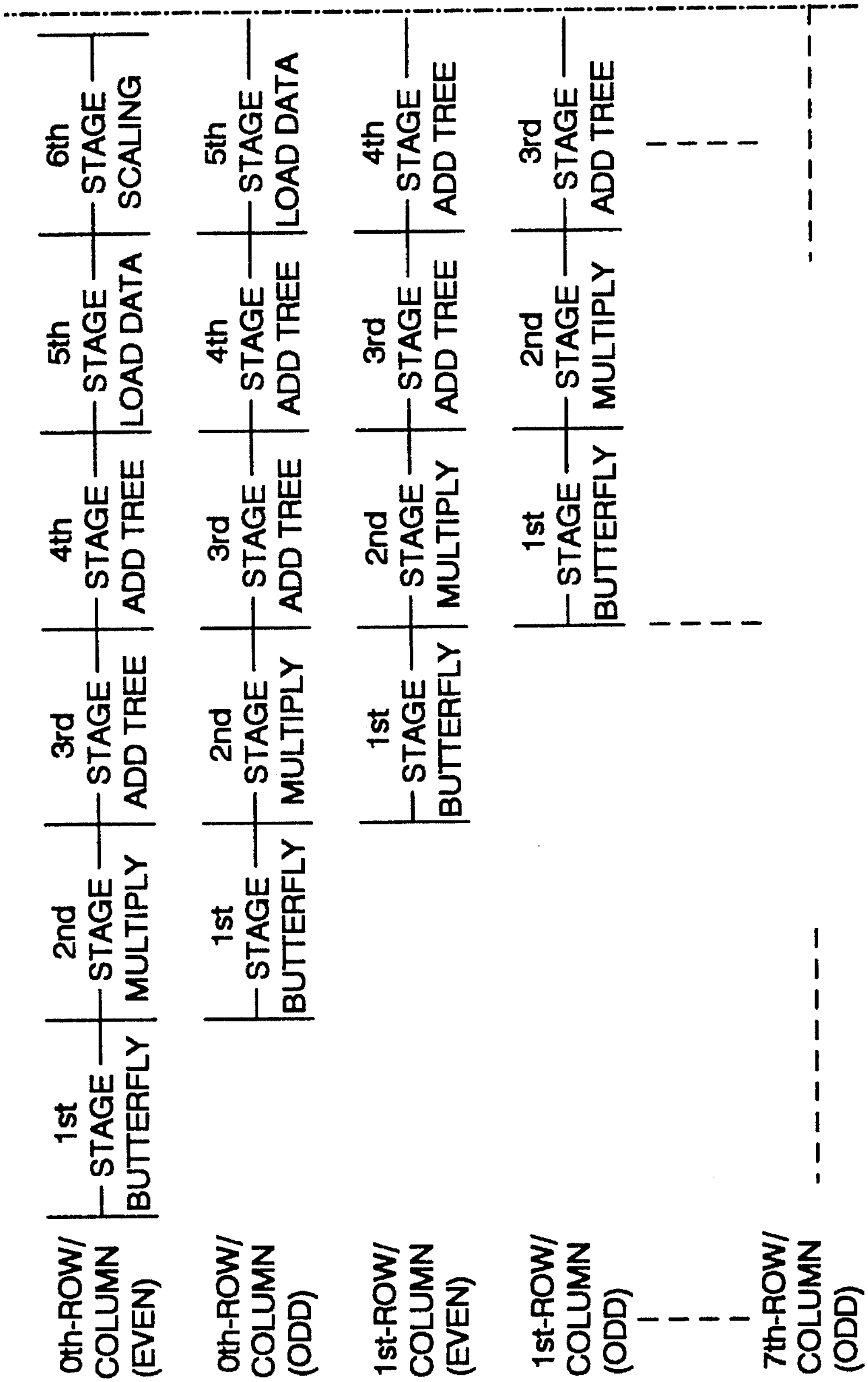
FIG. 10E is a graphical representation of the pipeline sequence in the processor array of FIG. 10A.
Figure 10E:
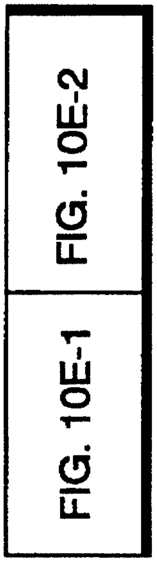
Figures 2, 10E:
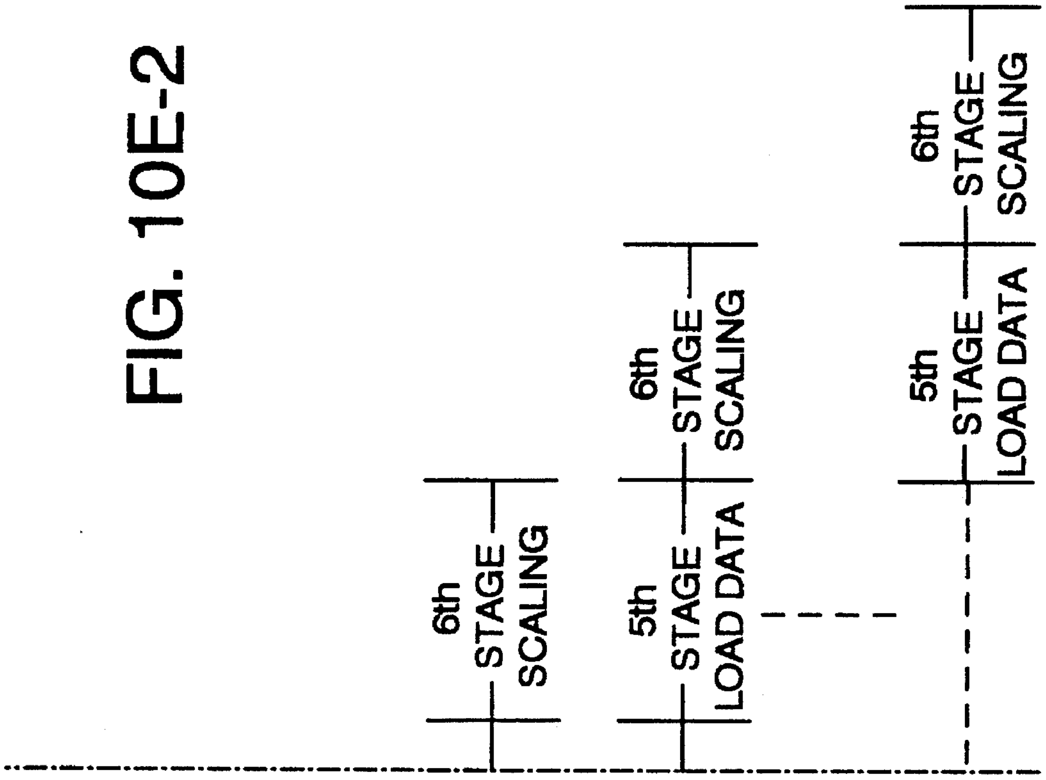

With appropriate scaling of the DC terms f0z and fz0, all outputs can be scaled in a final computation step by 1/4, requiring a shifting operation on the data. This scaling can be accomplished in a number of different ways. The scaling in the first method, as assumed in the DCT example, FIG. 10C and FIG. 10D, occurs as an explicit step after the "fs(x,5)" values are loaded back into the pel array cells. In a second method, the "fs(xx)" values can be shifted as they are loaded back into the pel array cells, thereby eliminating the explicit scaling step. For the 2-D DCT implementation based upon doing 1-D DCT calculations on each column (row) first followed by doing 1-D DCT calculations on each row (column) decomposition using the 1-D DCT signal flow graph shown in FIG. 10B, an example pipeline is shown in FIG. 10E. The operation sequence begins with a butterfly operation on even (odd) column (row) data followed by a multiply, a sum of products, a load sum of product output back to the array cells, and a scaling operation on the loaded data. While one set of the above sequences is occurring the next sequence in started in pipeline fashion, for the odd (even) row (column) data, FIG. 10E. Each column/row DCT is processed as an odd/even pipeline sequence to process the full line data. Once the first set of all columns/rows have been processed, the second 1-D DCT processing of the row/column data begins, in order to complete the 2-D DCT. The processing of all columns/rows of the first 1-D DCT must be complete before the second set of 1-D DCT processing begins.

FIG. 11A shows a schematic representation of a fast inverse cosine transform computational processor using a fast cosine transformprocessor FIG. 10A as previously discussed, with modifications. The 2-D IDCT implementation is based upon the signal flow graph shown in FIG. 11B using on the Inverse DCT (IDCT) equation:

$$p_{x,y}=\sum_{v=0}^{N-1}C(v)f_{x,v}\cos\left[\frac{(2y+1)v\pi}{2N}\right]=\sum_{v=0}^{N-1}C(v)f_{x,v}W_{vy}$$

$C(v)=1/\sqrt{2}$ for $v=0$ and $C(v)=1$ otherwise, for $u,v=0,1,2,\ldots,N-1$, and $W_{vy}=\cos\left[\frac{(2y+1)v\pi}{2N}\right]$.

Figure 11B:
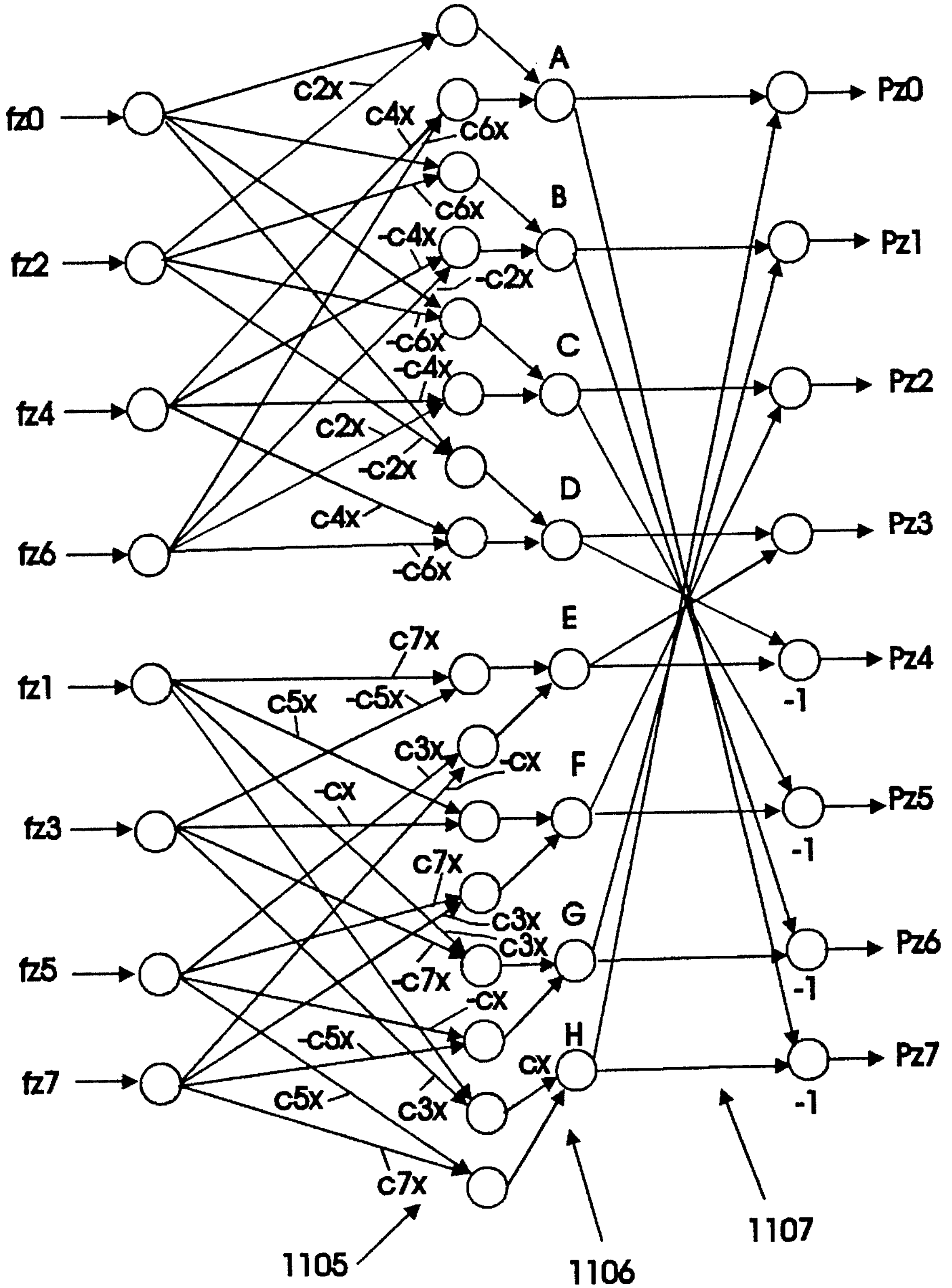
FIG. 11B shows a signal flow diagram for the processor array of FIG. 11A.
Figures 1, 11C:
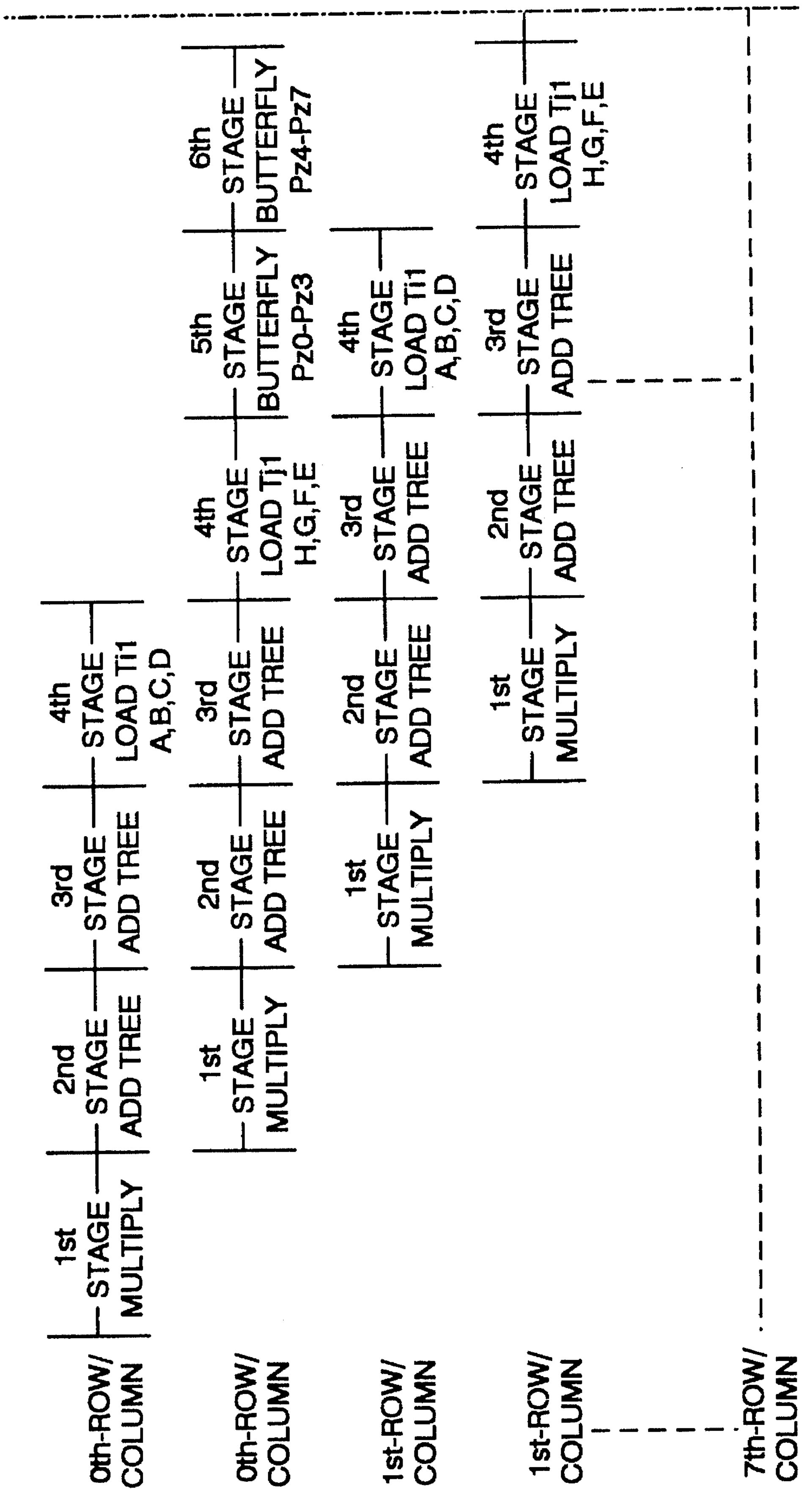
FIG. 11C shows a pipeline sequence for the processor array of FIG. 11A.
Figure 11C:
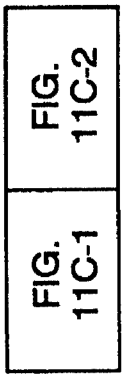
Figures 2, 11C:
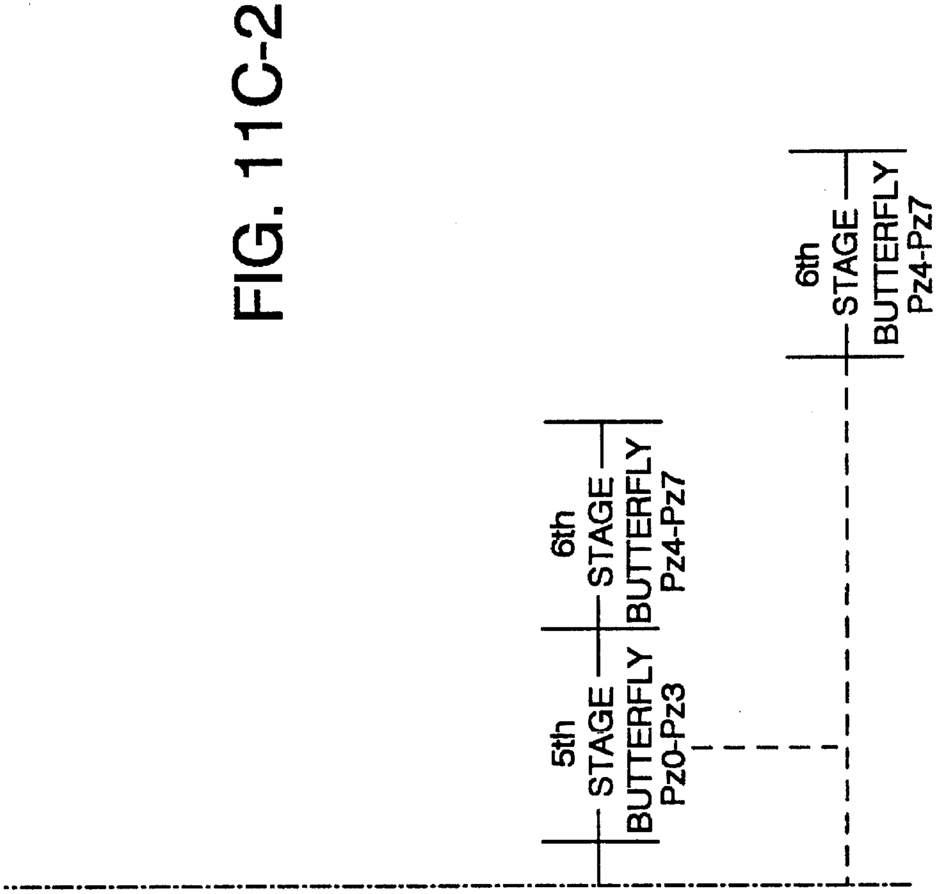

The signal flow graph FIG. 11B begins with a multiply 1105 followed by a sum of product operation 1106, which in order to accomplish in the array processor FIG. 10A requires a butterfly adder bypass path for the input data to the A/B switches. This bypass path is indicated in FIG. 11A by the A/B switch position "5" 1101. For the multiplications, note that the coefficient weights must be in a different order and consequently are swapped in each dual processor cell 1102 as compared to FIG. 10A 1008. The last stage of the signal flow graph FIG. 11B is a butterfly operation 1107 which cannot occur until both odd and even sum of product operations have been accomplished. Appropriate control logic is utilized for this purpose with the addition of temporary storage registers, Ti1 Ti2 (1104) and Tj1 Tj2 (1103) to the array cells. Four temporary registers may be required for the diagonal cells if sequential processing of the rows and columns is followed. Alternatively, by processing columns/rows 0, 1, 2, and 3 in sequence followed by columns/rows 7, 6, 5, and 4, only two temporary registers are required at each diagonal cell. In order not to impose a further operational restriction, four temporary registers are included in all nodes of FIG. 11A. The last stage butterfly operation requires a path from the butterfly adders back to the input data processor cells. The data load back path is implied in the structure diagram and is not explicitly shown. The scaling operation is assumed to occur with the loading of the butterfly output data, with the appropriate scaling of the DC terms, allowing a common shift in the data loaded. An example 1-D IDCT pipeline is shown in FIG. 11C. It is noted that the fast inverse cosine transform can also process the cosine transform in the same structure.

We have shown several embodiments of a folded memory structure which can be used for fast cosine transform processors for processing video. Such a fast cosine transform processor can be included on a video card or system circuit board of a multimedia computer system. Those skilled in the art, however, will recognize that the same memory structure can be made in different embodiments and used for different purposes. The concept will always remain the same.

We claim:

1. A folded array having a number of nodes formed by logically folding an N by N element square memory array along a diagonal, the folded array comprising:

$(N^2-N)/2$ general nodes each having 2 interconnected memory elements, the $(N^2-N)/2$ general nodes arranged to form a triangular array having a diagonal fold;

N diagonal nodes each having a single memory element, the N diagonal nodes disposed along the diagonal fold of the folded array;

N memory buses interconnecting the nodes of the folded array, each bus having a control line and a data line; and a number of switches equal to the number of nodes, each switch connected to one node and disposed between the one node and a memory bus so that rows and columns of data are read and written.

2. The folded array of claim 1 further comprising:

a folded tree computational array having N processor buses interconnected with the N memory buses and having means for performing direct cosine transform computations using data contained in the memory elements.

3. A transposed, folded array having a number of nodes formed by logically folding an M by M node square memory array having X elements per node into N by N subarrays where N<M and M is divisible by N and logically folding the resultant array once along a diagonal, the folded array comprising:

$(N^2-N)/2$ general nodes each having $2((M/N)^2)X$ interconnected memory elements, the $(N^2-N)/2$ general nodes arranged to form a triangular array having a diagonal fold;

N diagonal nodes, each having $X(M/N)^2$ interconnected memory elements, the N diagonal nodes disposed along the diagonal fold of the array;

N memory buses interconnecting the nodes of the array, each memory bus having a control line and a data line; and a number of switches equal to the number of nodes, each switch connected to one node and disposed between the one node and a memory bus so that rows and columns of data are read and written.

4. The folded array according to claim 3, the folded array further comprising:

a folded tree computational array having N processor buses interconnected with the N memory buses and having means for performing direct cosine transform computations using data contained in the memory elements.

5. The folded array according to claim 3 further comprising:

a number of means for performing butterfly operations, the number of means equal to the number of nodes in the folded array, each means disposed between one node and the switch connected to that node.

6. The folded array according to claim 3 configured to perform cosine transform computations, the folded array further comprising:

means at each node for performing calculations using the data stored in the memory elements of the node and outputting the results of the calculations to a summation tree and to a data bus.

7. The folded array according to claim 6 wherein the means at each node performing calculations includes:

a multiplier disposed between the switch connected to that node and a memory bus.

8. A transposed, folded array having a number of nodes formed by logically overlaying N by N node square memory subarrays formed by logically cutting an M by M node square memory array having X memory elements per node where N<M and M is divisible by N, and logically folding the resulting square array once along a diagonal, the folded array comprising:

$(N^2-N)/2$ general nodes each having $2((M/N)^2)X$ interconnected memory elements, the $(N^2-N)/2$ general nodes arranged to form a triangular array having a diagonal fold;

N diagonal nodes, each having $X(M/N)^2$ interconnected memory elements, the N diagonal nodes disposed along the diagonal fold of the array;

N memory buses interconnecting the nodes of the array, each memory bus having a control line and a data line; and number of switches equal to the number of nodes, each switch connected to a node and disposed between the node and a memory bus so that rows and columns of data are read and written.

9. The folded array according to claim 8, the folded array further comprising:

a folded tree computational array having N processor buses interconnected with the N memory buses and having means for performing direct cosine transform computations using data contained in the memory elements.

10. The folded array according to claim 8 further comprising:

a number of means for performing butterfly operations, the number of means equal to the number of nodes in the folded array, each means disposed between one node and the switch connected to that node.

11. The folded array according to claim 8 configured to perform cosine transform computations, the folded array further comprising:

means at each node for performing calculations using the data stored in the memory elements of the node and outputting the results of the calculations to a summation tree and to a data bus.

12. The folded array according to claim 11 wherein the means at each node for performing calculations includes:

a multiplier disposed between the switch connected to that node and a memory bus.

13. A processor array for computing cosine transforms, the processor array comprising:

a memory array formed by logically folding an M by M node square memory array into N by N subarrays where N<M and M is divisible by N and logically folding the resultant array once along a diagonal, the memory array having $((N^2-N)/2)+N$ nodes, each node having one or more interconnected memory elements;

N buses interconnecting the nodes of the memory array, each bus having a control line and a data line; and computational elements at each node for performing computations on data stored in the memory elements of the node and outputting results of the computations to a summation tree and to a data bus.

14. The processor array of claim 13 wherein the computational elements at each node include:

a switch;

means for performing butterfly operations disposed between the switching means and the memory elements of the node; and multiplying means for multiplying the output of the switch by a trigonometric constant, the multiplying means disposed between the switch and the bus connected to that node.

15. The processor array of claim 14 wherein the multiplying means includes:

a multiplier for receiving input from the switch, the multiplier disposed between the switch and the bus connected to the node; and means for receiving input from two or more registers connected to the multiplier, the registers for supplying the trigonometric constants to the multiplier.

16. A processor army for computing cosine transforms, the processor array comprising:

a memory array formed by logically overlaying N by N node square memory subarrays formed by logically cutting an M by M node square memory array where N<M and M is divisible by N, and logically folding the resultant memory army once along a diagonal, the memory array having $((N^2-N)/2)+N$ nodes, each node having one ore more interconnected memory elements;

N buses interconnecting the nodes of the memory array, each bus having a control line and a data line; and computational elements at each node for performing computations on data stored in the memory elements of the node and outputting results of the computations to a summation tree and to a data bus.

17. The processor array of claim 16 wherein the computational elements at each node include:

a switch;

means for performing butterfly operations disposed between the switch and the memory elements of the node; and multiplying means for multiplying the output of the switch by a trigonometric constant, the multiplying means disposed between the switch and the bus connected to that node.

18. The processor array of claim 17 wherein the multiplying means includes:

a multiplier for receiving input from the switch, the multiplier disposed between the switch and the bus connected to the node; and means for receiving input from two or more registers connected to the multiplier, the registers for supplying the trigonometric constants to the multiplier.

* * * * *